ns011853384B2

(12) United States Patent
Patel

(10) Patent No.: US 11,853,384 B2
(45) Date of Patent: Dec. 26, 2023

(54) METHODS OF PATEL LOADFLOW COMPUTATION FOR ELECTRICAL POWER SYSTEM

(71) Applicant: Sureshchandra B. Patel, Toronto (CA)

(72) Inventor: Sureshchandra B. Patel, Toronto (CA)

(*) Notice: Subject to any disclaimer, the term of this patent is extended or adjusted under 35 U.S.C. 154(b) by 300 days.

(21) Appl. No.: 17/089,456

(22) Filed: Nov. 4, 2020

(65) Prior Publication Data
US 2021/0049228 A1 Feb. 18, 2021

Related U.S. Application Data

(63) Continuation-in-part of application No. 16/431,952, filed on Jun. 5, 2019, now abandoned, which is a (Continued)

(30) Foreign Application Priority Data

May 31, 2017 (CA) ...................................... 2968813
May 27, 2020 (CA) ...................................... 3081430

(51) Int. Cl.
*G06F 17/12* (2006.01)
*H02J 3/00* (2006.01)
*G05B 19/042* (2006.01)

(52) U.S. Cl.
CPC ........... *G06F 17/12* (2013.01); *G05B 19/042* (2013.01); *H02J 3/00* (2013.01); *G05B 2219/2639* (2013.01); *H02J 2203/20* (2020.01)

(58) Field of Classification Search
CPC ........ H02J 3/00; G05B 17/02; G06F 2217/16; Y02E 60/76; Y04S 40/22
(Continued)

(56) References Cited

U.S. PATENT DOCUMENTS 5,734,586 A * 3/1998 Chiang ..................... H02J 3/16
700/286
7,769,497 B2 8/2010 Patel
(Continued)

FOREIGN PATENT DOCUMENTS

CA 2564625 12/2010
CA 2107388 7/2011
(Continued)

*Primary Examiner* — Md Azad

(57) ABSTRACT

Propounding statement of Patel Numerical Method for solution of an algebraic equation and simultaneous algebraic equations, both linear and non-linear, is presented. Also presented is Exactly formulated, and Accurately and Reliably convergent Incremental Gauss-Seidel Loadflow (EARIGSL). A new class of Loadflow Methods are invented. These invented Loadflow Methods are Y-matrix based coefficient matrix Patel Loadflow (CPL), its hybrid version HCPL, Patel Loadflow-1 (PL-1), PL-2, Patel Super Decoupled Loadflow (PSDL-YY), its hybrid version HPSDL-YY, Sparse Z-matrix based Patel Loadflow {SZPL or $S[C]^{-1}$ PL (SCIPL)}, its hybrid version HSZPL or HCIPL, and Sparse Z-matrix could be real or complex and it can be derived from fully inverted coefficient matrix [C] or Jacobian matrix [J] or their different variants. A method of convergence data analytics based determining acceleration factor is also presented. Techniques developed in this application are applicable in other subjects or problems requiring solution of linear or nonlinear simultaneous algebraic equations.

9 Claims, 19 Drawing Sheets

Invention: EARIGSL Method

Related U.S. Application Data continuation-in-part of application No. 15/797,649, filed on Oct. 30, 2017, now abandoned, which is a continuation-in-part of application No. 14/492,428, filed on Sep. 22, 2014, now abandoned.

(58) Field of Classification Search
USPC .......................................................... 700/291
See application file for complete search history.

(56) References Cited

U.S. PATENT DOCUMENTS

| | | | |
|---|---|---|---|
| 7,788,051 B2 | 8/2010 | Patel | |
| 8,315,742 B2 | 11/2012 | Patel | |
| 8,756,047 B2 | 6/2014 | Patel | |
| 9,863,985 B2 * | 1/2018 | Giannakis | ......... H02J 13/00002 |
| 10,409,233 B2 * | 9/2019 | Quirynen | .............. G05B 13/048 |
| 11,271,398 B2 * | 3/2022 | Liu | ........................... H02J 3/12 |
| 2005/0160128 A1 * | 7/2005 | Fardanesh | ........... G06F 30/3323 |
| | | | 708/446 |
| 2012/0022713 A1 * | 1/2012 | Deaver, Sr. | ............ G05B 17/02 |
| | | | 700/298 |
| 2012/0271479 A1 * | 10/2012 | Schmid | ..................... H02J 3/18 |
| | | | 700/298 |
| 2013/0304266 A1 * | 11/2013 | Giannakis | ............ G01R 21/133 |
| | | | 700/286 |
| 2016/0048150 A1 * | 2/2016 | Chiang | ..................... G05F 1/66 |
| | | | 700/295 |

FOREIGN PATENT DOCUMENTS

| | | |
|---|---|---|
| CA | 2548096 | 7/2011 |
| CA | 2661753 | 10/2011 |
| CA | 2712873 | 5/2016 |

* cited by examiner

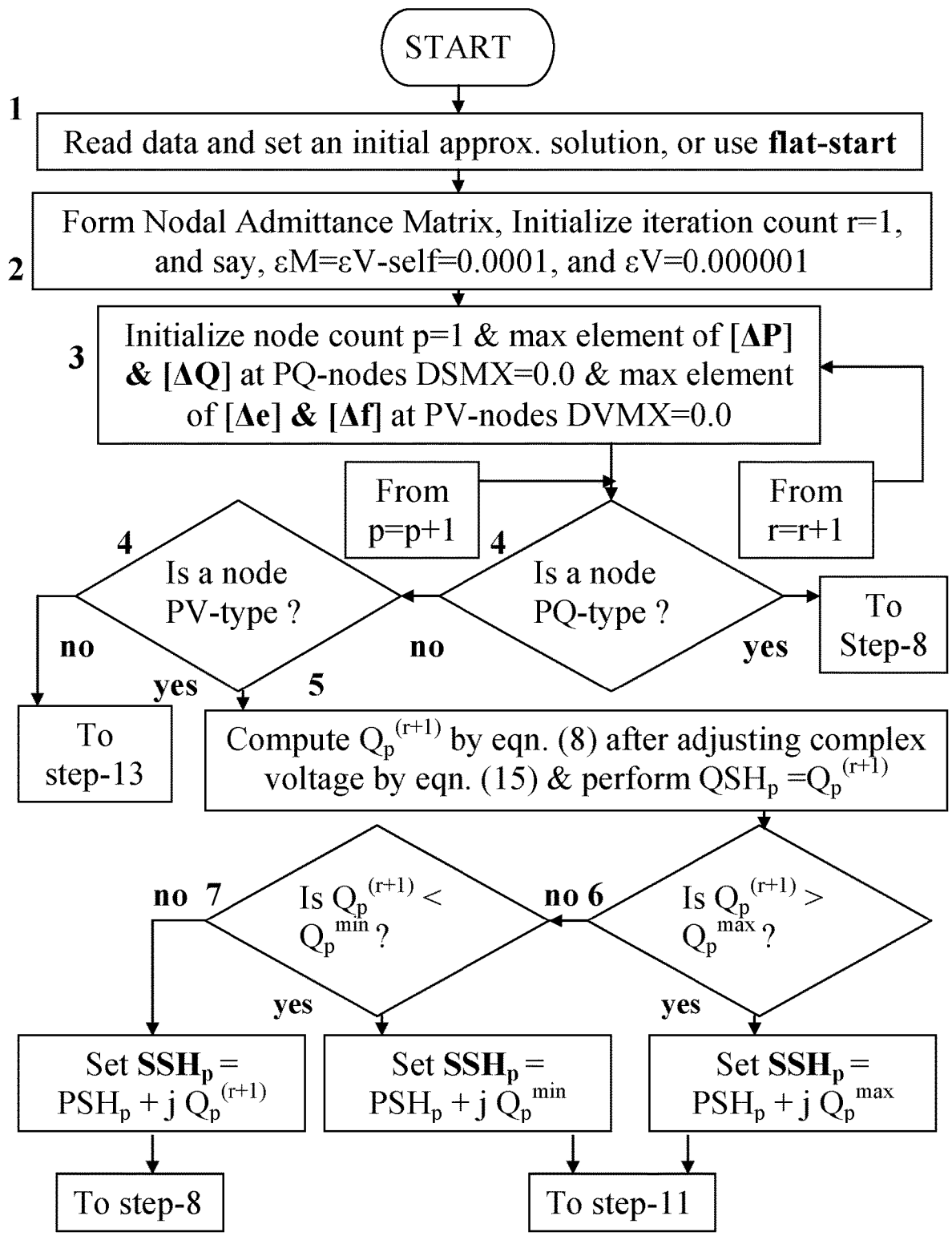
Fig.1: Invention: EARIGSL Method

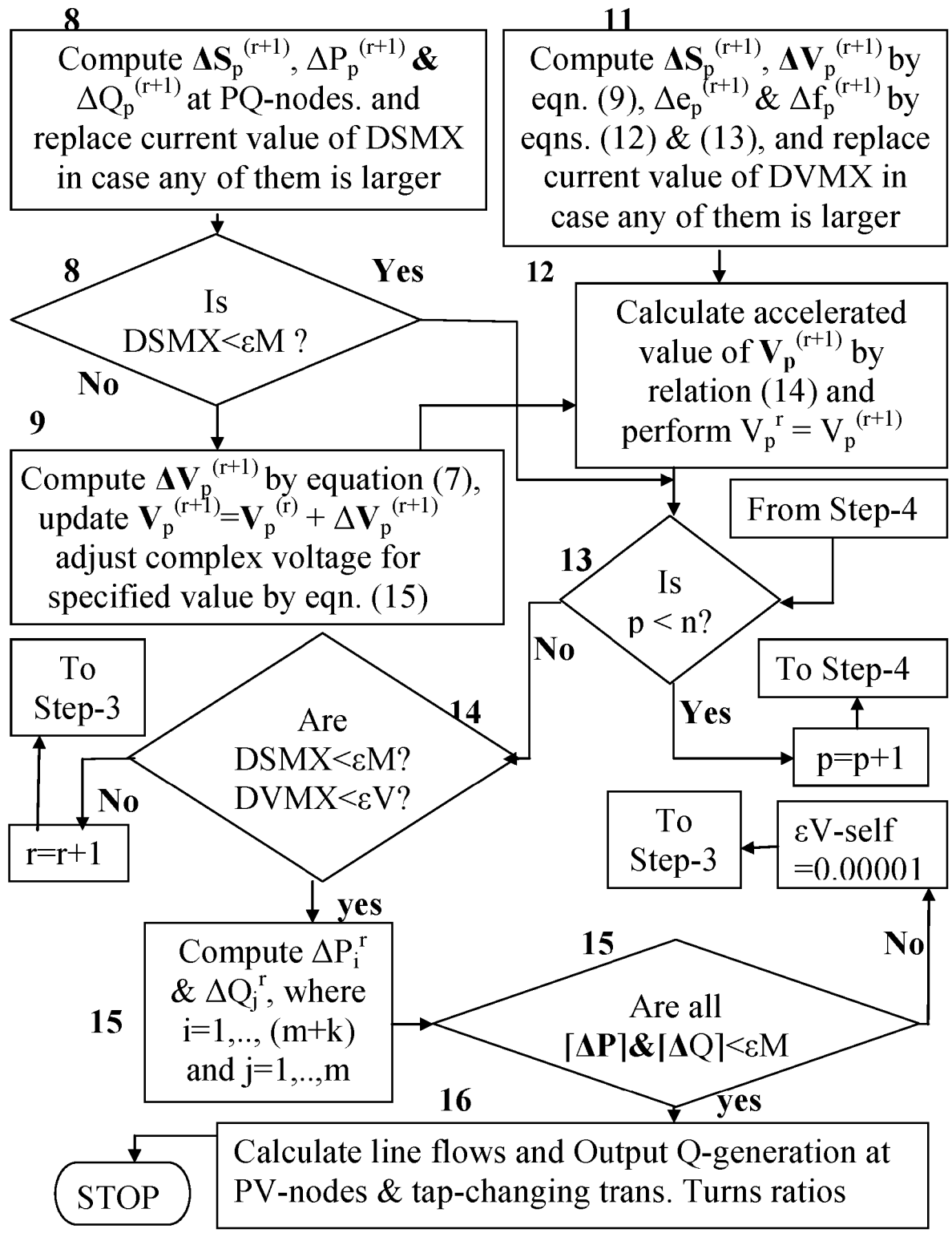
(Cont.) Fig.1: Invention: EARIGSL Method

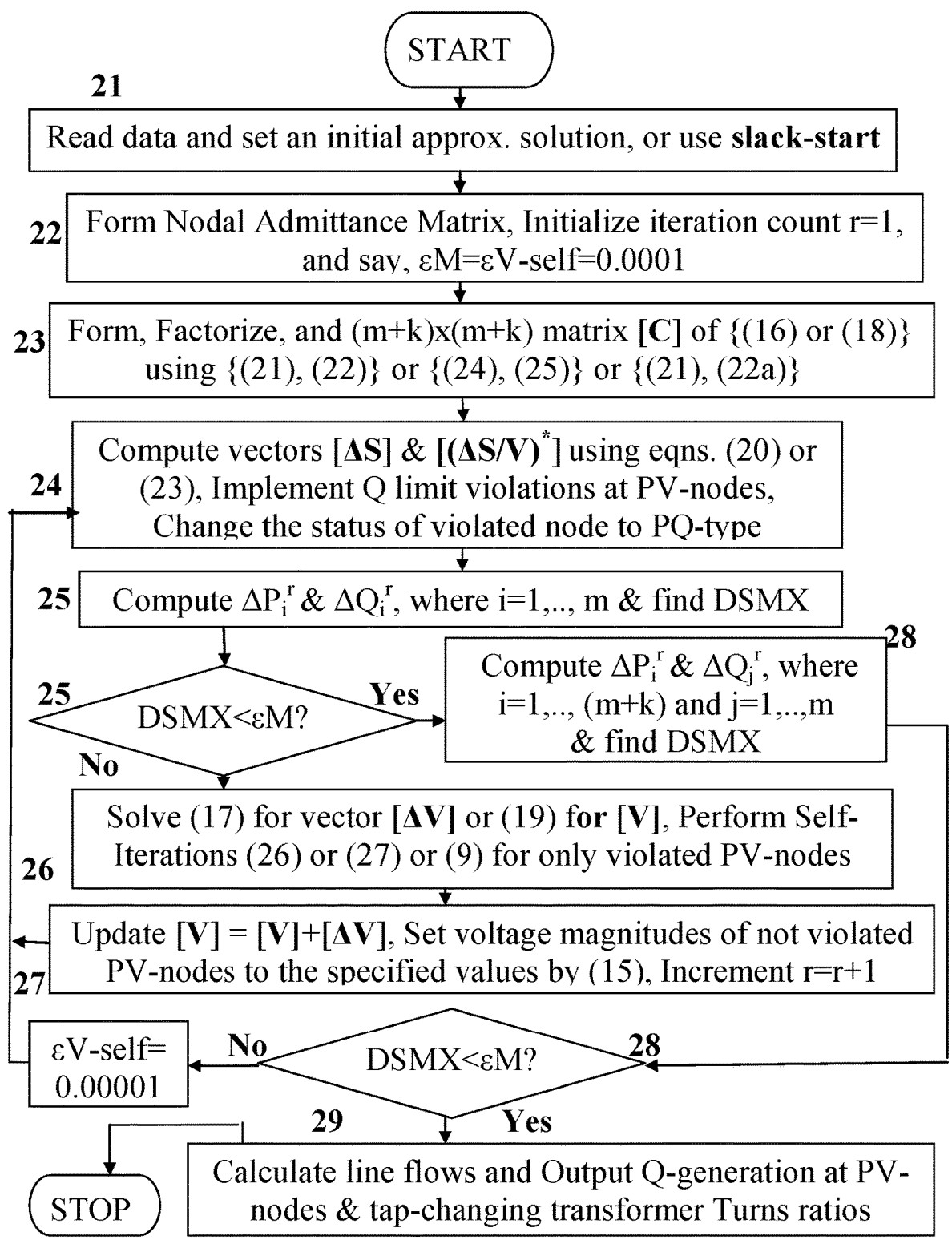
Fig.2: Invention: CPL method

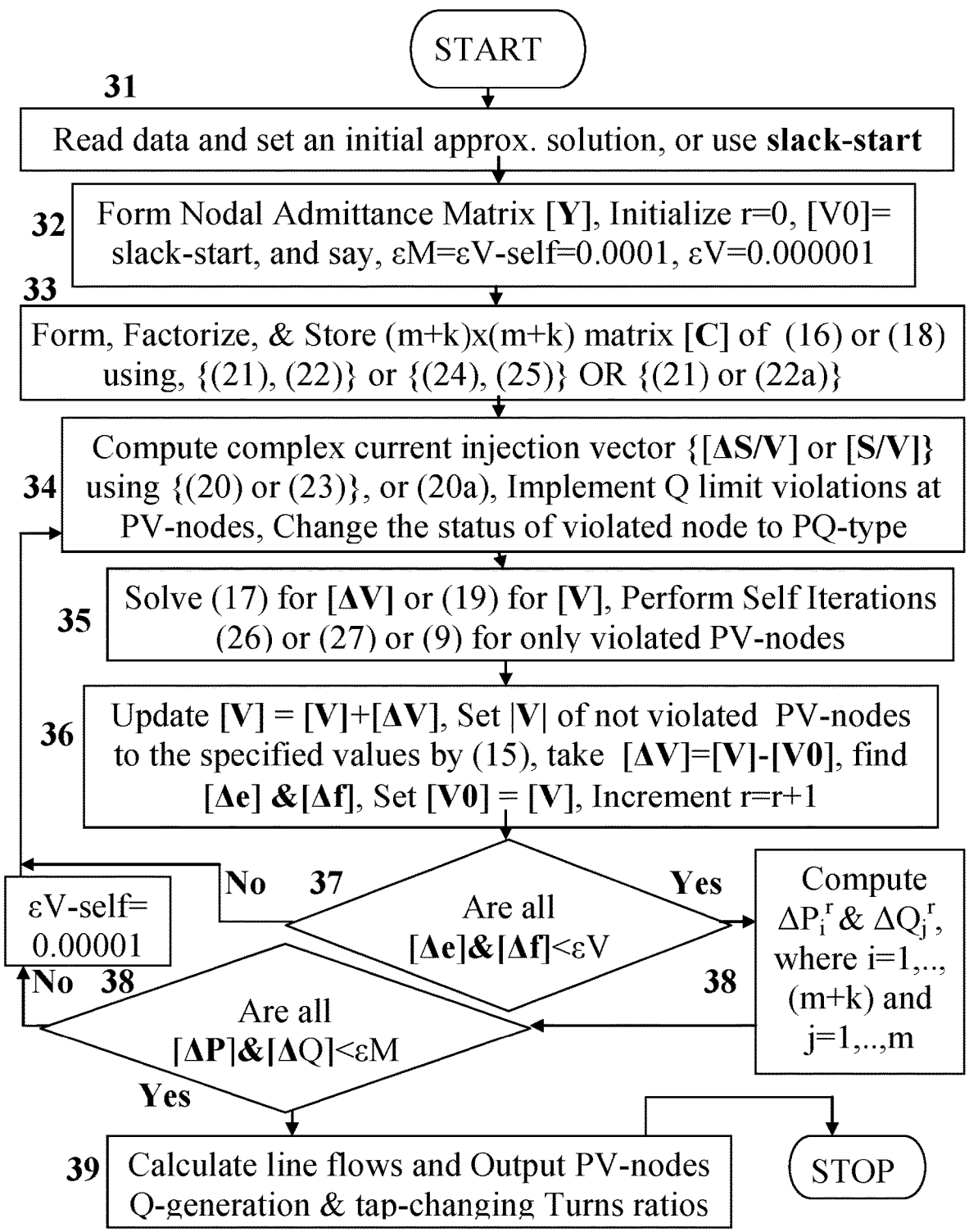
Fig.2a: Invention: Alternative CPL method

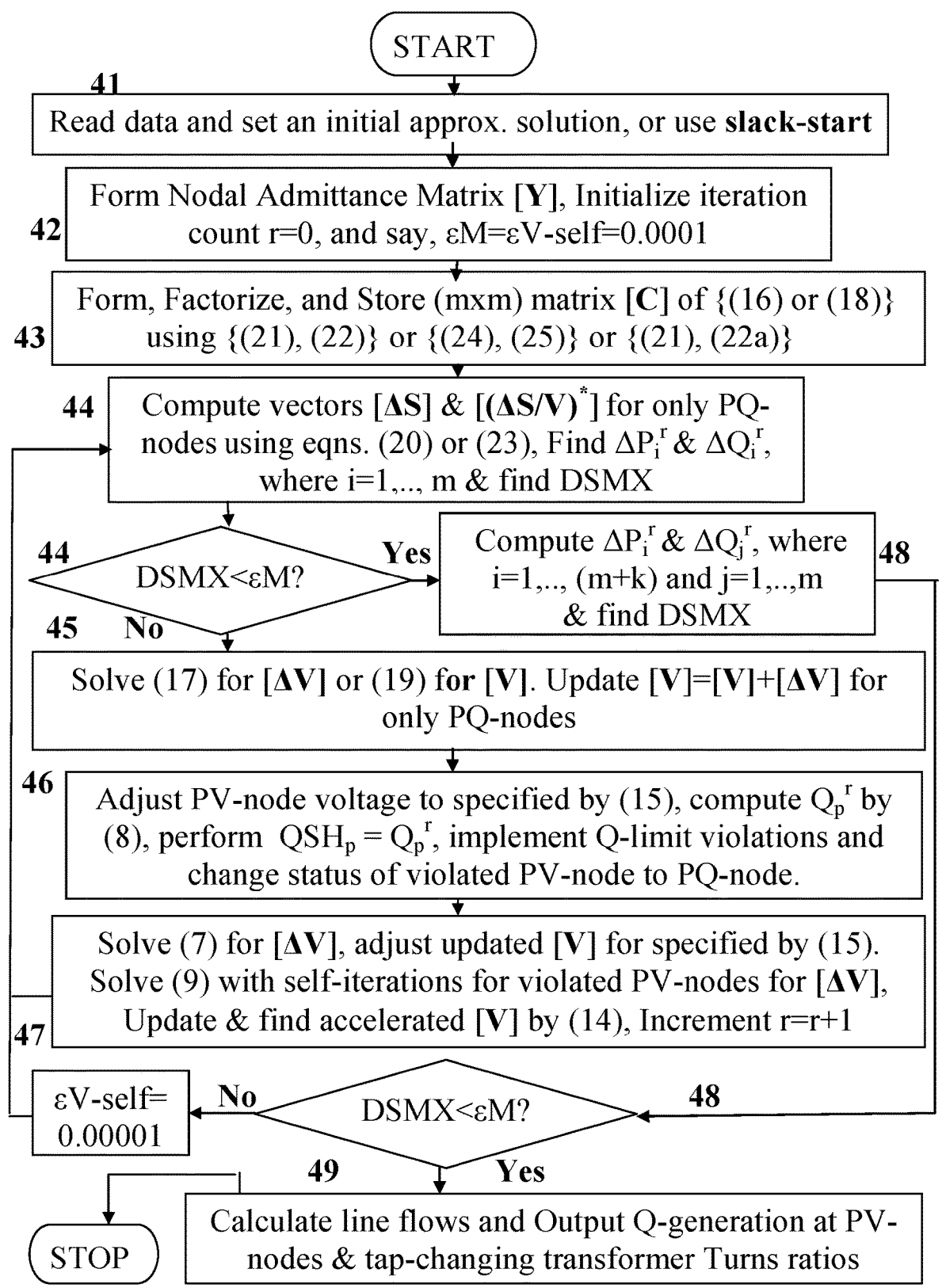
Fig.3: Invention: HCPL method

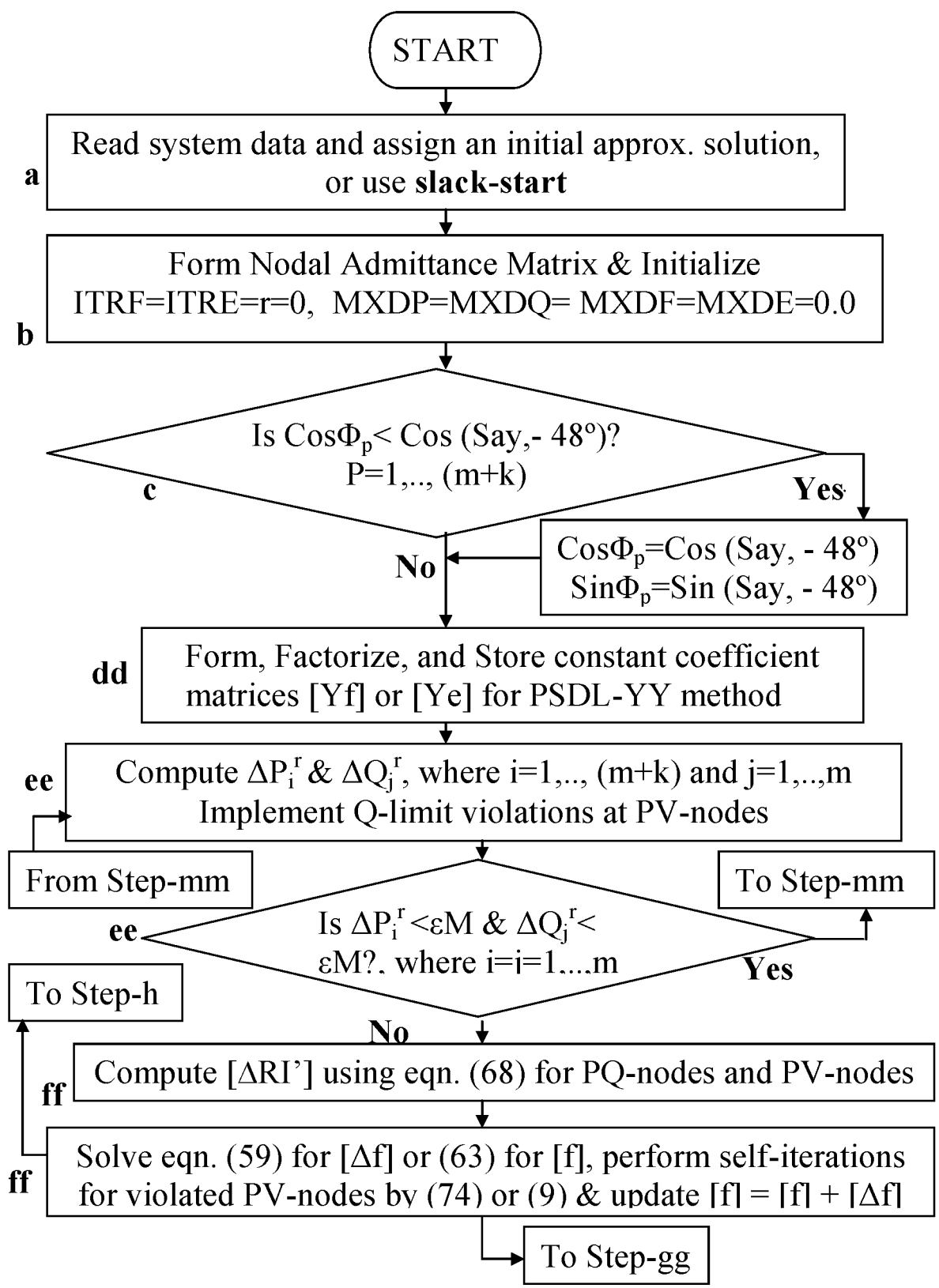
Fig.4: Invention: PSDL-YY method

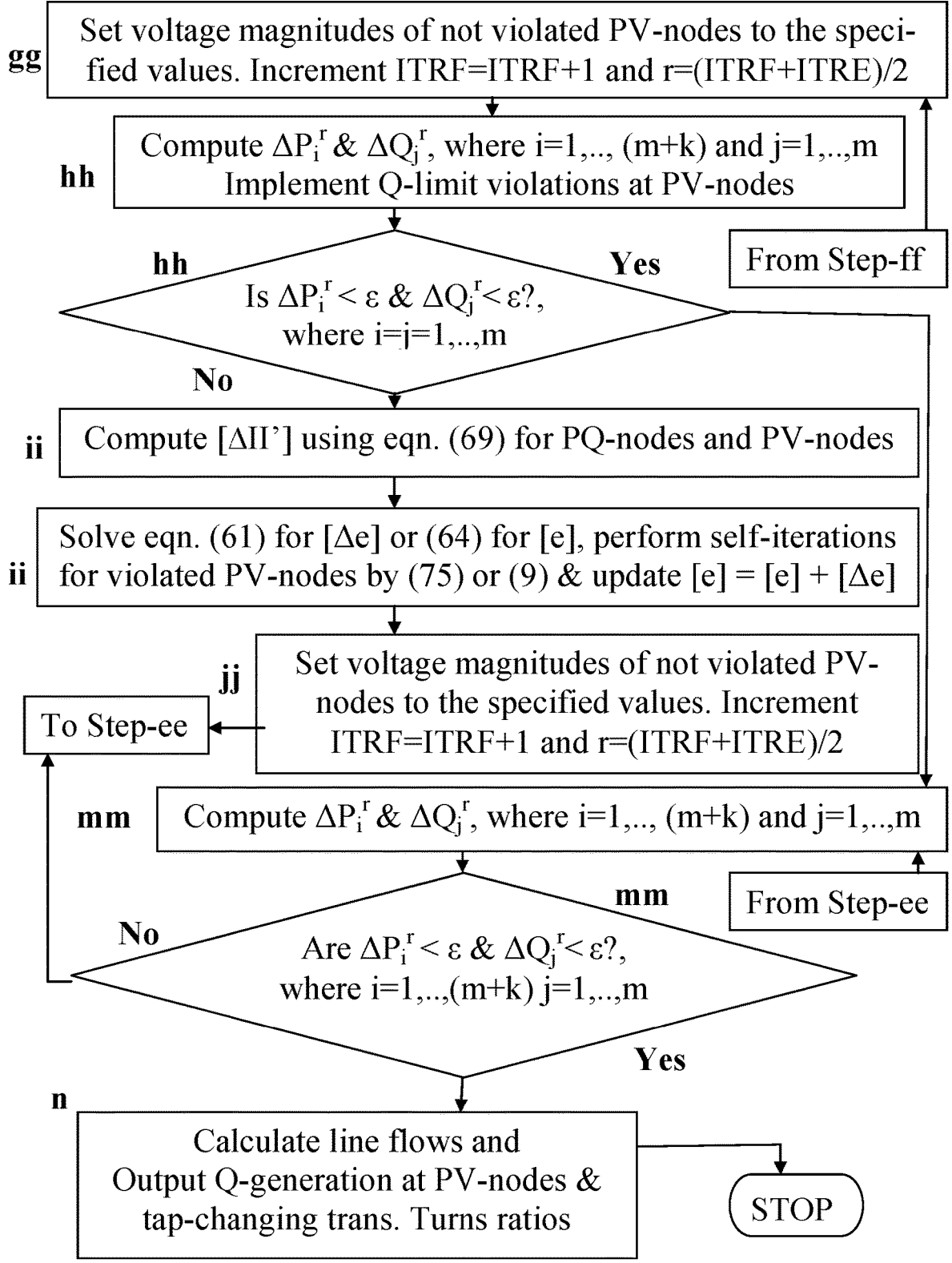
(Cont.) Fig.4: Invention: PSDL-YY method

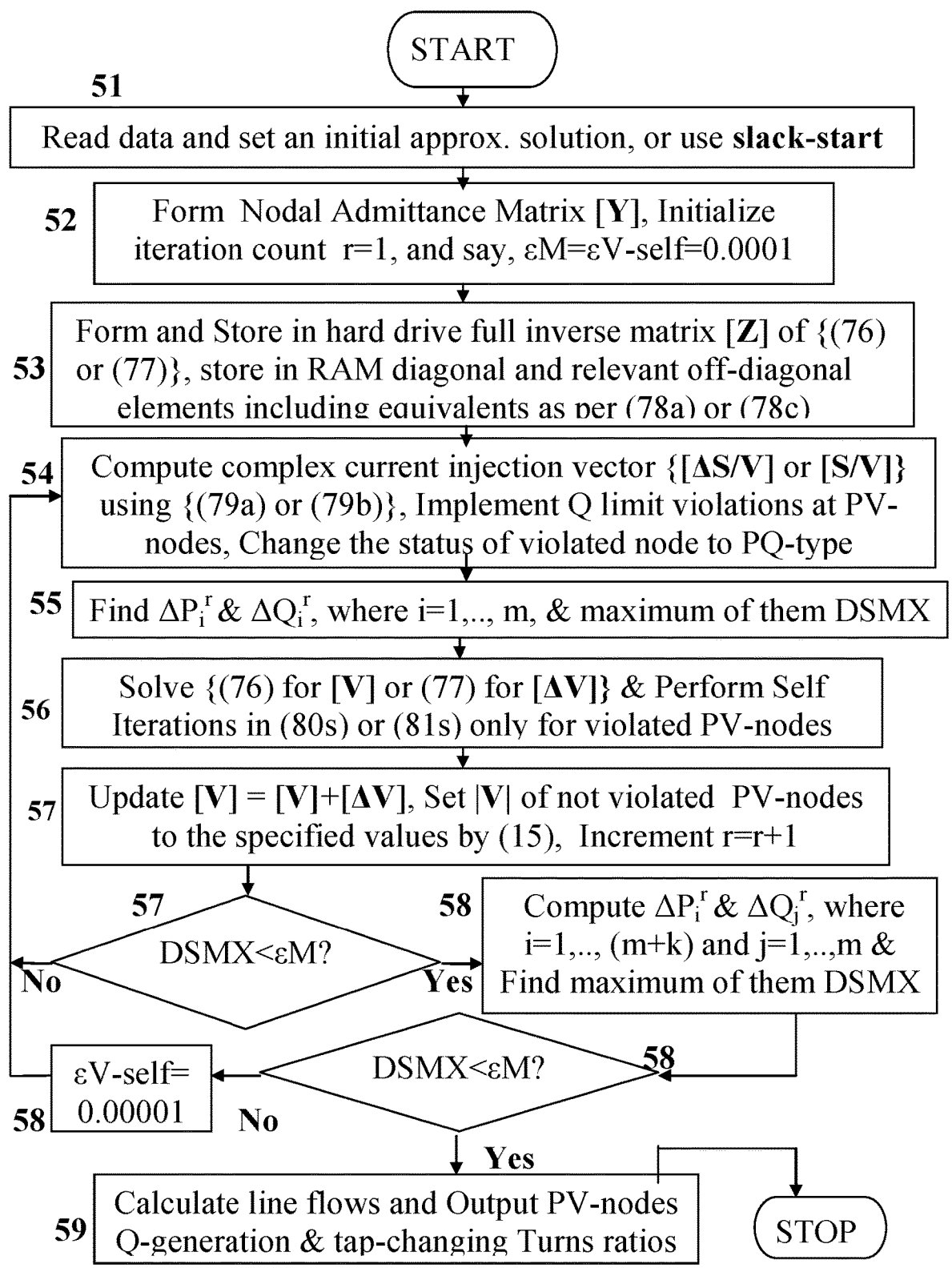
Fig.5: Invention: ZPL method

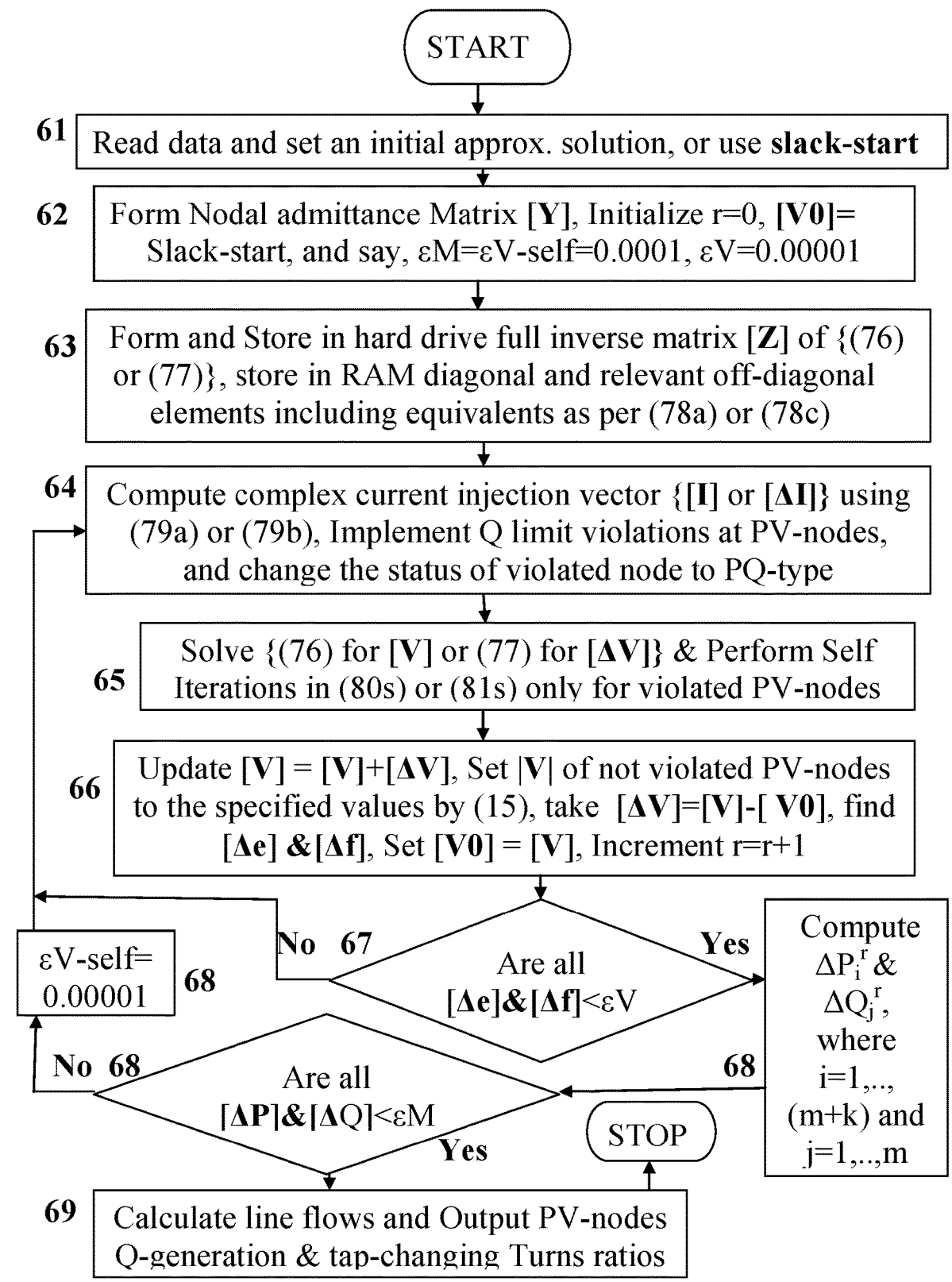
Fig.5a: Invention: Alternative ZPL method

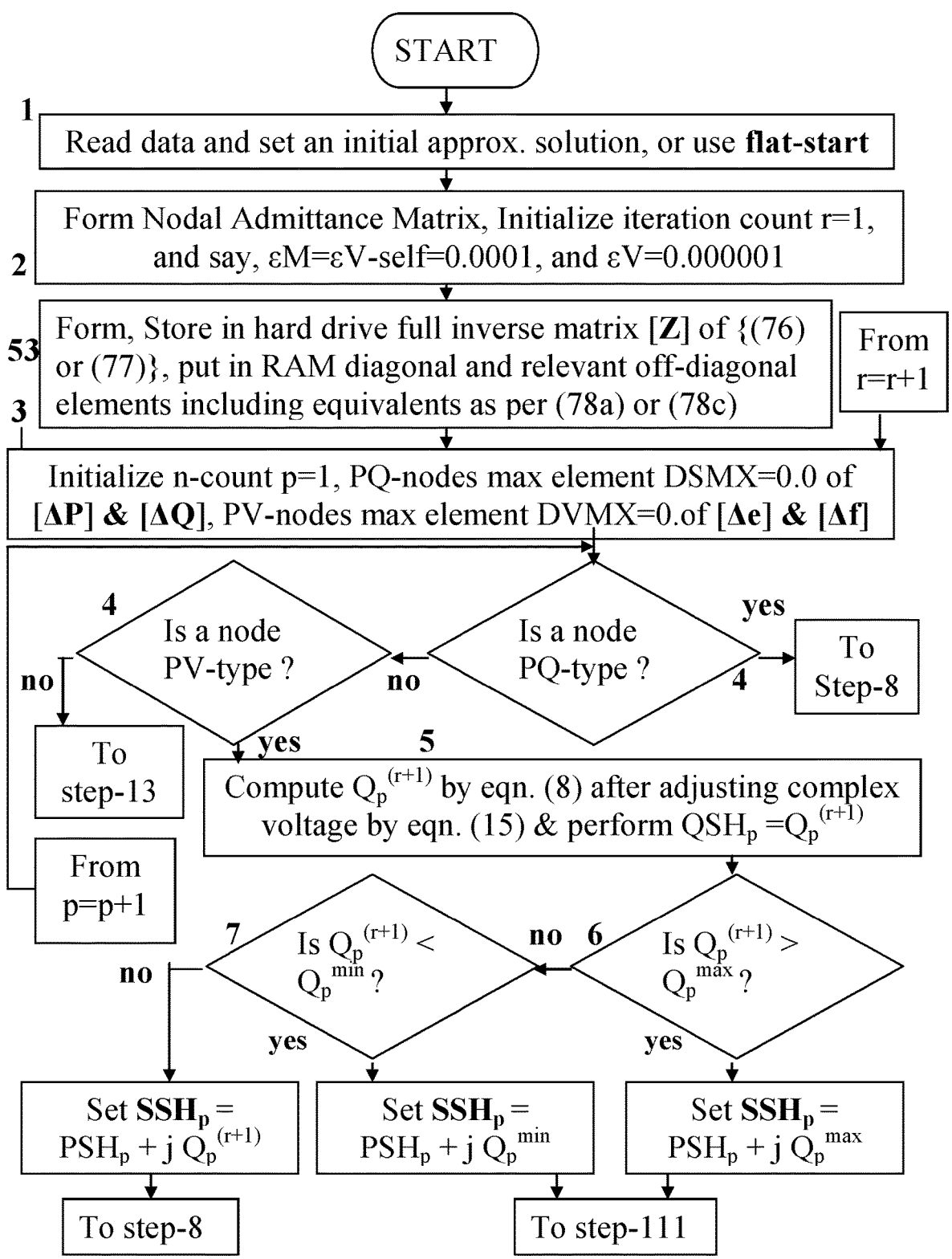
Fig.5b: Invention: SZPL Method (Single Processor)

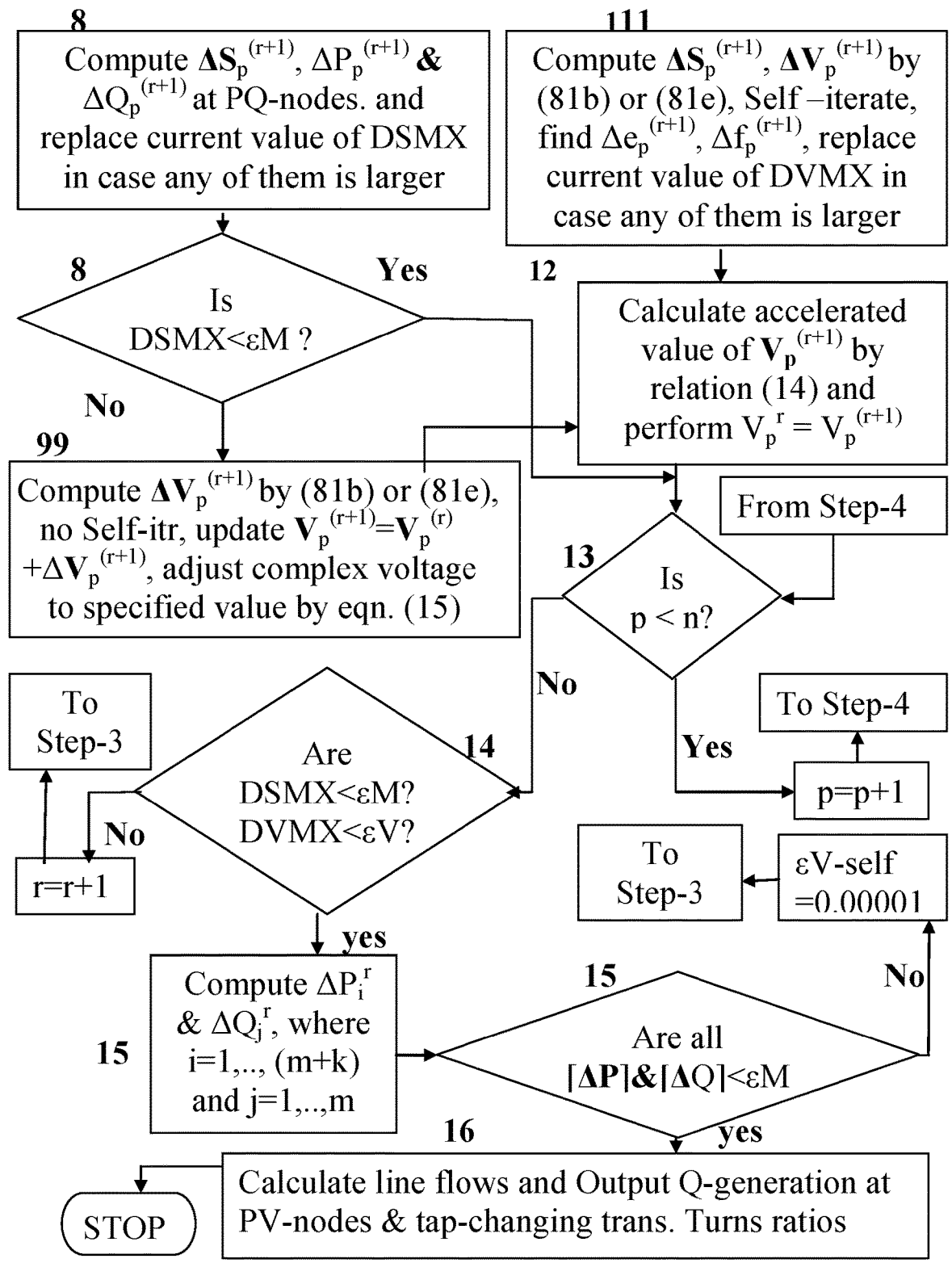
(Cont.) Fig.5b: Invention: SZPL Method (Single Processor)

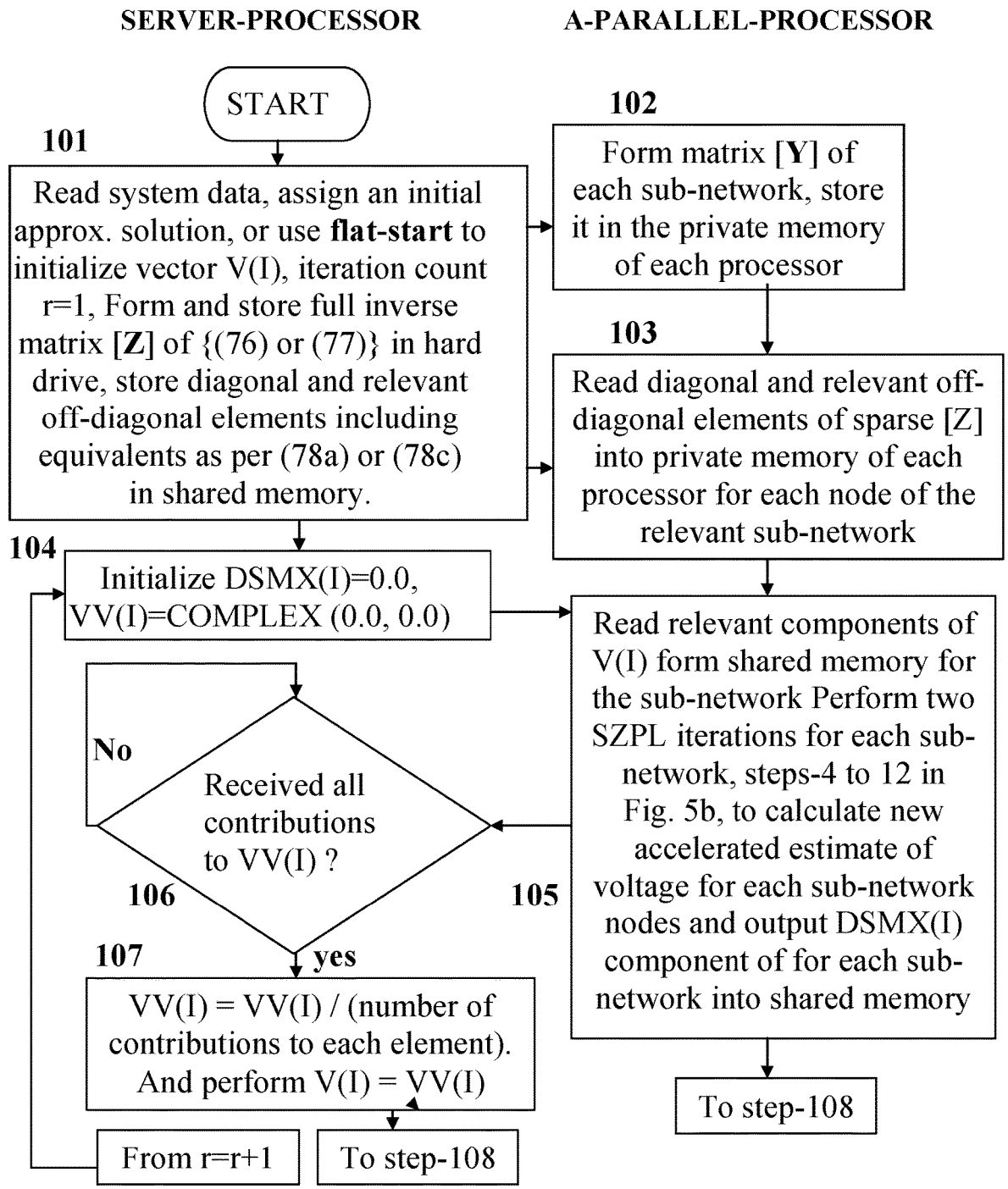
Fig.5c: Invention: Flow-chart of Parallel SZPL Method

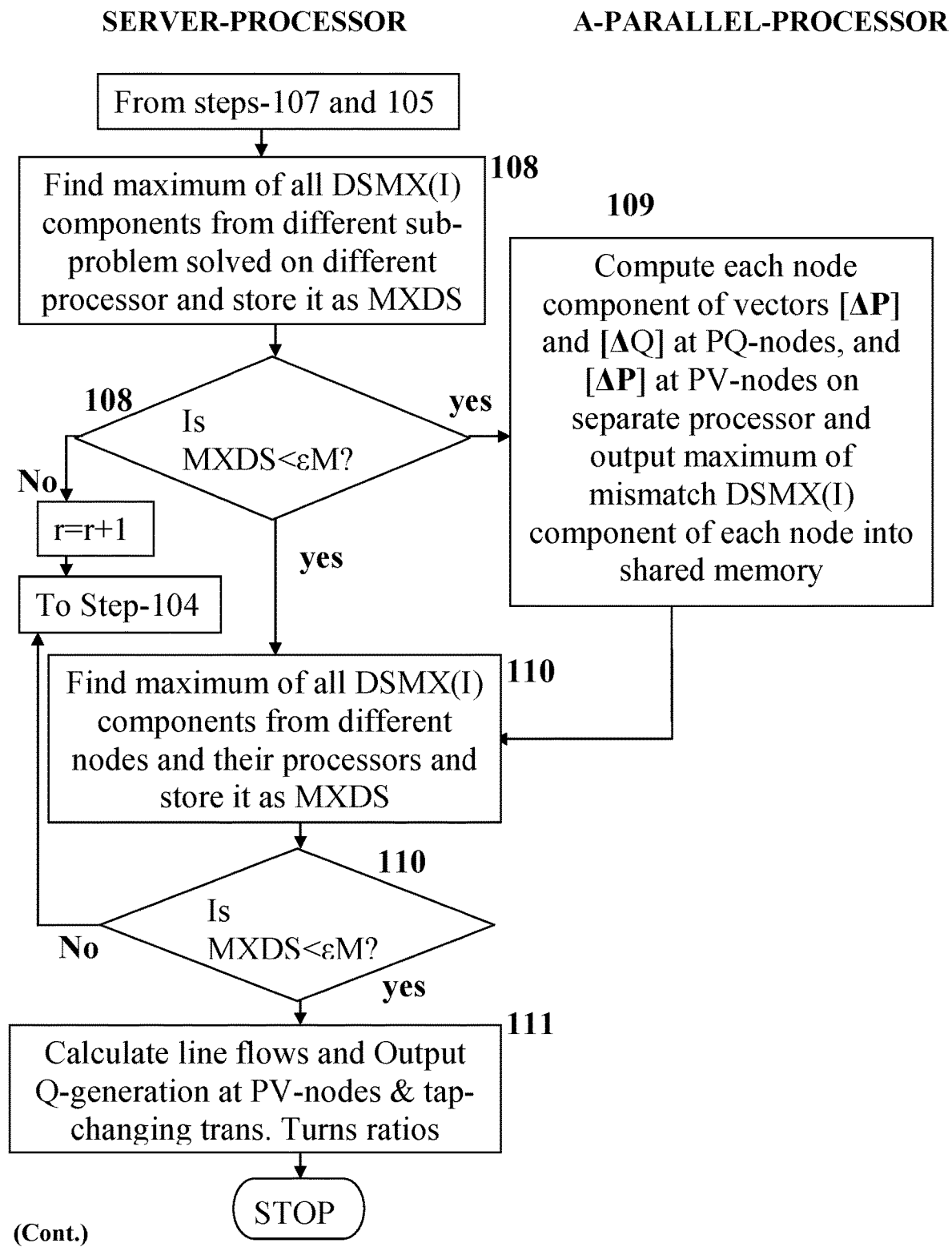
Fig.5c: Invention: Flow-chart of Parallel SZPL Method

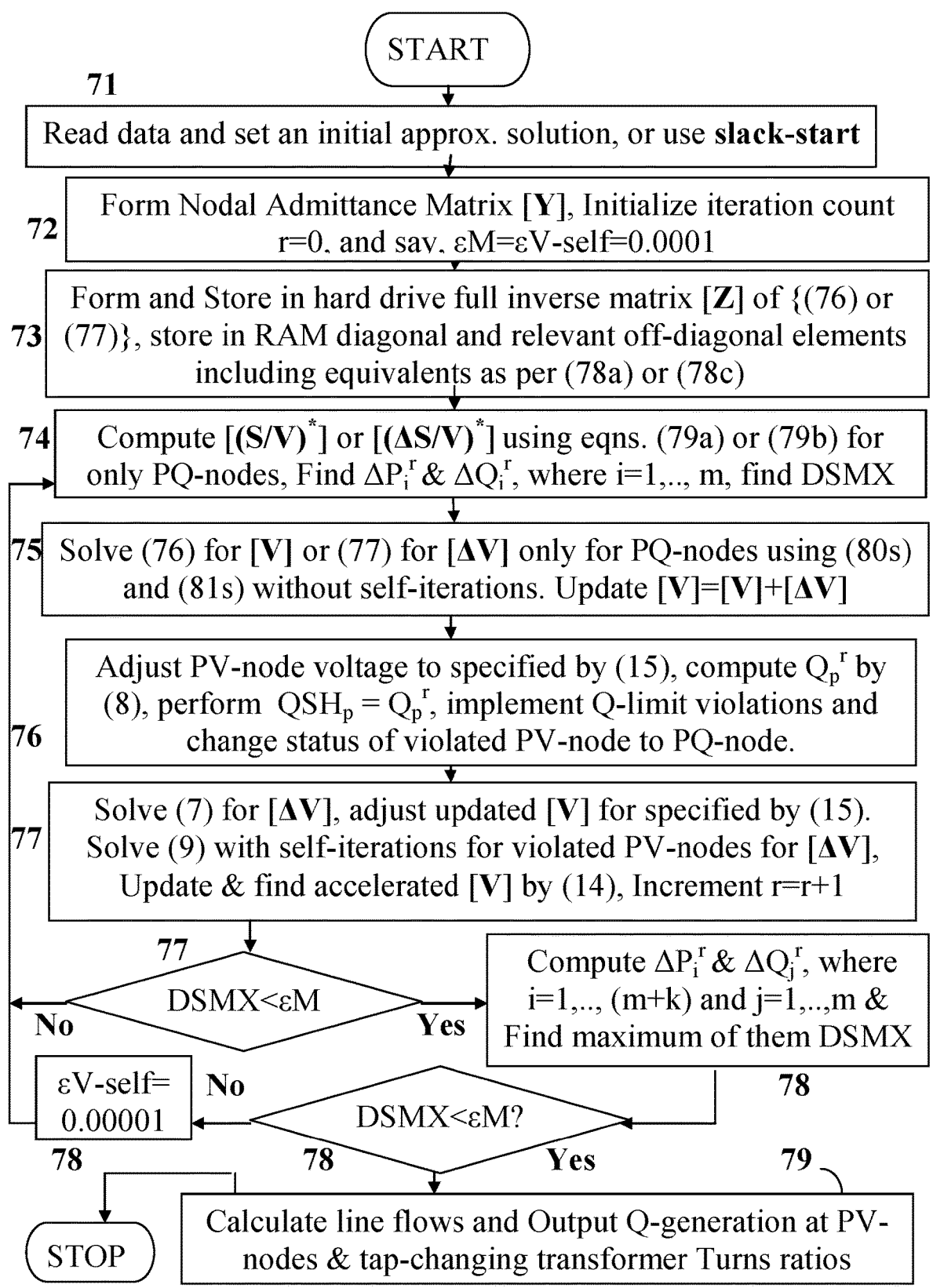
Fig.6: Invention: HZPL method

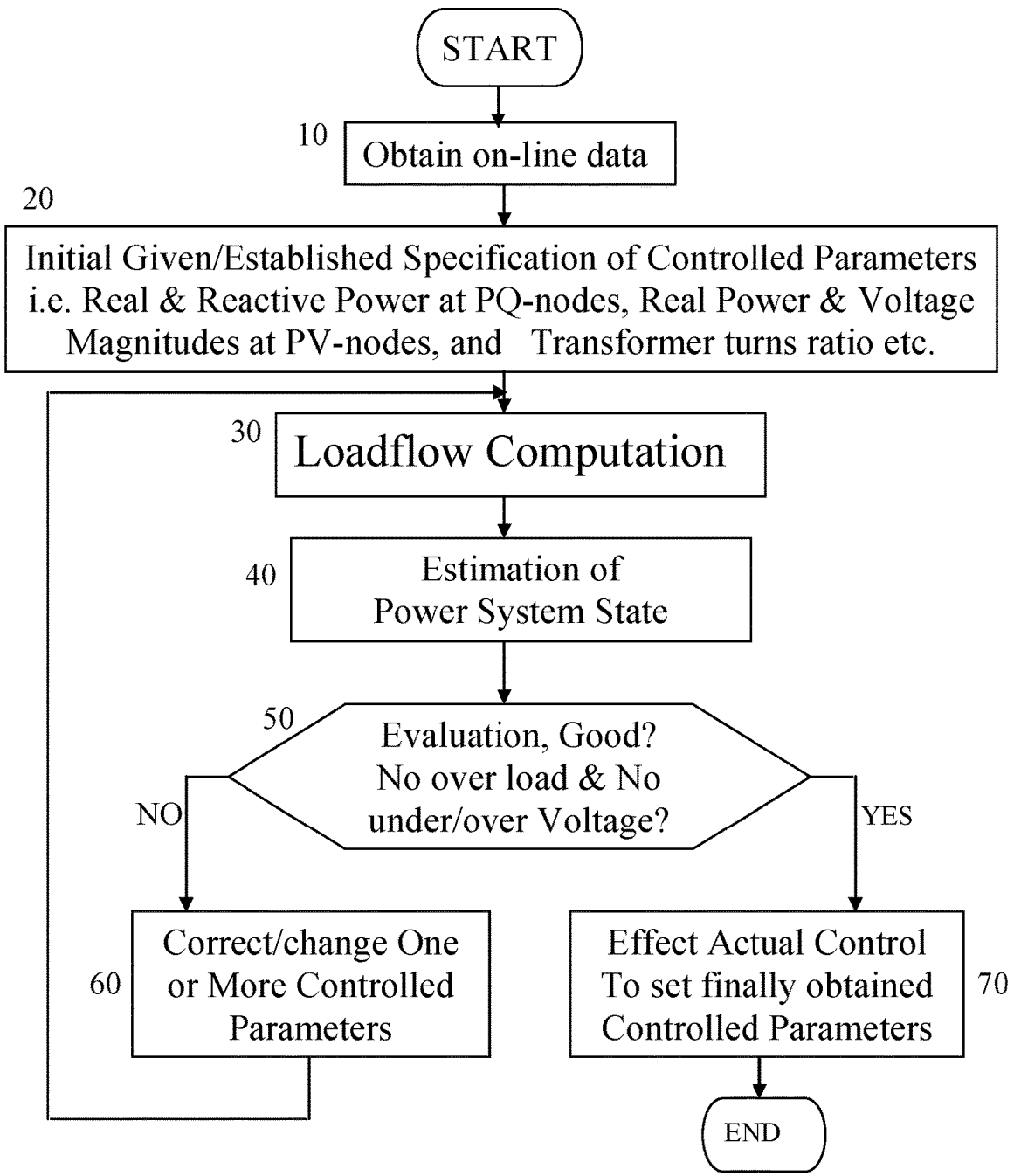
Fig.7: Prior Art: Power Flow and/or Voltage Control

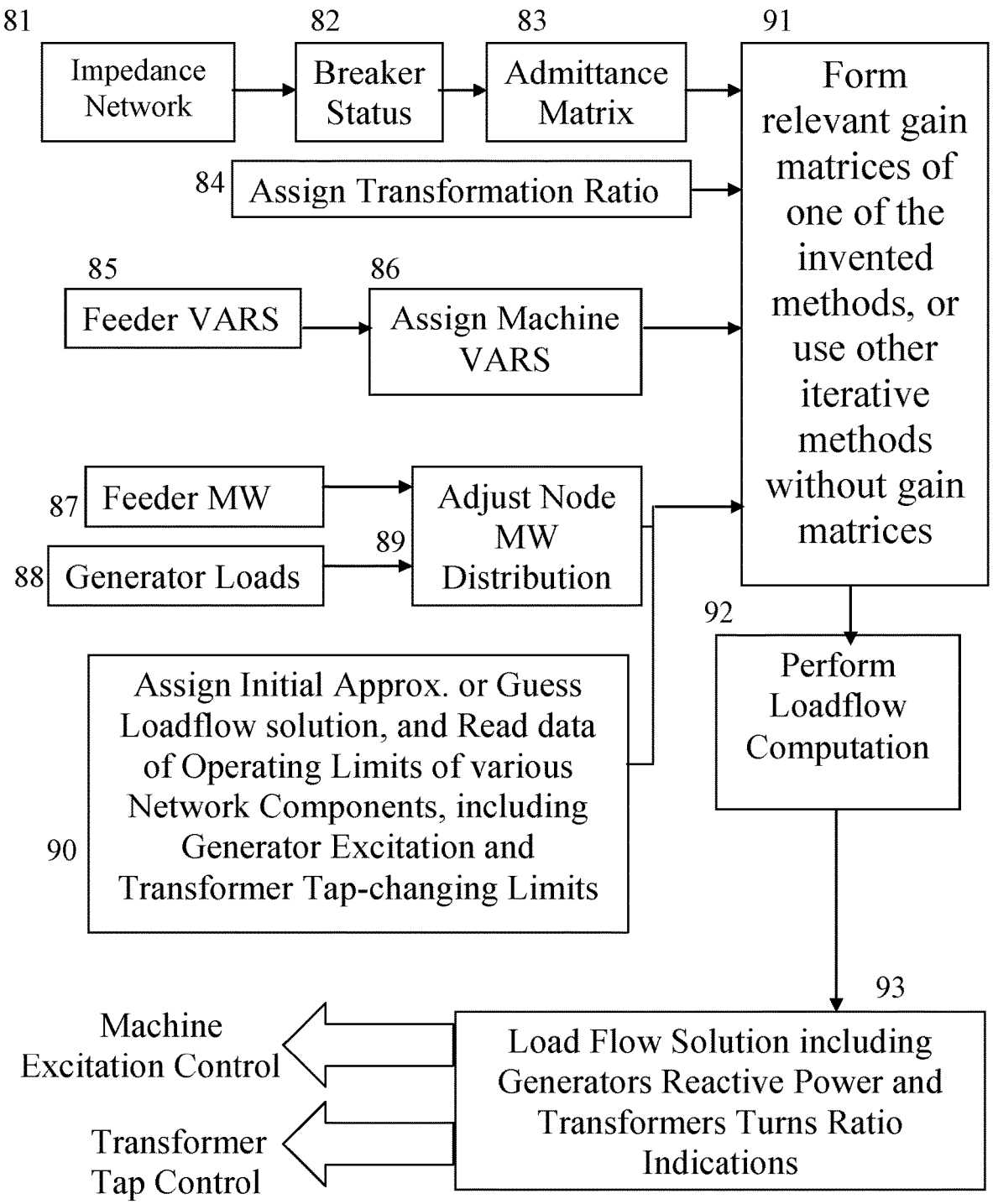
Fig. 8: Prior Art: Voltage Control

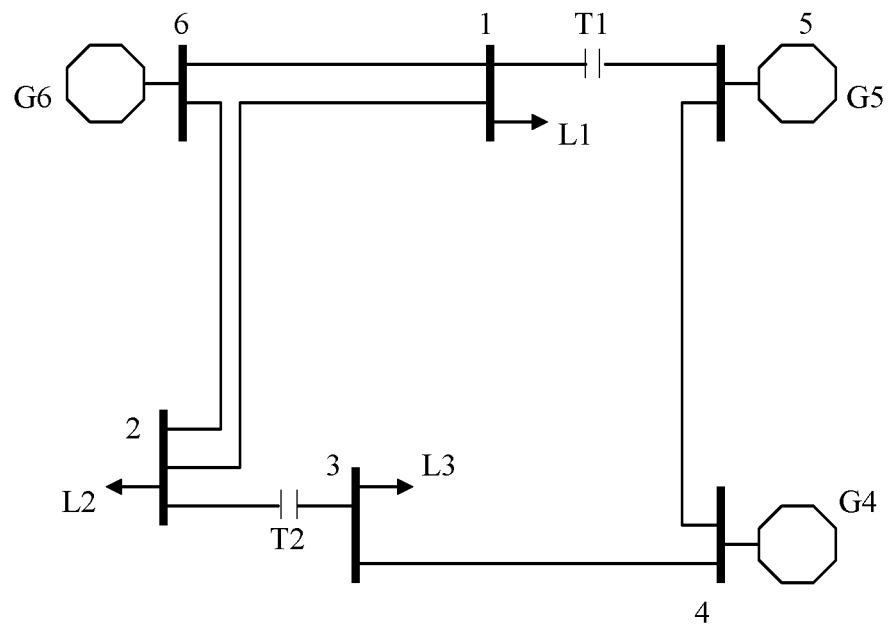
Fig. 9: Prior Art: An Exemplary Power System

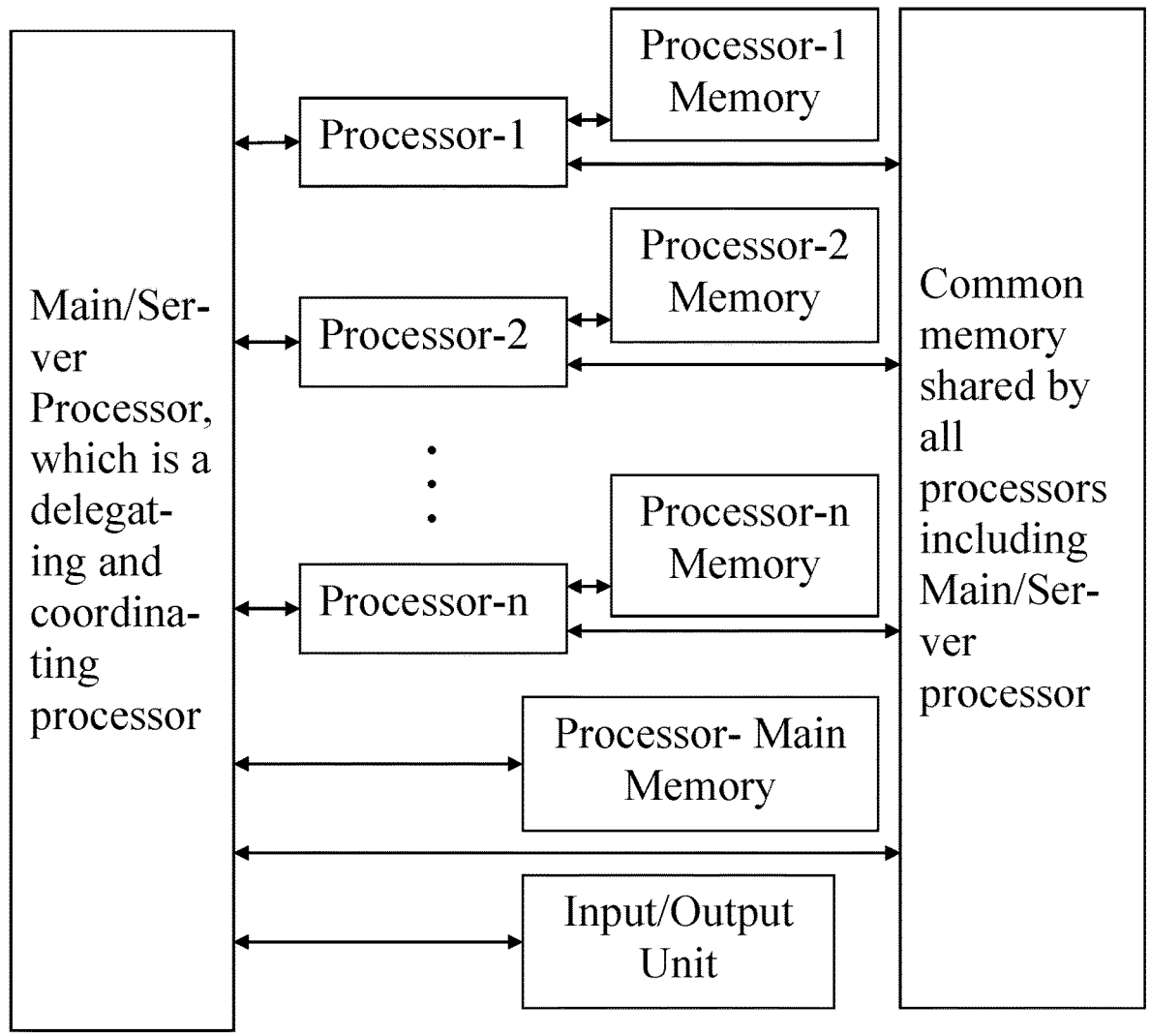
Fig.10a: Patented Prior Art Parallel Computer Architecture

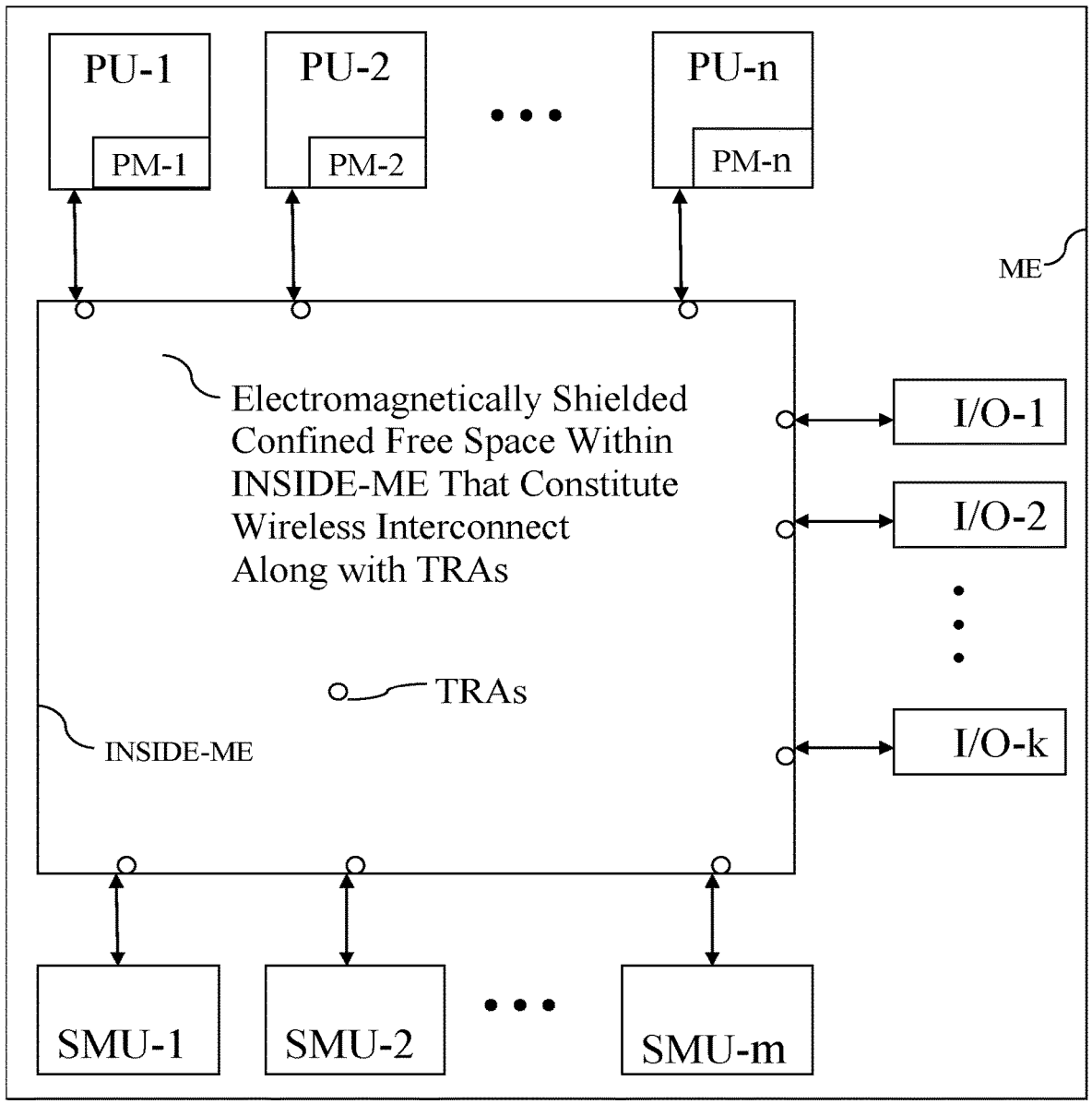
Fig.10b: Patented Prior-Art Parallel Computer Architecture with Wireless Interconnect

US 11,853,384 B2

METHODS OF PATEL LOADFLOW COMPUTATION FOR ELECTRICAL POWER SYSTEM

FIELD OF THE INVENTION

The present invention relates to a method of loadflow computation in power flow control and voltage control for an electrical power system.

BACKGROUND OF THE INVENTION

The present invention relates to power-flow/voltage control in utility/industrial power networks of the types including many power plants/generators interconnected through transmission/distribution lines to other loads and motors. Each of these components of the power network is protected against unhealthy or alternatively faulty, over/under voltage, and/or over loaded damaging operating conditions. Such a protection is automatic and operates without the consent of power network operator, and takes an unhealthy component out of service by disconnecting it from the network. The time domain of operation of the protection is of the order of milliseconds.

The purpose of a utility/industrial power network is to meet the electricity demands of its various consumers 24-hours a day, 7-days a week while maintaining the quality of electricity supply. The quality of electricity supply means the consumer demands be met at specified voltage and frequency levels without over loaded, under/over voltage operation of any of the power network components. The operation of a power network is different at different times due to changing consumer demands and development of any faulty/contingency situation. In other words healthy operating power network is constantly subjected to small and large disturbances. These disturbances could be consumer/operator initiated, or initiated by overload and under/over voltage alleviating functions collectively referred to as security control functions and various optimization functions such as economic operation and minimization of losses, or caused by a fault/contingency incident.

For example, a power network is operating healthy and meeting quality electricity needs of its consumers. A fault occurs on a line or a transformer or a generator which faulty component gets isolated from the rest of the healthy network by virtue of the automatic operation of its protection. Such a disturbance would cause a change in the pattern of power flows in the network, which can cause over loading of one or more of the other components and/or over/under voltage at one or more nodes in the rest of the network. This in turn can isolate one or more other components out of service by virtue of the operation of associated protection, which disturbance can trigger chain reaction disintegrating the power network.

Therefore, the most basic and integral part of all other functions including optimizations in power network operation and control is security control. Security control means controlling power flows so that no component of the network is over loaded and controlling voltages such that there is no over voltage or under voltage at any of the nodes in the network following a disturbance small or large. As is well known, controlling electric power flows include both controlling real power flows which is given in MWs, and controlling reactive power flows which is given in MVARs. Security control functions or alternatively overloads alleviation and over/under voltage alleviation functions can be realized through one or combination of more controls in the network. These involve control of power flow over tie line connecting other utility network, turbine steam/water/gas input control to control real power generated by each generator, load shedding function curtails load demands of consumers, excitation controls reactive power generated by individual generator which essentially controls generator terminal voltage, transformer taps control connected node voltage, switching in/out in capacitor/reactor banks controls reactive power at the connected node.

Control of an electrical power system involving power-flow control and voltage control commonly is performed according to a process shown in FIG. 7, which is a method of forming/defining and solving a loadflow computation model of a power network to affect control of voltages and power flows in a power system comprising the steps of:

Step-10: obtaining on-line/simulated data of open/close status of all switches and circuit breakers in the power network, and reading data of operating limits of components of the power network including maximum power carrying capability limits of transmission lines, transformers, and PV-node, a generator-node where Real-Power-P and Voltage-Magnitude-V are given/assigned/specified/set, maximum and minimum reactive power generation capability limits of generators, and transformers tap position limits, or stated alternatively in a single statement as reading operating limits of components of the power network, Step-20: obtaining on-line readings of given/assigned/specified/set Real-Power-P and Reactive-Power-Q at PQ-nodes, Real-Power-P and voltage-magnitude-V at PV-nodes, voltage magnitude and angle at a reference/slack node, and transformer turns ratios, wherein said on-line readings are the controlled variables/parameters, Step-30: performing loadflow computation to calculate, depending on loadflow computation model used, complex voltages or their real and imaginary components or voltage magnitude corrections and voltage angle corrections at nodes of the power network providing for calculation of power flow through different components of the power network, and to calculate reactive power generation and transformer tap-position indications, Step-40: evaluating the results of Loadflow computation of step-30 for any over loaded power network components like transmission lines and transformers, and over/under voltages at different nodes in the power system, Step-50: if the system state is acceptable implying no over loaded transmission lines and transformers and no over/under voltages, the process branches to step-70, and if otherwise, then to step-60, Step-60: correcting one or more controlled variables/parameters set in step-20 or at later set by the previous process cycle step-60 and returns to step-30, Step-70: affecting a change in power flow through components of the power network and voltage magnitudes and angles at the nodes of the power network by actually implementing the finally obtained values of controlled variables/parameters after evaluating step finds a good power system or stated alternatively as the power network without any overloaded components and under/over voltages, which finally obtained controlled variables/parameters however are stored for acting upon fast in case a simulated event actually occurs or stated alternatively as actually implementing the corrected controlled variables/parameters to obtain secure/correct/acceptable operation of power system.

This paragraph provides an alternative description, of the above paragraph, that recites use of a generic single processor computer and then also recites use of a patented prior art multi-processor parallel computer. Control of an electrical power system involving power-flow control and voltage control commonly is performed according to a process shown in FIG. 7, which is a method of forming/defining and solving a loadflow computation model of a power network to affect control of voltages and power flows in a power system comprising the steps of:

Step-10: obtaining on-line/simulated data, via an input port into a random access memory (RAM) of a computer using its processor, of open/close status of all switches and circuit breakers in the power network, and reading data, via the input port into the RAM of the computer using its processor, of operating limits of components of the power network including maximum Voltage×Ampere (VA or MVA) carrying capability limits of transmission lines, transformers, and PV-node, a generator-node where Real-Power-P and Voltage-Magnitude-V are given/assigned/specified/set, maximum and minimum reactive power generation capability limits of generators, transformers tap position limits, and water/steam inlet limits of turbines driving generators or stated alternatively in a single statement as reading operating limits of components of the power network, Step-20: obtaining on-line readings, via the input port into the RAM of the computer using its processor, of given/assigned/specified/set Real-Power-P and Reactive-Power-Q at PQ-nodes, Real-Power-P and voltage-magnitude-V at PV-nodes, voltage magnitude and angle at a reference/slack node, and transformer turns ratios, wherein said on-line readings are the controlled variables/parameters, Step-30: performing loadflow computation, using the computer comprising the processor, the RAM, and the inputs and outputs, by forming and solving a loadflow computation model of the power network to calculate, complex voltages or their real and imaginary components or voltage magnitudes and voltage angles at the nodes of the power network providing for calculation of power flow through components of the power network, and to calculate reactive power generations at the PV-nodes and the slack node, real power generation at the slack node and tap-position indications of tap-changing transformers in dependence of the said obtained on-line readings of given/assigned/specified/set values of the controlled variables or parameters, Step-40: evaluating the results of loadflow computation of step-30, using the processor of the computer, for any over loaded components and for under or over voltage at any of the nodes of the power network by comparing with data of operational limits of the components and the variables/parameters of the power network, stored and available in the RAM of the computer, Step-50: if the system state is acceptable implying no over loaded components and no under or over voltage at any of the nodes of the power network, the process branches to step-70, or otherwise, the next step-60, Step-60: correcting one or more controlled variables/parameters set in step-20 or at later set by the previous process cycle step-60 and returns to step-30, Step-70: affecting a change in power flow through components of the power network and voltage magnitudes and angles at the nodes of the power network by actually implementing the finally obtained values of controlled variables/parameters after evaluating step finds a good power system or stated alternatively the power network without any overloaded components and under/over voltages or stated alternatively as actually implementing the corrected controlled variables/parameters to obtain secure/correct/acceptable operation of power system, using the computer and digital to analog converters whose inputs are connected to output ports of the computer and outputs are connected to electromagnetic field controllers (exciters) of PV-node generators, transformer tap position controllers, and steam/water inlet controllers of turbines driving the generators.

The above steps are provided that recites use of the generic single processor computer, which is an integral part of the process of secured operation of power system.

OR

However, the use of the generic single processor computer can be replaced by reciting the use of specific the patented prior art multi-processor parallel computer, as detailed in the following.

Step-10: obtaining on-line/simulated data, via an input port into a shared random access memory (RAM) of a parallel computer using its a main processor, of open/close status of all switches and circuit breakers in the power network, and reading data, via the input port into the shared RAM of the parallel computer using it's the main processor, of operating limits of components of the power network including maximum Voltage×Ampere (VA or MVA) carrying capability limits of transmission lines, transformers, and PV-node, a generator-node where Real-Power-P and Voltage-Magnitude-V are given/assigned/specified/set, maximum and minimum reactive power generation capability limits of generators, transformers tap position limits, and water/steam inlet limits of turbines driving generators or stated alternatively in a single statement as reading operating limits of components of the power network, Step-20: obtaining on-line readings, via the input port into the shared RAM of the parallel computer using it's the main processor, of given/assigned/specified/set Real-Power-P and Reactive-Power-Q at PQ-nodes, Real-Power-P and voltage-magnitude-V at PV-nodes, voltage magnitude and angle at a reference/slack node, and transformer turns ratios, wherein said on-line readings are the controlled variables/parameters, Step-30: performing loadflow computation, using the parallel computer comprising the main processor, multiple processing units (PUs) each having its own private memory, the shared RAM among all processors, and the inputs and outputs, by forming and solving a loadflow computation model of the power network to calculate, complex voltages or their real and imaginary components or voltage magnitudes and voltage angles at the nodes of the power network providing for calculation of power flow through components of the power network, and to calculate reactive power generations at the PV-nodes and the slack node, real power generation at the slack node and tap-position indications of tap-changing transformers in dependence of the said obtained on-line readings of given/assigned/specified/set values of the controlled variables/parameters, Step-40: evaluating the results of loadflow computation of step-30, using the main processor of the parallel computer, for any over loaded components and for under or over voltage at any of the nodes of the power network by comparing with data of operational limits of the components and the variables/parameters of the power network, obtained in step-10 and step-20 and available in the shared RAM of the parallel computer, Step-50: if the system state is acceptable implying no over loaded components and no under or over voltage at any of the nodes of the power network, the process branches to step-70, otherwise, to the next step-60, Step-60: correcting one or more controlled variables/parameters, using the main processor of the parallel computer, set in step-20 or at later set by the previous process cycle step-60 and returns to step-30, Step-70: affecting a change in power flow through components of the power network and voltage magnitudes and angles at the nodes of the power network by actually implementing the finally obtained values of controlled variables/parameters after evaluating step finds a good power system or stated alternatively the power network without any overloaded components and under/over voltages or stated alternatively as actually implementing the corrected controlled variables/parameters to obtain secure/correct/acceptable operation of power system, using the computer and digital to analog converters whose inputs are connected to output ports of the computer and outputs are connected to electromagnetic field controllers (exciters) of PV-node generators, transformer tap position controllers, and steam/water inlet controllers of turbines driving the generators.

Overload and under/over voltage alleviation functions produce changes in controlled variables/parameters in step-60 of FIG. 7. In other words controlled variables/parameters are assigned or changed to the new values in step-60. This correction in controlled variables/parameters could be even optimized in case of simulation of all possible imaginable disturbances including outage of a line and loss of generation for corrective action stored and made readily available for acting upon in case the simulated disturbance actually occurs in the power network. In fact simulation of all possible imaginable disturbances is the modern practice because corrective actions need be taken before the operation of individual protection of the power network components.

It is obvious that loadflow computation consequently is performed many times in real-time operation and control environment and, therefore, efficient and high-speed loadflow computation is necessary to provide corrective control in the changing power system conditions including an outage or failure of any of the power network components. Moreover, the loadflow computation must be highly reliable to yield converged solution under a wide range of system operating conditions and network parameters. Failure to yield converged loadflow solution creates blind spot as to what exactly could be happening in the network leading to potentially damaging operational and control decisions/actions in capital-intensive power utilities.

The power system control process shown in FIG. 7 is very general and elaborate. It includes control of power-flows through network components and voltage control at network nodes. However, the control of voltage magnitude at connected nodes within reactive power generation capabilities of electrical machines including generators, synchronous motors, and capacitor/inductor banks, and within operating ranges of transformer taps is normally integral part of loadflow computation as described in "LTC Transformers and MVAR violations in the Fast Decoupled Load Flow, IEEE Trans., PAS-101, No. 9, PP. 3328-3332, September 1982." If under/over voltage still exists in the results of loadflow computation, other control actions, manual or automatic, may be taken in step-60 in the above and in FIG. 7. For example, under voltage can be alleviated by shedding some of the load connected.

The prior art and present invention are described using the following symbols and terms:

$Y_{pq}=G_{pq}+jB_{pq}$: (p-q) th element of nodal admittance matrix without shunts
$Y_{pp}=G_{pp}+jB_{pp}$: p-th diagonal element of nodal admittance matrix without shunts
$y_p=g_p+jb_p$: total shunt admittance at any node-p
$V_p=e_p+jf_p=V_p\angle\theta_p$: complex voltage of any node-p
$V_s=e_s+jf_s=V_s\angle\theta_s$: complex slack-node voltage
$\Delta\theta_p, \Delta V_p$: voltage angle, magnitude corrections
$\Delta f_p, \Delta e_p$: imaginary, real part of complex voltage corrections
$S_p=P_p+jQ_p$: net nodal injected power, calculated
$SSH_p=PSH_p+jQSH_p$: net nodal injected power, scheduled/specified
$\Delta S_p=SSH_p-S_p=\Delta P_p+j\Delta Q_p$: nodal power residue or mismatch
$RP_p+jRQ_p$: modified nodal power residue or mismatch
$RI_p+jII_p$: net nodal injected current, calculated
$\Delta RI_p+j\Delta II_p$: nodal injected current residue or mismatch
$RRI_p+jRII_p$: modified nodal current residue or mismatch
$C_p=1\angle\Phi_p=\cos\Phi_p+j\sin\Phi_p$: Unitary rotation/transformation
m: number of PQ-nodes
k: number of PV-nodes
n=m+k+l: total number of nodes
q>p: node-q is connected to node-p excluding the case of q=p
[ ]: indicates enclosed variable symbol to be a vector or matrix
LRA: Limiting Rotation Angle, −48° for invented models
PQ-node: load-node, where, Real-Power-P and Reactive-Power-Q are specified
PV-node: generator-node, where, Real-Power-P and Voltage-Magnitude-V are specified
$V_s\approx V_B\approx V_N$: Slack-node voltage magnitude, Base value, and Nominal value of voltage magnitude are very closely similar, and therefore, they can be used interchangeably. However, in the following development only $V_s$ will be used. Particularly, in the treatment of loadflow problem with distributed slack-node, there is no specific slack-node and $V_B$ or $V_N$ can be used.
Computation or Mathematical Model: A set of mathematical relations or equations describing a natural physical reality like the weather, the cosmic space, a human body or an animal body, a biological organ, a digestive system, a blood circulation system, a biological cell, an atom, a molecule etc. or a man-made physical reality like an equipment, an apparatus, a device, a network, a system, a material etc. Alternatively it can be said that the computation or mathematical model constitutes a set of mathematical relations or equations describing a natural physical/biological or man-made physical/biological reality.
Computation or Mathematical Method: A sequence of steps used to solve a set of relations or equations describing the natural or man-made physical/biological reality. It can be said that the Computation or Mathematical Method constitutes a sequence of steps used to solve the Computation or Mathematical Model of the natural or man-made physical/biological reality.
A node: It is a junction of many lines or branches as in networks, circuits, roads etc. directly connecting to other nodes. It is also a cell (physical or biological) or an atom or a molecule whose surface directly touches surfaces of adjacent cells or atoms or molecules. Form/shape of the cell can be any including concentric circles and finite elements.

A node and its directly connected nodes: A node including its directly connected nodes connected by lines or branches as in networks, circuits, roads etc. It is also a cell (physical or biological) or an atom or a molecule and its directly touching/connected surrounding cells (physical or biological) or atoms or molecules.

Loadflow Computation: Each node in a power network is associated with four electrical quantities, which are voltage magnitude, voltage angle, real power, and reactive power. The loadflow computation involves calculation/determination of two unknown electrical quantities for other two given/specified/scheduled/set/known electrical quantities for each node. In other words the loadflow computation involves determination of unknown quantities in dependence on the given/specified/scheduled/set/known electrical quantities.

Loadflow Model: a set of equations describing the physical power network and its operation for the purpose of loadflow computation. The term 'loadflow model' can be alternatively referred to as 'model of the power network for loadflow computation'. The process of writing Mathematical equations that describe physical power network and its operation is called Mathematical Modeling. If the equations do not describe/represent the power network and its operation accurately the model is inaccurate, and the iterative loadflow computation method could be slow and unreliable in yielding converged loadflow computation. There could be variety of Loadflow Models depending on organization of set of equations describing the physical power network and its operation, including Fast Super Decoupled Loadflow (FSDL) Model, and Super Super Decoupled Loadflow (SSDL) Model.

Loadflow Method: sequence of steps used to solve a set of equations describing the physical power network and its operation for the purpose of loadflow computation is called Loadflow Method, which term can alternatively be referred to as 'loadflow computation method' or 'method of loadflow computation'. One word for a set of equations describing the physical power network and its operation is: Model. In other words, sequence of steps used to solve a Loadflow Model is a Loadflow Method. The loadflow method involves definition/formation of a loadflow model and its solution. There could be variety of Loadflow Methods depending on a loadflow model and iterative scheme used to solve the model including Fast Super Decoupled Loadflow (FSDL) Method, and Super Super Decoupled Loadflow (SSDL) Method. All decoupled loadflow methods described in this application use either successive (1θ, 1V) iteration scheme or simultaneous (1V, 1θ) iteration scheme, defined in the following.

Prior art method of loadflow computation of the kind carried out as step-30 in FIG. 7, include a class of methods known as decoupled loadflow. This class of methods consists of decouled loadflow and super decoupled loadflow methods including Super Super Decoupled Loadflow method all formulated involving Power Mismatch computation and polar coordinates. Prior-art Loadflow Computation Methods are described in details in the documents of Research Publications and granted patents cited in Information Disclosure Statement (IDS) by this inventor. Therefore, prior art methods will not be described here.

SUMMARY OF THE INVENTION

It is a primary object of the present invention to improve convergence and efficiency of the prior art Super Super Decoupled Loadflow computation method under wide range of system operating conditions and network parameters for use in power flow control and voltage control in the power system. A further object of the invention is to reduce computer storage/memory or calculating volume requirements.

The above and other objects are achieved, according to the present inventions, Exactly formulated, and Accurately and Reliably convergent Incremental Gauss-Seidel Loadflow (EARIGSL), Y matrix based—Patel Loadflow (CPL & HCPL), Patel Loadflow (PL-1 & PL-2), Patel Super Decoupled Loadflow (PSDL-YY & HPSDL-YY), and Sparse Z or $C^{-1}$ matrix—Patel Loadflow (SZPL or SCIPL) Methods and their many variants, for loadflow calculation for Electrical Power System. In context of voltage control, one of the inventive systems of SZPL and others listed in the above methods of loadflow computation is used for Electrical Power system consisting of plurality of electromechanical rotating machines, transformers and electrical loads connected in a network, each machine having a reactive power characteristic and an excitation element which is controllable for adjusting the reactive power generated or absorbed by the machine, and some of the transformers each having a tap changing element, which is controllable for adjusting turns ratio or alternatively terminal voltage of the transformer, said system comprising:

means defining and solving one of the loadflow models of the power network listed in the above for providing an indication of the quantity of reactive power to be supplied by each generator including the reference/slack node generator, and for providing an indication of turns ratio of each tap-changing transformer in dependence on the obtained-online or given/specified/set/known controlled network variables/parameters, and physical limits of operation of the network components, machine control means connected to the said means defining and solving loadflow model and to the excitation elements of the rotating machines for controlling the operation of the excitation elements of machines to produce or absorb the amount of reactive power indicated by said means defining and solving loadflow model in dependence on the set of obtained-online or given/specified/set controlled network variables/parameters, and physical limits of excitation elements, transformer tap position control means connected to the said means defining and solving loadflow model and to the tap changing elements of the controllable transformers for controlling the operation of the tap changing elements to adjust the turns ratios of transformers indicated by the said means defining and solving loadflow model in dependence on the set of obtained-online or given/specified/set controlled network variables/parameters, and operating limits of the tap-changing elements.

The method and system of voltage control according to the preferred embodiment of the present invention provide voltage control for the nodes connected to PV-node generators and tap changing transformers for a network in which real power assignments have already been fixed. The said voltage control is realized by controlling reactive power generation and transformer tap positions.

One of the inventive methods of defining and solving loadflow computation models EARIGSL, CPL, HCPl, PL-1, PL-2, PSDL-YY, HPSDL-YY, SZPL or SCIPL can be used for voltage control in Electrical power System. For this purpose real and reactive power assignments or settings at PQ-nodes, real power and voltage magnitude assignments or settings at PV-nodes and transformer turns ratios, open/close status of all circuit breaker, the reactive capability characteristic or curve for each machine, maximum and minimum tap positions limits of tap changing transformers, operating limits of all other network components, and the impedance or admittance of all lines are supplied. A decoupled loadflow system of equations {(55) and (56)} or {(57) and (58)} is solved by an iterative process until convergence. During this solution the quantities which can vary are the real and reactive power at the reference/slack node, the reactive power set points for each PV-node generator, the transformer transformation ratios, and voltages on all PQ-nodes nodes, all being held within the specified ranges. When the iterative process converges to a solution, indications of reactive power generation at PV-nodes and transformer turns-ratios or tap-settings are provided. Based on the known reactive power capability characteristics of each PV-node generator, the determined reactive power values are used to adjust the excitation current to each generator to establish the reactive power set points. The transformer taps are set in accordance with the turns ratio indication provided by the system of loadflow computation.

For voltage control, system of PSDL-YY or others and many variants listed in the above Methods of Loadflow computation can be employed either on-line or off-line. In off-line operation, the user can simulate and experiment with various sets of operating conditions and determine reactive power generation and transformer tap settings requirements. A general-purpose computer can implement the entire system. For on-line operation, the loadflow computation system is provided with data identifying the current real and reactive power assignments and transformer transformation ratios, the present status of all switches and circuit breakers in the network and machine characteristic curves in steps-10 and -20 in FIG. 7, and steps 12, 14, 18, 22, 24, 32, 34, and 38 in FIG. 8 described below. Based on this information, a model of the system based on coefficient matrices of invented loadflow computation systems provide the values for the corresponding node voltages, reactive power set points for each machine and the transformation ratio and tap changer position for each transformer.

The present inventive system of loadflow computation for Electrical Power System consists of, one of the Patel Super Decoupled Loadflow: PSDL-YY or PSDL-B'B', or others listed in the above Methods characterized in that 1) single decoupled coefficient matrix solution requiring only 50% of memory used by prior art methods, 2) the presence of transformed values of known/given/specified/scheduled/set quantities in the diagonal elements of the gain matrices [Yf] and [Ye] of the decoupled loadflow sub-problems, and 3) transformation angles are restricted to maximum of $-0°$ to $-90°$ (say, $-48°$) to be determined experimentally, 4) PV-nodes being active in both RI-f and II-e sub-problems, PQ-node to PV-node and PV-node to PQ-node switching is simple to implement, and these inventive loadflow computation steps together yield some processing acceleration and consequent efficiency gains, and are each individually inventive, and 5) modified real and imaginary current mismatches at PV-nodes in case of PSDL-YY, SSDL-YY, ESSDL-YY or their generalized variations PSDL-B'B', SSDL-B'B', ESSDL-B'B', are determined as $RRI_p=(L_pf_p+e_p\Delta P_p)/[K_p(e_p^2+f_p^2)]$ and $RII_p=(L_pe_p-f_p\Delta P_p)/[K_p(e_p^2+f_p^2)]$ in order to keep gain matrices [Yf] and [Ye] symmetrical. If the value of factor $K_p=1$, the gain matrices [Yf] and [Ye] becomes unsymmetrical in that elements in the rows corresponding to PV-nodes are defined without transformation or rotation applied, as $Yf_{pq}=Ye_{pq}=-B_{pq}$. It is possible that Patel Super Decoupled methods can be formulated in polar coordinates by simply replacing correction vectors [$\Delta f$] and [$\Delta e$] in equations (55) and (56) and subsequently followed equations by correction vectors [$\Delta \theta$] and [$\Delta V$]. However, it will not be easy to have single gain matrix model, because [$\Delta V$] for PV-nodes is zero and absent.

BRIEF DESCRIPTION OF DRAWINGS

FIG. 1 is a flow-chart embodiment of the invented EARIGSL computation method.

FIG. 2 is a flow-chart embodiment of the invented Y matrix based Patel Loadflow (CPL) computation method using complex algebra, and FIG. 2a an embodiment of alternative version of CPL computation method.

FIG. 3 is a flow-chart embodiment of the invented Y matrix based Hybrid Patel Loadflow (HCPL) computation method using complex algebra.

FIG. 4 is a flow-chart embodiment of the invented PSDL-YY computation method.

FIG. 5 is a flow-chart embodiment of the invented method of sparse [Z] or [C]$^{-1}$ based Patel Loadflow (SZPL) or (SCIPL) computation method using complex algebra, and FIG. 5a is an alternative version of SZPL or SCIPL.

FIG. 5b is an embodiment of sequential SZPL method using generic single processor computer into FIG. 1.

FIG. 5c is an embodiment of parallel SZPL method using patented prior art multi-processor parallel computer into FIG. 3b of U.S. Pat. No. 7,788,051 using multi-processor parallel computer and modified for incremental formulation of SZPL.

FIG. 6 is a flow-chart embodiment of the invented hybrid method of sparse [Z] or [C]$^{-1}$ based Patel Loadflow (HSZPL) or (HSCIPL) computation method using complex algebra.

FIG. 7 is a flow-chart of the overall controlling method for an electrical power system involving loadflow computation as a step which can be executed using one of the loadflow computation methods embodied in FIG. 1, 2, 3, 4, 5 or 6.

FIG. 8 is a flow-chart of the simple special case of voltage control system in overall controlling system of FIG. 7 for an electrical power system.

FIG. 9 is a one-line diagram of an exemplary 6-node power network having a reference/slack/swing node, two PV-nodes, and three PQ-nodes.

FIG. 10a is a parallel computer organization/architecture that can be applied for parallel solution of SZPL or SCIPL and EARIGSL methods (U.S. Pat. No. 7,788,051 of year 2010).

FIG. 10b is a parallel computer organization/architecture with wireless interconnect that can be applied for parallel solution of SZPL or SCIPL and EARIGSL methods (U.S. Pat. No. 9,891,827 of year 2018).

DESCRIPTION OF A PREFERRED EMBODIMENT

A loadflow computation is involved as a step in power flow control and/or voltage control in accordance with FIG.

7 or FIG. 8. A preferred embodiment of the present invention is described with reference to FIG. 8 as directed to achieving voltage control.

FIG. 9 is a simplified one-line diagram of an exemplary utility power network to which the present invention may be applied. The fundamentals of one-line diagrams are described in section 6.11 of the text ELEMENTS OF POWER SYSTEM ANALYSIS, fourth edition, by William D. Stevenson, Jr., McGrow-Hill Company, 1982. In FIG. 9 each thick vertical line is a network node. The nodes are interconnected in a desired manner by transmission lines and transformers each having its impedance, which appears in the loadflow models. Two transformers in FIG. 9 are equipped with tap changers to control their turns ratios in order to control terminal voltage of node-1 and node-2 where large loads are connected.

Node-6 is a reference/slack-node alternatively referred to as the slack or swing-node, representing the biggest power plant in a power network. Nodes-4 and -5 are PV-nodes where generators are connected, and nodes-1, -2, and -3 are PQ-nodes where loads are connected. It should be noted that the nodes-4, -5, and -6 each represents a power plant that contains many generators in parallel operation. The single generator symbol at each of the nodes-4, -5, and -6 is equivalent of all generators in each plant. The power network further includes controllable circuit breakers located at each end of the transmission lines and transformers, and depicted by cross markings in one-line diagram of FIG. 9. The circuit breakers can be operated or in other words opened or closed manually by the power system operator or relevant circuit breakers operate automatically consequent of unhealthy or faulty operating conditions. The operation of one or more circuit breakers modify the configuration of the network. The arrows extending certain nodes represent loads.

A goal of the present invention is to provide a reliable and computationally efficient loadflow computation that appears as a step in power flow control and/or voltage control systems of FIG. 7 and FIG. 8. However, the preferred embodiment of loadflow computation as a step in control of terminal node voltages of PV-node generators and tap-changing transformers is illustrated in the flow diagram of FIG. 8 in which present invention resides in function steps 91 and 92.

Short description of other possible embodiment of the present invention is also provided herein. The present invention relates to control of utility/industrial power networks of the types including plurality of power plants/generators and one or more motors/loads, and connected to other external utility. In the utility/industrial systems of this type, it is the usual practice to adjust the real and reactive power produced by each generator and each of the other sources including synchronous condensers and capacitor/inductor banks, in order to optimize the real and reactive power generation assignments of the system. Healthy or secure operation of the network can be shifted to optimized operation through corrective control produced by optimization functions without violation of security constraints. This is referred to as security constrained optimization of operation. Such an optimization is described in the U.S. Pat. No. 5,081,591 dated Jan. 13, 1992: "Optimizing Reactive Power Distribution in an Industrial Power Network", where the present invention can be embodied by replacing the step nos. 56 and 66 each by a step of constant gain matrices [Yf] and [Ye], and replacing steps of "Exercise Newton-Raphson Algorithm" by steps of "Exercise EARIGSL or CPL or HCPL, PSDL-YY or HPSDL-YY or SZPL or SCIPL or HSZPL or HSCIPL Computation" in places of steps 58 and 68. This is just to indicate the possible embodiment of the present invention in optimization functions like in many others including state estimation function. However, invention is being claimed through a simplified embodiment without optimization function as in FIG. 8 in this application. The inventive steps-91 and -92 in FIG. 8 are different than those corresponding steps-56, and -58, which constitute a well-known Newton-Raphson loadflow method, and were not inventive even in U.S. Pat. No. 5,081,591.

In FIG. 8, function step 81 provides stored impedance values of each network component in the system. This data is modified in a function step 82, which contains stored information about the open or close status of each circuit breaker. For each breaker that is open, the function step 82 assigns very high impedance to the associated line or transformer. The resulting data is than employed in a function step 83 to establish an admittance matrix for the power network. The data provided by function step 81 can be input by the computer operator from calculations based on measured values of impedance of each line and transformer, or on the basis of impedance measurements after the power network has been assembled.

Each of the transformers T1 and T2 in FIG. 9 is a tap changing transformer having a plurality of tap positions each representing a given transformation ratio. An indication of initially assigned transformation ratio for each transformer is provided by function step 84 in FIG. 8.

The indications provided by function steps 82, and 85 are supplied to a function step 91 in which constant gain matrices [Yf] and [Ye], or [Y] or sparse [Z] or sparse $[C]^{-1}$ of any of the invented EARIGSL or PSDL-YY or HPSDL-YY or CPL or HCPL or SZPL or SCIPL, or HZPL or HSCIPL models are constructed, factorized or inverted and stored. The coefficient matrices [Yf] and [Ye], or [C] or sparse $[C]^{-1}$ or sparse [Z] are conventional tools employed for solving PSDL-YY or HPSDL-YY or CPL or HCPL or SZPL or SCIPL or HZPL or HSCIPL models defined by equations {(7) or (9)} or {(16) or (18)} or {(55) and (56)} or {(57) and (58)} or {(76) or (77)} of a power system. [C] is the most general representation of all possible matrices involved in the solution of linear and non-linear simultaneous algebraic equations. [C] could be the Jacobian, approximated Jacobian, constant Jacobian, approximated constant decoupled Jacobian in case of Newton-Raphson based approaches. It could be the coefficient matrix, approximated coefficient matrix, constant coefficient matrix, approximated constant decoupled coefficient matrix in case of Patel Numerical Method (PNM) based approaches described as preferred embodiments in this application. $[C]^{-1}$ when fully inverted is the full matrix. However, it can be made sparse by storing and processing only selected elements, and it becomes approximation of fully inverted $[C]^{-1}$.

Indications of initial reactive power, or Q on each node, based on initial calculations or measurements, are provided by a function step 85 and these indications are used in function step 86, to assign a Q level to each generator and motor. Initially, the Q assigned to each machine can be the same as the indicated Q value for the node to which that machine is connected.

An indication of measured real power, P, on each node is supplied by function step 87. Indications of assigned/specified/scheduled/set generating plant loads that are constituted by known program are provided by function step 88, which assigns the real power, P, load for each generating plant on the basis of the total P, which must be generated within the power system. The value of P assigned to each power plant represents an economic optimum, and these values represent fixed constraints on the variations, which can be made by the system according to the present invention. The indications provided by function steps 87 and 88 are supplied to function step 89 which adjusts the P distribution on the various plant nodes accordingly. Function step 90 assigns initial approximate or guess solution to begin iterative method of loadflow computation, and reads data file of operating limits on power network components, such as maximum and minimum reactive power generation capability limits of PV-nodes generators.

The indications provided by function steps 86, 89, 90 and 91 are supplied to function step 92 where inventive EARIGSL or CPL or HCPL or PSDL-YY or HPSDL-YY or SZPL or SCIPL or HZPL or HSCIPL model solution is carried out, the results of which appear in function step 93. The loadflow computation yields voltage magnitudes and voltage angles at PQ-nodes, real and reactive power generation by the reference/slack/swing node generator, voltage angles and reactive power generation indications at PV-nodes, and transformer turns ratio or tap position indications for tap changing transformers. The system stores in step 92 a representation of the reactive capability characteristic of each PV-node generator and these characteristics act as constraints on the reactive power that can be calculated for each PV-node generator for indication in step 93. The indications provided in step 93 actuate machine excitation control and transformer tap position control. All the loadflow computation methods using inventive EARIGSL or CPL or HCPL or PSDL-YY or HPSDL-YY or SZPL or SCIPL or HZPL or HSCIPL computation models can be used to affect efficient and reliable voltage control in power systems as in the process flow diagram of FIG. 8.

Particularly inventive EARIGSL or CPL or HCPL or PSDL-YY or HPSDL-YY or SZPL or SCIPL or HZPL or HSCIPL models in terms of equations for determining elements of vectors [RI'], [II'], [ΔRI'], [ΔII'], [I], [ΔI] and elements of coefficient matrices [Yf] and [Ye], or [C] or [Z] or sparse {[Z] or [C]$^{-1}$} are described followed by computation steps of corresponding methods are described.

The presence of values of known/given/specified/scheduled/set quantities in the diagonal elements of the coefficient matrix [Yf] and [Ye], or [C] or [Z] or sparse {[Z] or [C]$^{-1}$}, which takes different form for different methods, is brought about by such formulation of loadflow equations. The said quantities in the diagonal elements in the coefficient matrices improved convergence and the reliability of obtaining converged loadflow computation.

The slack-start is to use the same voltage magnitude and angle as those of the reference/slack/swing node as the initial guess solution estimate for initiating the iterative loadflow computation. With the specified/scheduled/set voltage magnitudes, PV-node voltage magnitudes are adjusted to their known values after the first P-θ iteration. This slack-start saves almost all effort of mismatch calculation in the first P-f iteration. It requires only shunt flows from each node to ground to be calculated at each node, because no flows occurs from one node to another because they are at the same voltage magnitude and angle.

Patel Numerical Method (PNM)

All inventions of this application are based on newly propounded Patel Numerical Method (PNM), which is applicable to both linear and nonlinear algebraic equations first of its kind in about 200 years.

Propounding Statement of the PNM:

A Let $y_p = f_p(x_q)$ or in more general form $y_p = f_p(x_p, x_q)$ be a system of n linear or non-linear simultaneous algebraic equations in n or 2n variables respectively, where subscripts p and q=1, 2, ..., n. It could also be a single equation in single variable. $y_p$ are "constant terms" or "known value terms", and $x_p$ and $x_q$ are "unknowns" or "variables" to be determined or calculated or solved for.

B. Subtract from each side the other side as: $y_p - f_p(x_q) = f_p(x_q) - y_p$ or $y_p - f_d(x_p, x_q) = f_p(x_p, x_q) - y_p$ transforming functional equations into equations of mismatches.

C. Express usually a right hand side as a product of the coefficient matrix and the vector of unknown variables or the correction vector of unknown variables to be determined after clubbing $y_p$ terms into diagonal terms with simple algebraic manipulations.

D. Solve such a matrix equation by iterations for the vector of unknown variables or the correction vector of unknown variables using evaluation of usually the left hand side vector of mismatches with guess values of unknown variables to begin with, and by inverting or factoring the coefficient matrix.

E. It is also possible to replace the coefficient matrix of right hand side by the Jacobian or its many possible variants by taking first order differentiations with respect to relevant real or complex valued variables of the right hand side, and the resulting numerical method may be referred to as Newton-Raphson-Patel (NRP) numerical method.

F. Such a matrix equation involving either coefficient matrix or Jacobian and its many possible variants can also be solved by Gauss or Gauss-Seidel iterations not requiring coefficient matrix factorization or inversion, and the resulting numerical methods may be referred to as Gauss-Patel (GP) and Gauss-Seidel-Patel (GSP) methods respectively.

G. Patel Numerical Method (PNM) is the first known formalized updating attempt to the classical numerical methods, and they can be referred to as Gauss-Patel (GP), Gauss-Seidel-Patel (GSP), and Newton-Raphson-Patel (NRP) methods, in addition to its being the new numerical method on its own.

H. When the right hand side is expressed as a product of the coefficient matrix and the correction vector of unknown variables, it can be shown to be an exact incremental formulation without invoking Taylor Series expansion and neglecting higher order terms.[.]

Preliminary investigations suggest that Patel Numerical Method may potentially produce monotonous convergence, and therefore may be amenable to acceleration factors unlike Newton-Raphson method.

Exactly formulated and, Accurately and Reliably Convergent Incremental Gauss-Seidel Loadflow (EARIGSL)

The complex conjugate power injected into the node-p of a power network is given by the equation (1). Its transformation into Patel's equation of mismatches and alternative versions are given by (2).

$$S_p^* = P_p - jQ_p = V_p^* \sum_{q=1}^{n} Y_{pq} V_q = V_p^*(Y_{pp} + y_p)V_p + V_p^* \sum_{q>p} Y_{pq} V_q \quad (1)$$

$$SSH_p^* - S_p^* = S_p^* - SSH_p^* \quad (2)$$

$$(PSH_p - jQSH_p) - V_p^*(Y_{pp} + y_p)V_p + V_p^* \sum_{q>p} Y_{pq} V_q = \quad (2)$$

$$V_p^*(Y_{pp} + y_p)V_p + V_p^* \sum_{q>p} Y_{pq} V_q - (PSH_p - jQSH_p)$$

-continued $$(\Delta S_p/V_p)^* = (Y_{pp} + y_p - SSH_p^*/V_p^2)V_p + \sum_{q>p} Y_{pq}V_q \quad (2)$$

$$(\Delta S_p/V_p)^* - L_pV_p = (Y_{pp} + y_p - L_p - SSH_p^*/V_p^2)V_p + \sum_{q>p} Y_{pq}V_q \quad (2)$$

$$(\Delta S_p/V_p)^* - L_pV_p - \sum_{q>p} Y_{pq}V_q = (Y_{pp} + y_p - L_p - SSH_p^*/V_p^2)V_p \quad (2)$$

$$V_p = \left[(\Delta S_p/V_p)^* - L_pV_p - \sum_{q>p} Y_{pq}V_q\right] / (Y_{pp} + y_p - L_p - SSH_p^*/V_p^2) \quad (2)$$

$$\Delta V_p = \left[(\Delta S_p/V_p)^* - L_pV_p\right]/(Y_{pp} + y_p - L_p - SSH_p^*/V_p^2) \quad (2)$$

$$\Delta V_p = \left[(\Delta S_p/V_p)^* - L_pV_p\right]/(Y_{pp} + y_p - L_p) \quad (2)$$

$$V_p = V_p + \Delta V_p \quad (3)$$

Where, $$L_p = -\infty, \ldots, -1, 0, +1, \ldots, +\infty \text{ (including fractions)} \quad (4)$$

$$P_p = \text{Re}\left\{V_p^* \sum_{q=1}^{n} Y_{pq}V_q\right\} \quad (5)$$

$$Q_p = -\text{Im}\left\{V_p^* \sum_{q=1}^{n} Y_{pq}V_q\right\} \quad (6)$$

Where, "Re" means "real part of" and "Im" means "imaginary part of". It should be noted that the equation (1) can also be written for complex power injected into the node-p, instead of complex conjugate power injected into the node-p. The EARIGS method is for solving a set of simultaneous linear and nonlinear algebraic equations iteratively. The EARIGSL-method calculates complex node voltage correction for any node-p as given by equation (2).

Iteration Process

Iterations start with the experienced/reasonable/logical guess for the solution. The reference node also referred to as the slack-node and its voltage being specified, starting solution guess is made for the remaining (n−1)-nodes in n-node network. Node voltage value is immediately updated with its newly calculated value in the iteration process in which one node voltage is calculated at a time using latest updated other node voltage values. A node voltage value calculation at a time process is iterated over (n−1)-nodes in an n-node network, the reference node voltage being specified not required to be calculated.

Now, for the iteration-(r+1), the complex voltage or complex voltage correction calculation at a PQ-node-p equation (2) and reactive power calculation at node-p equation (6), becomes:

$$V_p^{(r+1)} = \left[(\Delta S_p^*/(V_p^*)^r) - L_pV_p^r - \left(\sum_{q=1}^{p-1} Y_{pq}V_q^{(r+1)} + \sum_{q=p+1}^{n} Y_{pq}V_q^r\right)\right] / [Y_{pp} + y_p - L_p - SSH_p^*/(V_p^2)^r] \quad (7)$$

$$\Delta V_p^{(r+1)} = [(\Delta S_p^*/(V_p^*)^r) - L_pV_p^r]/[Y_{pp} + y_p - L_p - SSH_p^*/(V_p^2)^r] \quad (7)$$

$$\Delta V_p^{(r+1)} = [(\Delta S_p^*/(V_p^*)^r) - L_pV_p^r]/[Y_{pp} + y_p - L_p] \quad (7)$$

$$Q_p^r = -\text{Im}\left\{(V_p^*)^r \sum_{q=1}^{p-1} Y_{pq}V_q^{(r+1)} + (V_p^*)^r \sum_{q=p}^{n} Y_{pq}V_q^r\right\} \quad (8)$$

The well-known limitation of the Gauss-Seidel numerical method is not to be able to converge to the high accuracy solution, is being more specifically resolved by the introduction of the concept of self-iterations for only at Q-limit violated PV-node for calculated variable until convergence before proceeding to calculate the next. This is achieved by replacing equation (7) by equation (9) stated in the following where self-iteration-(sr+1) over a node variable itself within the global iteration-(r+1) over (n−1) nodes in the n-node network is depicted. During the self-iteration process only $V_p$ and its real and imaginary components change without affecting any of the terms involving $V_q$. At the start of the self-iteration $V_p^{sr} = V_p^r$, and at the convergence of the self-iteration $$V_p^{(r+1)} = V_p^{(sr+1)}.$$

$$(V_p^{(sr+1)})^{(r+1)} = \left[(\Delta S_p^*/(V_p^*)^{sr})^r - (L_p(V_p)^{sr})^r - \left(\sum_{q=1}^{p-1} Y_{pq}V_q^{(r+1)} + \sum_{q=p+1}^{n} Y_{pq}V_q^r\right)\right] / [(Y_{pp} + y_p - L_p - SSH_p^*/V_s^2)] \quad (9)$$

$$(\Delta V_p^{(sr+1)})^{(r+1)} = [(\Delta S_p^*/(V_p^*)^{sr})^r - (L_p(V_p)^{sr})^r]\left[\begin{array}{c} Y_{pp} + y_p - L_p - \\ SSH_p^*/(V_p^2)^{sr})^r \end{array}\right] \quad (9)$$

$$(\Delta V_p^{(sr+1)})^{(r+1)} = [(\Delta S_p^*/(V_p^*)^{sr})^r - (L_p(V_p)^{sr})^r]/[Y_{pp} + y_p - L_p] \quad (9)$$

Self-Convergence

The self-iteration process at a Q-limit violated PV-node is carried out until changes in the real and imaginary parts of the node-p voltage calculated in two consecutive self-iterations are less than the specified tolerance. It has been possible to establish a relationship between the tolerance specification for self-convergence and the tolerance specification for global-convergence. It is found sufficient for the self-convergence tolerance specification for change in real and reactive voltage to be the same as real and reactive power mismatch global-convergence tolerance specification. However, if real or reactive power mismatch is found greater than the global convergence tolerance in the solution, the self-convergence tolerance specification for change in real and reactive voltage is reduced by a factor of 10 and the global iteration process is resumed again.

$$|\Delta f_p^{(sr+1)}| = |f_p^{(sr+1)} - f_p^{sr}| < \varepsilon V\text{-self} \quad (10)$$

$$|\Delta e_p^{(sr+1)}| = |e_p^{(sr+1)} - e_p^{sr}| < \varepsilon V\text{-self} \quad (11)$$

For the global-convergence tolerance specification of εM=0.0001 pu of real and reactive power mismatches and εV=0.000001 pu for changes in real and reactive components of voltage from one iteration to the next, it has been found sufficient to have the self-convergence tolerance specification of εV-self=0.0001 pu of change in real and imaginary components of voltage in the first pass, and it is reduced to εV-self=0.00001 pu for the second and subsequent passes.

Convergence

There are indications that there is a need for two stages of solution process stopping criteria. The first stopping criterion is to carry out the iteration process until the real and reactive (both at PQ nodes) power mismatches are less then the specified tolerance as given by equations (12a) and (13a), along with real and imaginary parts of the set of PV-node voltages calculated in two consecutive iterations are all less than the specified tolerance as given by (12) and (13). In the second stopping criteria, iterations are continued until both the maximum real power mismatch (DPMX) at PQ+PV (N1) nodes and the maximum reactive power mismatch (DQMX) at PQ (N2) nodes are not less than the specified tolerance as given by equations (12a) and (13a). A typical value of εV-self=0.0001 pu in the first pass, and then εV-self=0.00001 pu in the second pass, and that of εM=0.0001 pu and εV=0.000001 pu.

$$|\Delta f_p^{(r+1)}|=|f_p^{(r+1)}-f_p^r|<|\varepsilon V: \quad \text{subscript} \quad P=N2+1,\ldots,N1(\text{number of }PV\text{-nodes})$$ (12)

$$|\Delta e_p^{(r+1)}|=|e_p^{(r+1)}-e_p^r|<|\varepsilon V: \quad \text{subscript} \quad P=N2+1,\ldots,N1(\text{number of }PV\text{-nodes})$$ (13)

$$|\Delta P_p^{(r+1)}|<\varepsilon M: \text{ subscript } P=1,2,\ldots,N1(\text{number of }PQ+PV\text{-nodes})$$ (12a)

$$|\Delta Q_p^{(r+1)}|<\varepsilon M: \text{ subscript } P=1,2,\ldots,N2(\text{number of }PQ\text{-nodes})$$ (13a)

Accelerated Convergence

The EARIGSL-method being inherently slow to converge, it is characterized by the use of an acceleration factor applied to the difference in calculated node voltage between two consecutive iterations to speed-up the iterative solution process. The accelerated value of node-p voltage at iteration-(r+1) is given by, $$V_p^{(r+1)}(\text{accelerated})=V_p^r+\beta(V_p^{(r+1)}-V_p^r)$$ (14)

Where, β is the real number called acceleration factor, the value of which for the best possible convergence for any given network can be determined by trial solutions. The EARIGS-method is very sensitive to the choice of β, causing very slow convergence and even divergence for the wrong choice.

Scheduled or Specified Voltage at a PV-Node

Of the four variables voltage magnitude, voltage angle, real power, and reactive power; real power $PSH_p$ and voltage magnitude $VSH_p$ are scheduled/specified/set at a PV-node. If the reactive power calculated using $VSH_p$ at the PV-node is within the upper and lower generation capability limits of a PV-node generator, it is capable of holding the specified voltage at its terminal. Therefore the complex voltage calculated by equation (7) or (9) by using actually calculated reactive power $Q_p$ in place of $QSH_p$ is adjusted to specified voltage magnitude by equation (15). However, in case of violation of upper or lower generation capability limits of a PV-node generator, a violated limit value is used for $QSH_p$ in (9), meaning a PV-node generator is no longer capable of holding its terminal voltage at its scheduled voltage magnitude $VSH_p$, and the PV-node is switched to a PQ-node type.

$$V_p^{(r+1)}=(VSH_p\, V_p^{(r+1)})/|V_p^{(r+1)}|$$ (15)

Calculation Steps of EARIGSL Method

The steps of loadflow calculation by EARIGSL method are shown in the flowchart of FIG. 1. Referring to the flowchart of FIG. 1, different steps are elaborated in steps marked with similar numbers in the following. The words "Read system data" in Step-1 correspond to step-10 and step-20 in FIG. 7, and step-83, step-84, step-86, step-89, step-90 in FIG. 8. All other steps in the following correspond to step-30 in FIG. 7, and step-91, step-92, and step-93 in FIG. 8. It should be noted that explicit test for convergence of change in real and imaginary components of voltages of PV-nodes from one iteration to the next is not required as per FIGS. 2, 3, 5, and 6. However, it is included in this EARIGSL method for the sake of completeness.

1. Read system data and assign an initial approximate solution. If better solution estimate is not available, set specified voltage magnitude at PV-nodes, 1.0 p.u. voltage magnitude at PQ-nodes, and all the node angles equal to that of the slack-node angle, which is referred to as the flat-start.
2. Form nodal admittance matrix, Initialize iteration count r=1, and define convergence tolerances (say, εM=0.0001 pu, εV-self=0.0001 pu and εV=0.000001 pu).
3. Scan all the node of a network, except the slack-node whose voltage having been specified need not be calculated. Initialize node count p=1, and initialize maximum change in real and imaginary parts of node voltage variables DVMX=0.0, and maximum of real and reactive power mismatches DSMX=0.0.
4. Test for the type of a node at a time. For the slack-node go to step-13, for a PQ-node go to the step-8, and for a PV-node follow the next step.
5. Compute $Q_p^{(r+1)}$ at a PV-node using quation (8) after adjusting its complex voltage for specified value by equation (15), and perform $QSH_p=Q_p^{(r+1)}$.
6. If $Q_p^{(r+1)}$ is greater than the upper reactive power generation capability limit of the PV-node generator, set $QSH_p$=the upper limit $Q_p^{max}$ for use in equation (9), and go to step-11. If not, follow the next step.
7. If $Q_p^{(r+1)}$ is less than the lower reactive power generation capability limit of the PV-node generator, set $QSH_p$=the lower limit $Q_p^{max}$ for use in equation (9), and go to step-11. If not, follow the next step.
8. Compute $\Delta S_p^{(r+1)}$ as per left hand side of equation (2) using $QSH_p=Q_p^{(r+1)}$, determine $\Delta P_p^{(r+1)}$ and $\Delta Q_p^{(r+1)}$, and replace current value of DSMX in case any of them is larger, and if DSMX is less than or equal to εM (typical value 0.0001 pu), go to step-13, or else follow the next step.
9. Compute $\Delta V_p^{(r+1)}$ by equation (7), update $V_p^{(r+1)}=V_p^{(r)}+\Delta V_p^{(r+1)}$, adjust PV-node complex voltage for specified value by equation (15), and go to step-12.
11. Compute $\Delta V_p^{(r+1)}$ by equations (9), (10), and (11) involving self-iterations converging to εV-self (typical value 0.0001 pu), determine its real and imaginary parts, replace current value of DVMX in case any of them is larger, update $V_p^{(r+1)}=V_p^{(r)}+\Delta V_p^{(r+1)}$.
12. Calculate accelerated value of $V_p^{(r+1)}$ by using equation (14), and update voltage by $V_p^r=V_p^{(r+1)}$ for immediate use in the next nodes voltage calculations.
13. Check if the total numbers of nodes—n are scanned. That is if p<n, increment p=p+1, and go to step-4. Otherwise follow the next step.
14. Advance iteration count r=r+1, and if DSMX and DVMX both are not less than respective convergence tolerances of εM (typical value 0.0001 pu) and εV (typical value 0.000001 pu) specified for the purpose of the accuracy of the solution, go to step-3, otherwise follow the next step. (However, convergence check by DVMX, specification of εV in step-2, and determination of DVMX in step-11 are found to be not necessary).
15. Compute real power mismatch $\Delta P_p$ at PQ+PV (N1) nodes, compute reactive power mismatch $\Delta Q_p$ at PQ (N2) nodes, and if all (or both DPMX and DQMX) are not less than (εM), reduce εV-self to typical 0.00001 pu and go to step 3, otherwise follow the next step.
16. From calculated and known values of complex voltage at different power network nodes, and tap position of tap changing transformers, calculate power flows through power network components, reactive power generation at PV-nodes, and real and reactive power generation at the slack node.

Coefficient Matrix [C] Based Patel Loadflow (CPL)

Patel Loadflow model can be organized in coefficient matrix [C] based complex form, because it is not involved with any partial differentiation of original or mismatch functions. The model constitutes eqns. {(17) or (19)}, {(20) to (22)} or {(23) to (25)} or {(20a), (21), and (22a)}, {(26) or (27)}, and (4). It involves one solution of {(17) or (19)} followed by one solution of {(26) or (27)}, or one solution of {(26) or (27)} followed by one solution of {(17) or (19)}. However, {(26) or (27)} constitutes one equation for each PV-node, and equations for all the violated PV-nodes can be solved in parallel, just like Gauss numerical method. Equations (26) or (27) can also be replaced by equations (9), (10), and (11).

$$[(\Delta S/V)^*] = [C][\Delta V] \tag{16}$$

$$[\Delta V] = [C]^{-1}[(\Delta S/V)^*] \tag{17}$$

OR $$\{[(\Delta S/V)^*] \text{ or } [(S/V)^*]\} = [C][V] \tag{18}$$

$$[V] = [C]^{-1}\{[(\Delta S/V)^*] \text{ or } [(S/V)^*]\} \tag{19}$$

Where, components of vectors [(S/V)*] and [(ΔS/V)*], and matrix [C] are defined in the following:

$$(SSH_p^*/V_p^*) = \tag{20a}$$

$$(PSH_p - jQSH_p)/(e_p - jf_p) = \left[(Y_{pp} + y_p)V_p + \sum_{q>p} Y_{pq}V_q\right]$$

$$\Delta S_p^* = \tag{20}$$

$$(SSH_p^* - S_p^*) = [(PSH_p - jQSH_p) - (P_p - jQ_p)] = (\Delta P_p - j\Delta Q_p)$$

$$(\Delta S_p/V_p)^* = \tag{20}$$

$$(\Delta S_p^*/V_p^*) = [(PSH_p - jQSH_p) - (P_p - jQ_p)]/V_p^* = (\Delta P_p - j\Delta Q_p)/V_p^*$$

$$(\Delta S_p/V_p)^* = [\{SSH_p^*/(e_p^2 + f_p^2)\} - (Y_{pp} + y_p)]V_p - \sum_{q>p} Y_{pq}V_q \tag{20}$$

$$(\Delta S_p/V_p)^* \approx [\{SSH_p^*/(e_p^2 + f_p^2)\} - \{L_p SSH_p^*/(e_s^2 + f_s^2)\}]V_p = \tag{20}$$

$$SSH_p^*/V_p^* - L_p SSH_p^* V_p / V_s^2$$

$$(\Delta S_p/V_p)^* \approx [\{SSH_p^*/(e_p^2 + f_p^2)\} - L_p]V_p = SSH_p/V_p^* - L_p V_p \tag{20}$$

$$C_{pq} = Y_{pq} \tag{21}$$

$$C_{pp} = \tag{22}$$

$$[(Y_{pp} + y_p) - \{SSH_p^*/(e_p^2 + f_p^2)\}] \approx [(Y_{pp} + y_p) - \{L_p SSH_p^*/(e_s^2 + f_s^2)\}]$$

$$C_{pp} = [(Y_{pp} + y_p) - L_p] \tag{22}$$

$$C_{pp} = (Y_{pp} + y_p) \tag{22a}$$

OR $$(\Delta S_p/V_p)^* = (S_p^* - SSH_p^*)/V_p^* = \tag{23}$$

$$[(P_p - jQ_p) - (PSH_p - jQSH_p)]/V_p^* = [(-\Delta P_p) - j(-\Delta Q_p)]/V_p^*$$

$$(\Delta S_p/V_p)^* = [(Y_{pp} + y_p) - \{SSH_p^*/(e_p^2 + f_p^2)\}]V_p + \sum_{q>p} Y_{pq}V_q \tag{23}$$

$$(\Delta S_p/V_p)^* \approx [\{L_p SSH_p^*/(e_s^2 + f_s^2)\} - \{SSH_p^*/(e_p^2 + f_p^2)\}]V_p = \tag{23}$$

$$L_p SSH_p^* V_p / V_s^2 - SSH_p^*/V_p^*$$

$$(\Delta S_p/V_p)^* \approx [L_p - \{SSH_p^*/(e_p^2 + f_p^2)\}]V_p = L_p V_p - SSH_p^*/V_p^* \tag{23}$$

$$C_{pq} = -Y_{pq} \tag{24}$$

$$C_{pp} = [ \tag{25}$$

$$\{L_p SSH_p^*/(e_p^2 + f_p^2)\} - (Y_{pp} + y_p)] \approx [\{L_p SSH_p^*/(e_s^2 + f_s^2)\} - (Y_{pp} + y_p)]$$

$$C_{pp} = [L_p - (Y_{pp} + y_p)] \tag{25}$$

$$[\Delta V_p^{(sr+1)}]^{(r+1)} = [((\Delta S_p/V_p)^*/C_{pp})^{(sr)}]^{(r)} \tag{26}$$

$$[V_p^{(sr+1)}]^{(r+1)} = [(((\Delta S/V)^* \text{ or } (S/V)^*)/C_{pp})^{(sr)}]^{(r)} \tag{27}$$

The equations (22), (25), and (4) provide elegant formulation for diagonal elements of the coefficient matrix [C] that suggest a mechanism for their numerical manipulations particularly useful when diagonal dominance issue arise in the presence of a capacitive series branch or an excessive capacitive compensation at a node. The factor $L_p$ of different value can be applied separately to real and imaginary components of a diagonal element of [C]. Similar developments can be provided for Patel Super Decoupled Loadflow models and other loadflow models. Equations (26) and (27) and their expanded versions can also be written with factor $L_p$.

It can be seen that diagonal elements of the coefficient matrix [C] are changing with changing values of $V_p$, and therefore, values of $(e_p^2+f_p^2)$ during iteration process requiring time consuming re-factorization of [C] in each iteration. To avoid re-factorization, it is proposed to make [C] constant by using $(e_s^2+f_s^2)$, the slack-node voltage values, instead of $(e_p^2+f_p^2)$ in equations (22) and (25) requiring factorization of [C] only once in the beginning of the iteration process.

It should be noted that equations (20), (21), (22), and (23), (24), (25) can be organized as EARIGSL formulations of equations (2), (7) and (9) for solution of individual node equation. The factor $L_p$ in equations {(2), (7), (9)} and in equations {(20), (22), (23), (25), (66), (68), (69), (68a), (69a)} provides an experimentation opportunity to study the effect of degree of diagonal dominance on the convergence of EARIGSL, CPL, and Patel Super Decoupled Loadflow (PSDL) iterative methods and similar application of Patel numerical method (PNM) for solution of similar problems in different subject areas. It is at this stage the factor $L_p$ can be finalized and used in formation of matrix [C] of (16) or (18), and matrices [Yf] and [Ye] of {(55), (56)} or {(57), (58)}, and before inverting and solving by Patel Sparse [C] Inverse Solver (PSIS) of the next section, and that more appropriately can be referred to as Gauss-Patel (GP) and Gauss-Seidel-Patel (GSP) solvers.

Coefficient Matrix [C] Based Patel Loadflow (CPL) Method

The steps of loadflow calculation by CPL method are shown in the flowchart of FIG. 2. Referring to the flowchart of FIG. 2, different steps are elaborated in steps marked with similar numbers in the following. The words "Read system data" in Step-21 corresponds to step-10 and step-20 in FIG. 7, and step-83, step-84, step-86, step 89, step-90 in FIG. 8. All other steps in the following correspond to step-30 in FIG. 7, and step-91, step-92, and step-93 in FIG. 8.

21. Read system data and assign an initial approximate solution. If better solution estimate is not available, set voltage magnitude and angle of all nodes equal to those of the slack-node, referred to as the slack-start or flat-start.
22. Form nodal admittance matrix [Y], Initialize iteration count r=0, and define convergence tolerances (say, εM=0.0001 pu and ε-self=0.0001 pu)
23. Form, factorize, and store (m+k)×(m+k) size complex coefficient matrix [C] of {(16) or (18)} in a compact storage exploiting sparsity, using equations {(21) and (22)} or {(24) and (25)} or {(21) and (22a)}.
24. Compute complex residues [ΔS] and [(ΔS/V)*] using (20) or (23). However, use calculated value $Q_p$ instead of $QSH_p$ for PV-nodes, implement violated $Q_{max}$ or $Q_{min}$ limits of PV-node generators, and change the status of violated PV-node to PQ-node.
25. Find residues [ΔP] and [ΔQ] for only at PQ-nodes, and if all are less than the mismatch tolerance (say εM=0.0001 pu), go to step-28
26. Solve (17) for [ΔV] or (19) for [V], perform Self-Iterations for change in voltage convergence to tolerance (say, εV-self=0.0001 pu) for only violated PV-nodes using (26) or (27) or (9).
27. Update voltage using, [V]=[V]+[ΔV]. Adjust real and reactive components of PV-node complex voltage for specified voltage magnitude for not violated PV-nodes, using equation (15). Increment the iteration count r=r+1, and Go to step-24.
28. Compute complex residues [ΔS], and find residues [ΔP] for PQ and PV nodes, and [ΔQ] only at PQ-nodes, and if all are not less than the mismatch tolerance (say, εM=0.0001 pu), set ΔV tolerance for the purpose of self-iterations to (say, εV-self=0.00001 pu) and go to step-24, otherwise proceed to the next step.
29. From calculated and known values of complex voltage at different power network nodes, and tap position of tap changing transformers, calculate power flows through power network components, reactive power generation at PV-nodes, and real and reactive power generation at the slack node.

Hybrid Iteration Scheme Involving Solution of CPL Model for PQ-Nodes, and EARIGSL Model for PV-Nodes In this scheme {(17) or (19)} is solved only for PQ-nodes, and equation {(7) or (9)} is solved for only PV-nodes in an iteration scheme that may be referred to as (1CPL, 1EARIGSL) or (1EARIGSL, 1CPL) or in many possible other combinations to be determined experimentally. The scheme can involve {(17) or (19)} and {(7) or (9)} solved alternatively with intermediate updating or simultaneously without intermediate updating. Solution steps for hybrid version of the method in the following are given with intermediate updating for iteration scheme referred to as (1CPL, 1EARIGSL). The solution steps of all the methods of this application are preliminary and can potentially change based on experimental investigations.

Hybrid Coefficient Matrix [C] Based Patel Loadflow (HCPL)

The steps of loadflow calculation by HCPL method are shown in the flowchart of FIG. 3. Referring to the flowchart of FIG. 3, different steps are elaborated in steps marked with similar numbers in the following. The words "Read system data" in Step-41 correspond to step-10 and step-20 in FIG. 7, and step-83, step-84, step-86, step-89, step-90 in FIG. 8. All other steps in the following correspond to step-30 in FIG. 7, and step-91, step-92, and step-93 in FIG. 8.

41. Read system data and assign an initial approximate solution. If better solution estimate is not available, set voltage magnitude and angle of all nodes equal to those of the slack-node, referred to as the slack-start or flat-start.
42. Form nodal admittance matrix [Y], Initialize iteration count r=0, and define convergence tolerances (say, εM=0.0001 pu and εV-self=0.0001 pu)
43. Form, factorize, and store (m)×(m) size complex coefficient matrix [C] of {(16) or (18)} in a compact storage exploiting sparsity, using equations {(21) and (22)} or {(24) and (25)} or {(21) and (22a)}.
44. Compute complex residues [ΔS] and [(ΔS/V)*] for only PQ-nodes using (20) or (23), find residues [ΔP] and [ΔQ] for only PQ-nodes, and if all are less than the mismatch tolerance (say εM=0.0001 pu), go to step-48, otherwise follow the next step.
45. Solve (17) for [ΔV] or (19) for [V] and update voltage using, [V]=[V]+[ΔV], for only PQ-nodes.
46. For PV-nodes, adjust real and reactive components of PV-node complex voltage for specified voltage magnitude using (15), compute $Q_p$ using (8), perform $QSH_p=Q_p$, implement violated $Q_{max}$ or $Q_{min}$ limits of PV-node generators and change the status of violated PV-node to PQ-node.
47. Solve for [ΔV] using (7) for not violated PV-nodes and adjust real and reactive components of PV-node complex voltage for specified voltage magnitude using (15), solve for [ΔV] using (9) involving Self-Iterations for violated PV-nodes, and update [V]=[V]+[ΔV] for PV-nodes using (14). Increment the iteration count r=r+1, and Go to step-44.
48. Compute complex residues [ΔS], and find residues [ΔP] for PQ and PV nodes, and [ΔQ] only at PQ-nodes, and if all are not less than the mismatch tolerance (say, εM=0.0001 pu), set ΔV tolerance for the purpose of self-iterations to (say, εV-self=0.00001 pu) and go to step-44, otherwise proceed to the next step.
49. From calculated and known values of complex voltage at different power network nodes, and tap position of tap changing transformers, calculate power flows through power network components, reactive power generation at PV-nodes, and real and reactive power generation at the slack node.

Patel Loadflow-1 (PL-1)

The PL-1 Model comprises eqns. (28) to (36)

$$\begin{pmatrix} RI \\ II \end{pmatrix} = \begin{pmatrix} C \end{pmatrix} \begin{pmatrix} f \\ e \end{pmatrix} \tag{28}$$

$$\begin{pmatrix} f \\ e \end{pmatrix}^{(r+1)} = \begin{pmatrix} C \end{pmatrix}^{-1} \begin{pmatrix} RI \\ II \end{pmatrix}^{(r)} \tag{29}$$

Where, $$RI_p = (e_p PSH_p + f_p QSH_p)/(e_p^2 + f_p^2) = \tag{30}$$
$$-\left[(B_{pp} + b_p)f_p + \sum_{>qP} B_{pq}f_q\right] + \left[(G_{pp} + g_p)e_p + \sum_{q>p} G_{pq}e_q\right]$$

$$II_p = (e_p QSH_p - f_p PSH_p)/(e_p^2 + f_p^2) = \tag{31}$$
$$-\left[(G_{pp} + g_p)f_p + \sum_{q>P} G_{pq}f_q\right] - \left[(B_{pp} + b_p)e_p + \sum_{q>P} B_{pq}e_q\right]$$

$$\begin{pmatrix} C \end{pmatrix} = \begin{pmatrix} Bf & Ge \\ Gf & Be \end{pmatrix} \tag{32}$$

$$Bf_{pq} = Be_{pq} = -B_{pq} \quad Bf_{pp} = Be_{pp} = -(B_{pp} + b_p) \tag{33}$$

$$Gf_{pq} = -Ge_{pq} = -G_{pq} \quad Gf_{pp} = -Ge_{pp} = -(G_{pp} + g_p) \tag{34}$$

The equations (28) to (34) represents linearized global solution of the nonlinear loadflow equations. Local nonlinearity can be handled by introduction of self-iterations as per equations (35) to (36).

$$[f_p^{(sr+1)}]^{(r+1)} = [RI_p/Bf_{pp}^{(sr)}]^{(r)} \tag{35}$$

$$[e_p^{(sr+1)}]^{(r+1)} = [(II_p/Be_{pp}^{(sr)}]^{(r)} \tag{36}$$

Equations (35) to (36) are solved independently for each node, and can be performed simultaneously in parallel for all the nodes. Equations (29) and {(35) and (36)} are solved in sequence. In other words linear global solution followed by non-linear local (nodal) solution by self-iterations, or non-linear local (nodal) solution by self-iterations followed by linear global solution.

It should be noted that equations (30) and (31) can be organized for Decoupled-EARIGSL formulation involving factor $L_p$ defined in the equation (4). Factor $L_p$ takes care of diagonal dominance issue and ensures that all the Loadflow Computation Models developed in this application almost always provide converged solution, particularly when diagonal dominance issue arises in the presence of capacitive series branch or an excessive shunt capacitive compensation at a node. This is being achieved for the first time since the development of Loadflow Computation Models began in 1950s, and for the first time in about 200 years of use and application of Gauss-Seidel numerical method in different subject areas.

Patel Loadflow-2 (PL-2)

The PL-2 model comprises eqns. {(38) and (39)} or (41), (32), (42) to (47), and {(48) to (51)} or {(52) to (53)}.

$$\begin{pmatrix} \Delta RI \\ \Delta II \end{pmatrix} = \begin{pmatrix} C \end{pmatrix} \begin{pmatrix} \Delta f \\ \Delta e \end{pmatrix} \tag{37}$$

$$\begin{pmatrix} \Delta f \\ \Delta e \end{pmatrix}^{(r+1)} = \begin{pmatrix} C \end{pmatrix}^{-1} \begin{pmatrix} \Delta RI \\ \Delta II \end{pmatrix}^{(r)} \tag{38}$$

$$\begin{pmatrix} f \\ e \end{pmatrix}^{(r+1)} = \begin{pmatrix} f \\ e \end{pmatrix}^{(r/0)} + \begin{pmatrix} \Delta f \\ \Delta e \end{pmatrix}^{(r+1)} \tag{39}$$

$$\begin{pmatrix} \Delta RI \\ \Delta II \end{pmatrix} = \begin{pmatrix} C \end{pmatrix} \begin{pmatrix} f \\ e \end{pmatrix} \tag{40}$$

$$\begin{pmatrix} f \\ e \end{pmatrix}^{(r+1)} = \begin{pmatrix} C \end{pmatrix}^{-1} \begin{pmatrix} \Delta RI \\ \Delta II \end{pmatrix}^{(r)} \tag{41}$$

Where, $$\Delta RI_p = (e_p PSH_p + f_p QSH_p)/(e_p^2 + f_p^2) + \tag{42}$$
$$\left[ (B_{pp}+b_p)f_p + \sum_{q>P} B_{pq} f_q \right] - \left[ (G_{pp}+g_p)e_p + \sum_{q>P} G_{pq} e_q \right]$$

$$\Delta RI_p = \left[ \{(B_{pp}+b_p) + QSH_p/(e_p^2+f_p^2)\}f_p + \sum_{q>P} B_{pq}f_q \right] - \tag{42}$$
$$\left[ \{(G_{pp}+g_p) - PSH_p/(e_p^2+f_p^2)\}e_p + \sum_{q>P} G_{pq}e_q \right]$$

$$\Delta RI_p = (e_p \Delta P_p + f_p \Delta Q_p)/(e_p^2 + f_p^2) \tag{42}$$

$$\Delta RI_p \approx \tag{42}$$
$$[(e_p PSH_p + f_p QSH_p)/(e_p^2+f_p^2)] - [(e_p PSH_p + f_p QSH_p)/(e_s^2+f_s^2)]$$

$$\Delta II_p = (e_p QSH_p - f_p PSH_p)/ \tag{43}$$
$$(e_p^2+f_p^2) + \left[ (G_{pp}+g_p)f_p + \sum_{q>p} G_{pq}f_q \right] + \left[ (B_{pp}+b_p)e_p + \sum_{q>p} B_{pq}e_q \right]$$

$$\Delta II_p = \left[ \{(G_{pp}+g_p) - PSH_p/(e_p^2+f_p^2)\}f_p + \sum_{q>p} G_{pq}f_q \right] + \tag{43}$$
$$\left[ \{(B_{pp}+b_p) + QSH_p/(e_p^2+f_p^2)\}e_p + \sum_{q>p} B_{pq}e_q \right]$$

$$\Delta II_p = (e_p \Delta Q_p - f_p \Delta P_p)/(e_p^2 + f_p^2) \tag{43}$$

$$\Delta II_p = [(e_p QSH_p - f_p PSH_p)/(e_p^2 + f_p^2)] \tag{43}$$
$$- [(e_p QSH_p - f_p PSH_p)/(e_s^2 + f_s^2)]$$

$$Bf_{pq} = Be_{pq} = -B_{pq} \tag{44}$$

$$Gf_{pq} = -Ge_{pq} = -G_{pq} \tag{45}$$

$$Bf_{pp} = Be_{pp} = \tag{46}$$
$$-[B_{pp}+b_p] - QSH_p/(e_p^2+f_p^2) \approx -[B_{pp}+b_p] - QSH_p/(e_s^2+f_s^2)$$

$$Gf_{pp} = -Ge_{pp} = \tag{47}$$
$$-[G_{pp}+g_p] + PSH_p/(e_p^2+f_p^2) \approx -[G_{pp}+g_p] + PSH_p/(e_s^2+f_s^2)$$

Equations (42) and (43) provides alternative expressions of real and imaginary current mismatches where $\Delta Q_p=0.0$ at PV-nodes. An alternative definition of PL-2 model can be provided by defining $\Delta RI_p$ of (42) and $\Delta II_p$ of (43) as the subtraction of the terms containing specified values from the calculated values that would make $\Delta RI_p$ and $\Delta II_p$ defined by eqns. (42) and (43) and elements of [C] defined by eqns. (44) to (47) negative.

It can be seen that diagonal elements of the coefficient matrix [C] are changing with changing values of $(e_p^2+f_p^2)$, and therefore, requiring time consuming re-factorization of [C] in each iteration. To avoid re-factorization, it is proposed to make [C] constant by using $(e_s^2+f_s^2)$, the slack-node voltage values, instead of $(e_p^2+f_p^2)$ in equations (46) and (47) requiring factorization or full inversion of [C] only once in the beginning of the iteration process.

The equations (37) to (47) represents linearized global solution of the nonlinear loadflow equations. Local nonlinearity can be handled by introduction of self-iterations as per equations {(48) to (51)} or {(52) to (53)}. It is possible to expand in detail all equations involving self-iterations as in equations (26), (27), (35), (36) in the above, and (48), (50), (52), (53), (74), (75) in the following.

$$[\Delta f_p^{(sr+1)}]^{(r+1)} = [(\Delta RI_p/Bf_{pp})^{(sr)}]^{(r)} \tag{48}$$

$$[f_p]^{(r+1)} = [f_p]^{(r)} + [\Delta f_p]^{(r+1)} \tag{49}$$

$$[\Delta e_p^{(sr+1)}]^{(r+1)} = [(\Delta II_p/Be_{pp})^{(sr)}]^{(r)} \tag{50}$$

$$[e_p]^{(r+1)} = [e_p]^{(r)} + [\Delta e_p]^{(r+1)} \tag{51}$$

Equations {(48) to (51)} or {(52) to (53)} are solved independently for each node, and can be performed simultaneously in parallel for all the nodes. Equations {(38) and (39)} or (41), and {(48) to (51)} or {(52) and (53)} are solved in sequence. In other words linear global solution followed by non-linear local (nodal) solution by self-iterations, or non-linear local (nodal) solution by self-iterations followed by linear global solution.

$$[f_p^{(sr+1)}]^{(r+1)} = [(\Delta RI_p Bf_{pp})^{(sr)}]^{(r)} \tag{52}$$

$$[e_p^{(sr+1)}]^{(r+1)} = [(\Delta II_p/Be_{pp})^{(sr)}]^{(r)} \tag{53}$$

Patel Super Decoupled Loadflow (PSDL)

In a class of super decoupled loadflow models, each super decoupled loadflow model comprises a system of equations {(55) and (56)} or {(57) and (58)} differing in the definition of elements of [ΔRI'], [ΔII'], [RI'], [II'], and [Yf] and [Ye]. It is a system of equations for the separate calculation of imaginary part of and real part of complex voltage or its corrections. [C'] is the transformed coefficient matrix.

$$\begin{pmatrix} C' \end{pmatrix} = \begin{pmatrix} Yf & 0 \\ 0 & Ye \end{pmatrix} \quad (54)$$

$$[\Delta RI'] = [Yf][\Delta f] \quad (55)$$

$$[\Delta II'] = [Ye][\Delta e] \quad (56)$$

$$\{[\Delta RI'] \text{ or } [RI']\} = [Yf][f] \quad (57)$$

$$\{[\Delta II'] \text{ or } [II']\} = [Ye][e] \quad (58)$$

Successive (1f, 1e) Iteration Scheme

In this scheme {(55) and (56)} or {(57) and (58)} are solved alternately with intermediate updating. Each iteration involves one calculation of {[ΔRI'] or [RI']} and {[Δf] or [f]} to update [f] and then one calculation of {[ΔII'] or [II']} and {[Δe] or [e]} to update [e]. The sequence of relations {(59) to (62)} or {(63) to (64)} depicts the scheme.

$$[\Delta f] = [Yf]^{-1}[\Delta RI'] \quad (59)$$

$$[f] = [f] + [\Delta f] \quad (60)$$

$$[\Delta e] = [Ye]^{-1}[\Delta II'] \quad (61)$$

$$[e] = [e] + [\Delta e] \quad (62)$$

$$[f] = [Yf]^{-1}\{[\Delta RI'] \text{ or } [RI']\} \quad (63)$$

$$[e] = [Ye]^{-1}\{[\Delta II'] \text{ or } [II']\} \quad (64)$$

The scheme involves solution of system of equations {(55) and (56)} or {(57) and (58)} in an iterative manner depicted in the sequence of relations {(59) to (62)} or {(63) to (64)}. This scheme requires calculation of {[ΔRI'] and [ΔII']} or {[RI'] and [II']} for each half iteration because they are calculated always using the most recent imaginary part of and real part of complex voltage values, and it is block Gauss-Seidel approach. The scheme is block successive, which imparts increased stability to the solution process, and it in turn improves convergence and increases the reliability of obtaining solution.

Simultaneous (1f, 1e) or (1e, 1f) iteration scheme

In this scheme {(55) and (56)} or {(57) and (58)} are solved simultaneously without intermediate updating. Each iteration involves one calculation of {[ΔRI'] or [RI']} and {[Δf] or [f]} to update [f] and one calculation of {[ΔII'] or [II']} and {[Δe] or [e]} to update [e]. {(59) and (61)} or {(63) and (64)} can also be solved simultaneously in parallel on different processors.

Patel Super Decoupled Loadflow (PSDL)

The PSDL-YY model comprises equations {(59) to (62)} or {(63) to (64)} & (65) to (73), and (4).

Where, $$Yf_{pq} = Ye_{pq} = \begin{cases} -Y_{pq}: & \text{for branch } r/x \text{ ratio} \leq 3.0 \\ -(B_{pq} + 0.9(Y_{pq} - B_{pq})): & \text{for branch } r/x \text{ ratio} > 3.0 \end{cases} \quad (65)$$

$$Yf_{pp} = Ye_{pp} = b'_p + L_p + \sum_{q>p} -Yf_{pq} \quad (66)$$

$$b'_p = -(QSH_p\text{Cos}\Phi_p - PSH_p\text{Sin}\Phi_p)/ \quad \text{: at } PV\text{-node } QSH_p = Q_{p0} \quad (67)$$

$$(e_s^2 + f_s^2) - b_p\text{Cos}\Phi_p$$

$$b'_p = -b_p\text{Cos}\Phi_p \quad (67c)$$

-continued $$RI'_p = RI_p\text{Cos}\Phi_p + II_p\text{Sin}\Phi_p + L_pf_p \quad (68a)$$

$$II'_p = II_p\text{Cos}\Phi_p + RI_p\text{Sin}\Phi_p + L_pe_p \quad (69a)$$

$$\Delta RI'_p = L_pf_p + \Delta RI_p\text{Cos}\Phi_p + II_p\text{Sin}\Phi_p \quad (68)$$

$$\Delta RI'_p = L_pf_p + (e_p\Delta P'_p + f_p\Delta Q'_p)/(e_p^2 + f_p^2) \quad (68)$$

$$\Delta II'_p = L_pe_p + \Delta II_p\text{Cos}\Phi_p - \Delta RI_p\text{Sin}\Phi_p \quad (69)$$

$$\Delta II'_p = L_pe_p + (e_p\Delta Q'_p + f_p\Delta P'_p)/(e_p^2 + f_p^2) \quad (69)$$

$$\Delta P'_p = \Delta P_p\text{Cos}\Phi_p + \Delta Q_p\text{Sin}\Phi_p \quad \text{: at } PV\text{-node } \Delta Q_p = 0.0 \quad (70)$$

$$\Delta Q'_p = \Delta Q_p\text{Cos}\Phi_p + \Delta P_p\text{Sin}\Phi_p \quad \text{: at } PV\text{-node } \Delta Q_p = 0.0 \quad (71)$$

$$\text{Cos}\Phi_p = \|[B_{pp}/\sqrt{(G_{pp}^2 + B_{pp}^2)}]\| \geq \quad \text{to be determined experimentally} \quad (72)$$

$$\text{Cos}(0° \text{ to } -90°):$$

$$\text{Sin}\Phi_p = \|[G_{pp}/\sqrt{(G_{pp}^2 + B_{pp}^2)}]\| \geq \quad \text{to be determined experimentally} \quad (73)$$

$$\text{Sin}(0° \text{ to } -90°):$$

Variations of PSDL and SSDL Models:

The SSDL-YY model comprises eqns. (59) to (62), (65a), (65b), (66a), (66b), (67a), (67b), (68a), (68b), {(68) to (73), and (4)}, (46a), (46b). (47a). Another version of SSDL-YY model comprises eqns. (59) to (62), (65c), (66a), (66b), (67a), (67b), {(68c) and (68d)} where $QSH_p$ replaced by $Q_{p0}$ calculated value at initial estimate at PV-nodes, {(68) to (73), and (4)}, or {(68) and (69)} with approximate versions of {(42) and (43)} where $QSH_p$ replaced by $Q_p$ (calculated value) at PV-nodes.

$$Yf_{pq} = \begin{cases} -Y_{pq}: & \text{for branch } r/x \text{ ratio} \leq 3.0 \\ -(B_{pq} + 0.9(Y_{pq} - B_{pq})): & \text{for branch } r/x \text{ ratio} > 3.0 \\ & \text{for branches connected between} \\ -B_{pq}: & \text{two } PV\text{-nodes or a } PV\text{-node} \\ & \text{and the slack-node} \end{cases} \quad (65a)$$

$$Ye_{pq} = \begin{cases} -Y_{pq}: & \text{for branch } r/x \text{ ratio} \leq 3.0 \\ -(B_{pq} + 0.9(Y_{pq} - B_{pq})): & \text{for branch } r/x \text{ ratio} > 3.0 \end{cases} \quad (65b)$$

$$Yf_{pq} = Ye_{pq} = \begin{cases} -Y_{pq}: & \text{for branch } r/x \text{ ratio} \leq 3.0 \\ -(B_{pq} + 0.9(Y_{pq} - B_{pq})): & \text{for branch } r/x \text{ ratio} > 3.0 \end{cases} \quad (65c)$$

$$Yf_{pq} = bf'_p + L_p + \sum_{q>p} -Yf_{pq} \quad (66a)$$

$$Ye_{pp} = be'_p + L_p + \sum_{q>p} -Ye_{pq} \quad (66b)$$

$$bf'_p = \quad (67a)$$

$$-(QSH_p\text{Cos}\Phi_p - PSH_p\text{Sin}\Phi_p)/(e_s^2 + f_s^2) - b_p\text{Cos}\Phi_p: \text{ at } PQ\text{-node}$$

$$be'_p = \quad (67b)$$

$$+(QSH_p\text{Cos}\Phi_p - PSH_p\text{Sin}\Phi_p)/(e_s^2 + f_s^2) - b_p\text{Cos}\Phi_p: \text{ at } PQ\text{-node}$$

$$bf'_p = 0.0 \text{ or } b_p: \text{ at } PV\text{-node} \quad (68a)$$

$$be'_p = 10.0^{10}(\text{say, it is chosen very large value}): \text{ at } PV\text{-node} \quad (68b)$$

$$bf'_p = \quad (68c)$$

$$-(QSH_p\text{Cos}\Phi_p - PSH_p\text{Sin}\Phi_p)/(e_s^2 + f_s^2) - b_p\text{Cos}\Phi_p: \text{ at } PV\text{-node}$$

$$be'_p = \quad (68d)$$

$$+(QSH_p\text{Cos}\Phi_p - PSH_p\text{Sin}\Phi_p)/(e_s^2 + f_s^2) - b_p\text{Cos}\Phi_p: \text{ at } PV\text{-node}$$

-continued $$\Delta RI_p = \Delta P_p/(K_p V_p^2): \text{ at } PV\text{-node} \quad (46a)$$

$$\Delta II_p = 0.0: \text{ at } PV\text{-node} \quad (47a)$$

Branch admittance magnitude in (65), (65a), (65b), (65c) is of the same algebraic sign as its susceptance. Rotation angles are to be determined as per (72) and (73), and could be restricted to the maximum anywhere −0 to −90 degrees to be determined experimentally. There can be many possible variations of PSDL, and SSDL models, and the one variation being their generalized versions PSDL-B'B', and SSDL-B'B' where B' symbolizes suceptance matrix transformed, $B'_{pq}=B_{pq}+G_{pq}\tan\Phi_{pq}$ and $\tan\Phi_{pq}=G_{pq}/B_{pq}$. Also, the two versions PSDL-YY and PSDL-B'B', and SSDL-YY and SSDL-B'B' can be mixed in any possible combination. Corresponding transformed diagonal elements $B_{pp}'$ and transformed mismatches can easily be determined.

Slack-Start

Slack-Start is use of the same voltage magnitude and angle as those of the slack-node for all nodes as an initial guess solution. With the specified magnitudes, PV-nodes voltage magnitudes are adjusted to their known values after the first half iteration. This start procedure referred to as the slack-start, saves almost all effort of mismatch calculation in the first P-f iteration as it requires only shunt flows to be calculated at each node.

In super decoupled loadflow models [Yf] and [Ye] are real, sparse, symmetrical and built only from network elements. Since they are constant, they need to be factorized once only at the start of the solution. Equations {(55) and (56)} or {(57) and (58)} are to be solved repeatedly by forward and backward substitutions. [Yf] and [Ye] are of the same dimensions (m+k)×(m+k) when only a row/column of the reference/slack-node is excluded and both are triangularized using the same ordering regardless of the node-types.

Unlike the prior art SSDL (Super Super Decoupled Loadflow, presented at IEEE Toronto International Conference— Science and Technology for Humanity-2009, pages: 652-659) methods, the PSDL methods are single matrix loadflow computations substantially reducing memory requirements, and since all nodes are active in the iterative process implementations of PQ-node to PV-node and PV-node to PQ-node switching is simple. It should be noted that it is possible to obtain single matrix solution for both SSDL-YY and PSDL-YY methods by ordering all PV-nodes after all PQ-nodes in the full inversion process and skipping all PV-node related rows and columns in the solution of Q-V sub-problem. This is particularly true and useful when Sparse Inverse Technique described in the following is used. The best possible convergence from non-linearity consideration could be achieved by restricting rotation angle to maximum of −0 to −90 degrees (say, −48 degrees) to be determined experimentally. The developments of this application can also be implemented into the above referred original SSDL-YY method and its many possible variants.

The steps of loadflow computation method, PSDL method are shown in the flowchart of FIG. 4. Computation steps of SSDL method are similar, therefore, they are not given explicitly. Referring to the flowchart of FIG. 4, different steps are elaborated in steps marked with similar letters in the following. Double lettered steps are the characteristic steps of PSDL method. The words "Read system data" in Step-a correspond to step-10 and step-20 in FIG. 7, and step-83, step-84, step-86, step-89, step-90 in FIG. 8. All other steps in the following correspond to step-30 in FIG. 7, and step-91, step-92, and step-93 in FIG. 8.

a. Read system data and assign an initial approximate solution vectors [f0], [e0], and store it. If better solution estimate is not available, set voltage magnitude to 1.0 pu at load nodes and specified values at PV-nodes, and angle of all nodes equal to that of the slack-node, referred to as the flat-start or use the Slack-Start.

b. Form nodal admittance matrix, and Initialize iteration count ITRF=ITRE=r=0, MXDP=MXDQ=0.0, and MXDF=MXDE=0.0 c. Compute Cosine and Sine of nodal rotation angles using equations (72), (73), and store them. If Cos $\Phi_p$<Cos (0 to −90 degrees, to be determined experimentally), set Cos $\Phi_p$=Cos (say, 0 to −90 degrees to be determined experimentally) and Sin $\Phi_p$=Sin (say, 0 to −90 degrees to be determined experimentally).

dd. Form, factorize, and store (m+k)×(m+k) size matrix [Yf] or [Ye] of {(55) and (56)} or {(57) and (58)} in a compact storage exploiting sparsity, using equations {(65), (66), (67).

ee. Compute complex [S] after adjusting PV-node complex voltage for specified voltage magnitude, perform $QSH_p=Q_p$ for PV-nodes, implement violated $Qm_{ax}$ or $Q_{min}$ limits of PV-node generators, perform $QSH_p$=violated limit, and change the status of violated PV-node to PQ-node.

ee. Compute [ΔS] and find residues [ΔP] and [ΔQ] for only PQ-nodes, and if absolute value of all are less than the mismatch tolerance (say εM=0.0001 pu), go to step-mm.

ff. Compute real part of transformed [(S/V)*] using (68a) or [(ΔS/V)*] using (68 and solve {(59) for [Δf]} or {(63) for [f]}, and perform Self-Iterations until convergence to tolerance (say, εV-self=0.0001 pu or 0.00001 pu) for only violated PV-nodes using (74) or (9). Update using [f]=[f]+[Δf].

gg. Correct complex voltage of not violated PV-node for specified voltage magnitude using (15), and increment the iteration count ITRF=ITRF+1 and r=(ITRF+ITRE)/2.

hh. Compute complex [S] after adjusting PV-node complex voltage for specified voltage magnitude, perform $QSH_p=Q_p$ for PV-nodes, implement violated $Q_{max}$ or $Q_{min}$ limits of PV-node generators, perform $QSH_p$=violated limit, and change the status of violated PV-node to PQ-node.

hh. Compute [ΔS] and find residues [ΔP] and [ΔQ] for only PQ-nodes, and if absolute value of all are less than the mismatch tolerance (say εM=0.0001 pu), go to step-mm.

ii. Compute negative of imaginary part of transformed [(S/V)*] using (69a) or [(ΔS/V)*] using (69) and solve {(61) for [Δe]} or {(64) for [e]}, perform Self-Iterations until convergence to tolerance (say, εV-Self=0.0001 pu) for only violated PV-nodes using (75) or (9). Update using [e]=[e]+[Δe].

jj. Correct complex voltage of not violated PV-node for specified voltage magnitude using (15), and increment the iteration count ITRE=ITRE+1 and r=(ITRF+ITRE)/2. Go to step-ee.

mm. Compute complex residues [ΔS], and find residues [ΔP] for PQ and PV nodes, and [ΔQ] only at PQ-nodes, and if all are not less than the mismatch tolerance (say, εM=0.0001 pu), set ΔV tolerance for the purpose of self-iterations to (say, εV-Self=0.00001 pu) and go to step-ee, otherwise follow the next step.

n. From calculated and known values of complex voltage at different power network nodes, and tap position of tap changing transformers, calculate power flows through power network components, reactive power generation at PV-nodes, and real and reactive power generation at the slack node.

Hybrid Iteration Scheme involving solution of PSDL or SSDL model for PQ-nodes, and EARIGSL model for PV-nodes In this scheme {(55) and (56)} or {(57) and (58)} are solved alternatively with intermediate updating or simultaneously without intermediate updating for only PQ-nodes, and then EARIGSL model comprising (7) and (9) involving self-iterations at Q-limit violated nodes is solved only for PV-nodes. The iteration scheme may be referred to as (1f, 1e, 1V-complex) block Gauss-Seidel with intermediate updating or it can be simultaneous block-Gauss without intermediate updating. The other iteration schemes could be [(if (PQ+PV nodes), 1V complex (PV-nodes), 1e (PQ-nodes)] or [(if (PQ+PV nodes), 1e (PQ-nodes), 1V complex (PV-nodes)]. Detailed solution steps for HPSDL and HSSDL methods are not given, because they are simple modification and addition of steps for EARIGS in the above steps for PSDL method in a similar way of those of HCPL method. There are many possible combinations and final combination is to be determined by experimentation, and detailed solution steps can potentially change based on experimental investigation.

All equations other than (74) and (75) of the model PSDL represents linearized global solution of the nonlinear loadflow equations. Local nonlinearity can be handled only for violated PV-nodes by introduction of self-iterations as per equations (74) to (75).

$$[(f_p \text{ or } \Delta f_p)^{(sr+1)}]^{(r+1)} = [\{(RI'_p \text{ or } \Delta RI'_p)/Y\!f_{pp}\}^{(sr)}]^{(r)} \quad (74)$$

$$[(e_p \text{ or } \Delta e_p)^{(sr+1)}]^{(r+1)} = [\{(II'_p \text{ or } \Delta II'_p)/Ye_{pp}\}^{(sr)}]^{(r)} \quad (75)$$

Equations (74) to (75) are solved independently for each Q-limit violated PV-node, and can be performed simultaneously in parallel for all the violated PV-nodes. Super Decoupled equations {(59) or (63), and (74)} and {(61) or (64), and (75)} are solved in sequence. In other words linear global solution followed by non-linear local (nodal) solution by self-iterations.

It should be noted that in addition to being derived from a new Patel Numerical Method (PNM) first of its kind in about 200 years, the models PSDL with their relevant defining equations {(65), (66), (67)} indicate single decoupled matrix models. The models require factorization and storage of single decoupled matrix for its solution reducing computer storage requirements and factorization time to almost 50%. It is a significant reduction in computational resources (computer time, storage, and electricity) for achieving the same result, in addition to being highly reliable in providing converged solution because of application of factor $L_p$. There is a huge literature on the subject of Loadflow Computation Models and their solution methods developed since 1950s, but a single decoupled matrix model is being achieved for the first time.

Patel Sparse Inverse Solver (PSIS) and Sparse $[C]^{-1}$ (Pronounced as 'C Inverse', which is Sparse [Z]) Based Patel Loadflow (SCIPL or SZPL):

Matrix complex [C] or real [C] is the coefficient matrix based on original equations (functions) or organized as mismatch equations (functions) in the solution of linear or non-linear simultaneous algebraic equations. Inverses complex $[C]^{-1}$ and real $[C]^{-1}$ are sometimes correspondingly referred to as complex [Z]-matrix and real [Z]-matrix in this application. The complex $[C]^{-1}$ and real $[C]^{-1}$ can also represent admittance matrices respectively complex $[Y]^{-1}$ and real $[Y]^{-1}$. Complex $[C]^{-1}$ and real $[C]^{-1}$ are generalized representations, wherein real $[C]^{-1}$ can be Newton-Raphson approach based Jacobian $[J]^{-1}$ and its simplified approximations including inverses of decoupled or Super Decoupled matrices.

The complex [C] and real [C] are generally sparse matrices wherein many of its off diagonal elements are zeros. In order to save computation time and computer storage, processing of off-diagonal elements that are zeros can be avoided by sparsity preserving programing techniques. However, fully inverted complex [C]-matrix and real [C]-matrix are full matrices wherein no off-diagonal elements are zeros. Therefore, it is proposed to make complex $[C]^{-1}$-matrix and real $[C]^{-1}$-matrix sparse by selectively choosing off-diagonal elements that need to be stored and processed, and thereby introducing approximations. There are two extremes, one is to store and process only one element in each raw corresponding to the diagonal element introducing maximum approximation and the other is to store and process the diagonal and all the off-diagonal elements in each row introducing zero approximation. And there are many situations in between the two extremes stated in the above to be determined experimentally depending on the nature of the problem for optimal use of computational resources (computer time and computer storage). In electrical circuits (networks), one situation for Complex $[C]^{-1}$ and real $[C]^{-1}$ is to store and process off-diagonal elements only corresponding to directly connected nodes (level-1 connectivity) to a given node, which is the same sparsity of the matrix complex [C] or real [C]. For a given node, other situations are to store off-diagonal elements corresponding to directly connected nodes (level-1), and directly connected nodes to level-1 nodes (level-2 nodes), and directly connected nodes to level-2 nodes (level-3 nodes), and so on. For a given node, the level of outward connectivity is to be determined experimentally to determine number of off-diagonal element required to be stored and processed in the complex $[C]^{-1}$-matrix and the real $[C]^{-1}$-matrix for efficient and reliable computation.

In equations (76) and (77): vectors [V] and [I] are of complex voltage and complex current element components respectively. Vectors [ΔV] and [ΔI] are composed of complex voltage correction and complex current mismatch components respectively. Voltage and current quantities appear in electrical circuits. Equation (76) corresponds to equation (19), Equation (77) corresponds to equation (17), and relevant quantities are defined in equations (20) to (27), and (4), wherein complex [Z] becomes complex $[C]^{-1}$.

Equation (76) corresponds to two super decoupled equations (63) and (64), and equation (77) corresponds to two super decoupled equations (59) and (61). Relevant quantities are defined in equations (65) to (73), and (4). It should be noted that all quantities involved are real and not complex, wherein real [Z] becomes equivalent to two super decoupled real matrices $[Yf]^{-1}$ and $[Ye]^{-1}$, which are the same and identical in case of PSDL-YY model.

Application of Newton-Raphson approach to solution of simultaneous non-linear algebraic equations involves calculation of correction vector in each iteration and requires updating as in equations (60) and (62) in case of decoupled models.

All the computation models and their solution methods developed in this application are for electrical power network. However, similar computation models and their solution methods can be developed using techniques developed in this application for all possible areas of study and application that requires solution of linear or non-linear simultaneous algebraic equations. Computation models and their solution methods could be for a system, a circuit, a machine, an apparatus, a device, a material etc.

It should be noted that ZPL and SZPL or CIPL and SCIPL are embarrassingly parallel problems, and readily amenable to parallel processing. This inventor believes, an approach outlined in the above is likely to work. If it works subject to verification by this inventor, it can produce grand simplifications in the sense that no need for specialized triangulation and back-substitution or factorization software, and no need for storing indexing and addressing information required for processing elements of factorized matrix. It appears the next numerical wonder is brewing. This inventor is humbled listening words Guardians of Galaxy chanting: "Indeed, Mr. Patel, You are the one, chosen".

Fifteen different variants of invented SCIPL or SZPL model constitute: {(76) and (79a)}, and {(80a) or (80b) or ((78a), (78b), and (80c)) or ((78c), (78d), and (80d) or (80e))}OR {(76) or (77) and (79b)}, and {(81a) or (81b) or ((78a), (78b), and (81c)) or ((78c), (78d), and (81d)) or (81e)}. However, {(80a) or (80c) or (80d) or (80f) or (81a) or (81c) or (81d) or (81f)} constitutes one equation for each node except the Slack-node, and equations for all the nodes can be solved in parallel, just like Gauss numerical method with self-iteration for each-node to handle local non-linearity. It should be noted that a fresh and independent idea or thinking of self-iteration, formulation of self-iterations in an equation, and its analogy to planet earth spinning on its own axis while making rounds around the Sun were introduced by this inventor in the year 2005 in his patent application filing leading to the grant of U.S. Pat. No. 7,788,051 issued Aug. 31, 2010 and Canadian Patent #2548096 issued Jan. 5, 2011. This is a grand Gaussification of all the possible classical numerical methods. Equation {(80b) or (80e) or (80g) or (81b) or (81e) or (81g)} constitutes one equation for each node except the slack-node, and equations for all the nodes can be solved in sequence like Gauss-Seidel numerical method with self-iteration for each-node to handle local non-linearity. This is a grand Gauss-Seidelization of all the possible classical numerical methods. Gauss numerical method is embarrassingly parallel. However, the best approach seems to solve nodal equation for each node and nodal equations of its directly connected nodes in sequence like Gauss-Seidel numerical method with self-iteration for each-node to handle local non-linearity on separate processor simultaneously in parallel by the technique introduced by this inventor in his U.S. Pat. No. 7,788,051 and Canadian Patent #2548096 issued Jan. 5, 2011. The parallelization technique of patent #U.S. Pat. No. 7,788,051 has produced 10-times speed-up in $Y_b$us formulation of Gauss-Seidel loadflow method involving self-iterations. The same parallelization technique applied to sparse [Z] based models (76) and (77), could potentially produce 20-to-40 times speed-ups and could be of the order of 100 times speed-up in case of large problems. It looks like a revolution (Patelution) in numerical computation. The real matrix [Z] or the complex matrix [Z] in equations (76) and (77) can also be created by using building algorithm to create real or complex inverted coefficient matrix [C] or complex inverted admittance matrix [Y] or inverted real Jacobian matrix [J] and their different variations.

$$[V]=[Z]\{[\Delta I] \text{ or } [I]\} \text{ OR} \tag{76}$$

$$[\Delta V]=[Z][\Delta I] \tag{77}$$

Wherein, though it is possible to write equations (76) and (77) in complex form or real form in terms of real and imaginary components, of involved variables/parameters relevant to problem being solved, development in the following is given only for complex versions of equations (76) and (77) involving variables/parameter (voltage, current, and admittance) relevant to an electrical circuit or a network where, components of vectors [V], [I], [ΔV], [ΔI], and special Symbols are defined in the following:

$q \rightarrow p$: means node q is directly connected to node-p $q<p$: means node-q among directly connected are processed prior to the current node-p $q>p$: means node-q among directly connected are yet to be processed after the current node-p nq: No. of off-diagonal elements in a row-p of [Z] that correspond to directly connected nodes to a node-p nk: No. of off-diagonal elements in a row-p of [Z] that correspond to not directly connected nodes to a node-p= (n−1)−nq n: No. of total elements in a row-p of [Z] that corresponds to total no. of nodes or equations $$ZK_p = k\left\{\sum_{k=1}^{p-1} Z_{pk} + \sum_{k=p+1}^{n} Z_{pk}\right\}/(n-1) \tag{78a}$$

$$IK_p = \left\{\sum_{k=1}^{p-1} I_k + \sum_{k=p+1}^{n} I_k\right\}/(n-1) \text{ OR} \tag{78b}$$

$$\Delta IK_p = \left\{\sum_{k=1}^{p-1} \Delta I_k + \sum_{k=p+1}^{n} \Delta I_k\right\}/(n-1)$$

$$ZK_p = \left\{\sum_{\substack{k=1 \\ k\neq q}}^{p-1} Z_{pk} + \sum_{\substack{k=p+1 \\ k\neq q}}^{n} Z_{pk}\right\}/(nk) \tag{78c}$$

$$IK_p = \left\{\sum_{\substack{k=1 \\ k\neq q}}^{p-1} I_k + \sum_{\substack{k=p+1 \\ k\neq q}}^{n} I_k\right\}(nk) \text{ OR} \tag{78d}$$

$$\Delta IK_p = \left\{\sum_{\substack{k=1 \\ k\neq q}}^{p-1} \Delta I_k + \sum_{\substack{k=p+1 \\ k\neq q}}^{n} \Delta I_k\right\}/(nk)$$

$$I_p = SSH_p^*/V_p^* = (PSH_p - jQSH_p)/(e_p - jf_p) \tag{79a}$$

$$\Delta I_p = SSH_p^*/V_p^* - (Y_{pp} + y_p)V_p - \sum_{q \rightarrow p} Y_{pq}V_q \tag{79b}$$

Sparse Complex Matrix-Z formulation:

$$[V_p^{(sr+1)}]^{(r+1)} = Z_{pp}[\{(I_p)^{(sr)}\}^{(r)}] + \sum_{q \rightarrow p} Z_{pq}I_q^{(r)} \tag{80a}$$

OR $$[V_p^{(sr+1)}]^{(r+1)} = Z_{pp}[I_p)^{(sr)}\}^{(r)}] + \left[\sum_{\substack{q<p \\ q \rightarrow p}} Z_{pq}(I_q)^{(r+1)}\right] + \sum_{\substack{q<p \\ q \rightarrow p}} Z_{pq}(I_q)^{(r)} \tag{80b}$$

-continued $$[V_p^{(sr+1)}]^{(r+1)} = Z_{pp}[\{(I_p)^{(sr)}\}^{(r)}] + (n+1)(ZK_p)(IK_p)^{(r)}: \text{from (78a), (78b)} \quad (80c)$$

OR $$[V_p^{(sr+1)}]^{(r+1)} = Z_{pp}\left[\{(I_p)^{(sr)}\}^{(r)} + \sum_{q \to p} Z_{pq}(I_q)^{(r)}\right] + \quad (80d)$$

$$(nk)(ZK_p)(IK_p)^{(r)}: \text{from (78c), (78d)}$$

OR $$[V_p^{(sr+1)}]^{(r+1)} = Z_{pp}[I_p)^{(sr)}\}^{(r)}] + \left[\sum_{q \to p}^{q<p} Z_{pq}(I_q)^{(r+1)}\right) + \sum_{q \to p}^{q<p} Z_{pq}(I_q)^{(r)}\right] + \quad (80e)$$

$$(nk)(ZK_p)(IK_p)^{(r)}$$

OR

Full Complex Matrix-Z formulation:

$$[V_p^{(sr+1)}]^{(r+1)} = Z_{pp}\left[SSH_p^*/\{(V_p^*)^{(sr)}\}^{(r)}\right] + \quad (80f)$$

$$\sum_{q=1}^{p-1} Z_{pq}(SSH_q^*/(V_q^*)^{(r)}) + \sum_{q=p+1}^{n} Z_{pq}(SSH_q^*/(V_q^*)^{(r)})$$

OR $$[V_p^{(sr+1)}]^{(r+1)} = Z_{pp}\left[SSH_p^*/\{(V_p^*)^{(sr)}\}^{(r)}\right] + \quad (80g)$$

$$\left\{\sum_{q=1}^{p-1} Z_{pq}(SSH_q^*/(V_q^*)^{(r+1)}) + \sum_{q=p+1}^{n} Z_{pq}(SSH_q^*/(V_q^*)^{(r)})\right\}$$

OR

Sparse Complex Matrix-Z formulation:

$$[\Delta V_p^{(sr+1)}]^{(r+1)} = Z_{pp}[\{(\Delta I_p)^{(sr)}\}^{(r)}] + \sum_{q \to p} Z_{pq}(\Delta I_q)^{(r)}) \quad (81a)$$

OR $$[\Delta V_p^{(sr+1)}]^{(r+1)} = \quad (81b)$$

$$Z_{pp}[\{(\Delta I_p)^{(sr)}\}^{(r)}] + \sum_{q \to p}^{q<p} Z_{pq}(\Delta I_q)^{(r+1)}) + \sum_{q \to p}^{q>p} Z_{pq}(\Delta I_q)^{(r)})$$

OR $$[\Delta V_p^{(sr+1)}]^{(r+1)} = \quad (81c)$$

$$Z_{pp}[\{(\Delta I_p)^{(sr)}\}^{(r)}] + (n-1)(ZK_p)(\Delta IK_p)^{(r)}: \text{from (78a), (78b)}$$

OR $$[\Delta V_p^{(sr+1)}]^{(r+1)} = \quad (81d)$$

$$Z_{pp}[\{(\Delta I_p)^{(sr)}\}^{(r)}] + \sum_{q \to p} Z_{pq}(\Delta I_q)^{(r)}) + (nk)(ZK_p)(\Delta IK_p)^{(r)}: \text{(78c), (78d)}$$

OR $$[\Delta V_p^{(sr+1)}]^{(r+1)} = Z_{pp}[\{(\Delta I_p)^{(sr)}\}^{(r)}] + \quad (81e)$$

-continued $$\sum_{q \to p}^{q<p} Z_{pq}(\Delta I_q^*)^{(r+1)}) + \sum_{q \to p}^{q>p} Z_{pq}(\Delta I_q)^{(r)}) + (nk)(ZK_p)(\Delta IK_p)^{(r)}$$

OR

Full Complex Matrix-Z formulation:

$$[\Delta V_p^{(sr+1)}]^{(r+1)} = \quad (81f)$$

$$Z_{pp}[\{(\Delta I_p)^{(sr)}\}^{(r)}] + \sum_{q=1}^{p-1} Z_{pq}(\Delta I_q)^{(r)}) + \sum_{q=p+1}^{n} Z_{pq}(\Delta I_q)^{(r)})$$

OR $$[\Delta V_p^{(sr+1)}]^{(r+1)} = \quad (81g)$$

$$Z_{pp}[\{(\Delta I_p)^{(sr)}\}^{(r)}] + \sum_{q=1}^{p-1} Z_{pq}(\Delta I_q)^{(r+1)}) + \sum_{q=p+1}^{n} Z_{pq}(\Delta I_q)^{(r)})$$

OR $$|V_p^{(r+1)} - V_p^{(r)}| \leq \varepsilon \quad (82)$$

Matrix [Z] can also be made-up of real or complex components, and it is an inverse of coefficient matrix of linear and non-linear equations organized in different possible ways including in super-decoupled form, or an inverse of the Jacobian $[J]^{-1}$ or its different constant or approximated variations including decoupled or super decoupled versions. It should be noted that equations (79a) and (79b) are the same as (20a) and (20) respectively, and (20s) and (23s) are different variations of (20). Equations (78a) to (81g) are provided for the case matrix [Z] is built with network ground as reference and equation for slack-node current $I_s$ and $\Delta I_s$ based on all other calculated nodal I's and $\Delta$I's and known value of slack-node voltage can be written. However, for slack-node as reference requires deletion of a row and a column corresponding to the slack-node from matrix [Z] built from ground as reference, and simple algebraic manipulation of equations (79a) and (79b). In Newton-Raphson (NR) approach based real matrix [Z] which is inverted Jacobian, or its constant Jacobian and Super Decoupled variations, the dimension of real matrix [Z] with a row and column corresponding to the slack-node removed is the same as the complex matrix [Z] with the slack-node as reference. Therefore, for both NR-approach based inverted Jacobian or its variants as real [Z], and real [Z] or complex [Z] built with the slack-node as reference, the definition of "n" becomes "(n−1)" and "nk" becomes nk=(n−2)−nq in the above equations (78a) to (81g).

Steps of loadflow calculation by ZPL or SZPL method are shown in the flowchart of FIG. 5.

It should be noted that FIG. 5 and corresponding calculation steps in the following are for complex (full and sparse) inverted matrix based Gauss method. However, calculation steps for complex (full and sparse) inverted matrix based Gauss-Seidel method are similar to those of EARIGSL method of FIG. 1, and therefore they are not given explicitly. Referring to the flowchart of FIG. 5, different steps are elaborated in steps marked with similar numbers in the following. The words "Read system data" in Step-5_correspond to step-10 and step-20 in FIG. 7, and step-83, step-84, step-86, step-89, step-90 in FIG. 8. All other steps in the following correspond to step-30 in FIG. 7, and step-91, step-92, and step-93 in FIG. 8.

51. Read system data and assign an initial approximate solution. If better solution estimate is not available, set voltage magnitude and angle of all nodes equal to those of the slack-node, referred to as the slack-start or alternatively use flat-start.
52. Form nodal admittance matrix [Y], Initialize iteration count r=0, and define convergence tolerances (say, $\varepsilon M$=0.0001 pu and $\varepsilon V$-self=0.0001 pu).
53. Form and store in bulk storage like hard drive (m+k)×(m+k) size constant full matrix [Z] of {(76) or (77)}, using an algorithm or by fully inverting a coefficient matrix [C] or the Jacobian matrix [J] or their different variants. Compute equivalent elements one for off-diagonal elements in each row of matrix [Z] as per equations (78a) or (78c) and store them in Random Access Memory (RAM), which is shared RAM of all processing units (PUs) in case of a parallel computer (U.S. Pat. No. 7,788,051).
54. Compute complex residue vectors [$\Delta S$] and [($\Delta S/V$)*] using (20) or (23) or (79a) or (79b). However, use calculated value $Q_p$ instead of $QSH_p$ for PV-nodes, implement violated $Q_{max}$ or $Q_{min}$ limits of PV-node generators, and change the status of violated PV-node to PQ-node.
55. Find residue mismatch vectors [$\Delta P$] and [$\Delta Q$] for only at PQ-nodes, a maximum mismatch element DSMX, and if DSMX is less than the mismatch tolerance (say $\varepsilon M$=0.0001 pu), go to step-58 or else follow the next step.
56. Solve {(76) for [V]} or {(77) for [$\Delta V$]}, using Gauss method as per equations (80a) or (80c) or (80d) or (80f) or (81a) or (81c) or (81d), or (81f), or using Gauss-Seidel method as per equations (80b) or (80e) or (80g) or (81b) or (81e) or (81g). Perform Self-Iterations for change in voltage for convergence to tolerance (say, $\varepsilon V$-self=0.0001 pu) for only violated PV-nodes.
57. Update and find accelerated elements of voltage vector [V] A using equation (14), and adjust real and reactive components of not violated PV-node complex voltage for specified voltage magnitude using (15). Increment the iteration count r=r+1, and Go to step-54.
58. Compute complex residues [$\Delta S$], and find residues [$\Delta P$] for PQ and PV nodes, and [$\Delta Q$] only for PQ-nodes, and if all are not less than the mismatch tolerance (say, $\varepsilon M$=0.0001 pu), set $\Delta V$ tolerance for the purpose of self-iterations to (say, $\varepsilon V$-self=0.00001 pu) and go to step-54, otherwise proceed to the next step.
59. From calculated and known values of complex voltage at different power network nodes, and tap position of tap changing transformers, calculate power flows through power network components, reactive power generation at PV-nodes, and real and reactive power generation at the slack node.

It should be noted that the steps of loadflow calculation by ZPL or SZPL methods as in the above are given in a compact form. These steps are applicable to calculation both by a single processor and a multi-processor parallel computer. Particularly, each element of individual vector of vectors [$\Delta S$] and [($\Delta S/V$)*] in step-54, [$\Delta P$] and [$\Delta Q$] in step-55, [V] and [$\Delta V$] in step-56, [V] in step-57, and [$\Delta S$], [$\Delta P$] and [$\Delta Q$] in step-58 is processed in sequence in a single processor computer. Whereas, each element of individual vector is processed on a separate processor, and all elements of each vector is processed simultaneously in a multi-processor parallel computer. The Gauss numerical method is naturally parallel and The Gauss-Seidel numerical method is sequential in nature. However, both applied to ZPL and SZPL methods are capable of being performed by a single processor computer and multi-processor parallel computer. Particularly, SZPL method can be performed using single processor computer almost in the same manner as EARIGSL method and its FIG. 1 as per FIG. 5b by adding step-53 of FIG. 5 for formation and storage of complex matrix [Z], and modifying steps-9 and -11 of FIG. 1 as steps-99 and -111 in FIG. 5b. Therefore, separate steps for solution by sequential SZPL method are not provided. Also SZPL method can be performed almost in the same manner as per parallel GSPL method and its FIG. 3b using multi-processor parallel computer of U.S. Pat. No. 7,788,051 of this applicant/inventor himself. However, detailed steps for performing parallel incremental SZPL method as per FIG. 5c are provided in the following.

Alternative Methods

Alternative to FIG. 2 and FIG. 6 are given as FIG. 2a and FIG. 6a with minor variation in that change in voltage magnitude or real and imaginary components of complex voltage from one iteration to the next is used as convergence criteria for the first part of the method. Detailed steps corresponding to FIG. 2a and FIG. 6a are not given as they become evident by comparing FIG. 2 with FIG. 2a and FIG. 6 with FIG. 6a respectively.

Calculation Steps for Parallel SZPL Method

The steps of parallel SZPL computation method, using patented prior art multi-processor parallel computer of U.S. Pat. No. 7,788,051 of FIG. 10a are shown in the flowchart of FIG. 5c. Referring to the flowchart of FIG. 5b, different steps are elaborated in steps marked with similar numbers in the following. The words "Read system data" in Step-101 correspond to step-10 and step-20 in FIG. 7, and step-83, step-84, step-86, step-89, step-90 in FIG. 8. All other steps in the following correspond to step-30 in FIG. 7, and step-90, step-92, and step-93 in FIG. 8.

101. Read system data and assign an initial approximate solution. If better solution estimate is not available, set specified slack-node voltage magnitude and angle all-nodes referred to as the slack-start. The initial solution guess to begin with is stored in complex voltage vector say, V (I) where "I" takes values from 1 to n, the number of nodes in the whole network. Initialize iteration count r=1. Also form and store full inverse matrix [Z] of {(76) or (77)} in hard drive, store diagonal and relevant off-diagonal elements of [Z] corresponding to off-diagonal elements in sparse [Y] including equivalents as per (78a) or (78c) in shared Random Access Memory (RAM) of multi-processor parallel computer (MPPC) of FIG. 10a or FIG. 10b.
102. Form matrix [Y] of each sub-network comprising a-node and its directly connected nodes and store it in the private memory (PM) of the corresponding each processor of the MPPC, wherein all MPPC simultaneously access network-wide global data stored in commonly shared RAM, which can be under the control of server-processor.
103. Read into the PM of each processor, diagonal and relevant off-diagonal elements of [Z] corresponding to off-diagonal elements in sparse [Y] including equivalents as per (78a) or (78c) from shared RAM for a relevant sub-network of a node and its directly connected nodes for each processor.
104. Initialize complex voltage vector, say VV (I)=CMPLEX (0.0, 0.0) that receives solution contributions from sub-networks of processors of MPPC, and initialize a real vector, say DSMX(I) wherein its component element is maximum value of component elements of vectors [ΔP] and [ΔQ] at PQ-nodes, and [ΔP] at PV-nodes of the sub-network of each corresponding processor of MPPC.

105. All processors simultaneously access network-wide global latest solution estimate vector V (I) available in the shared RAM to read into the PM of each processor the required component elements of the vector V (I), and perform 2-SZPL iterations for each sub-network, steps-4 to 12 in FIG. 5b, to calculate new accelerated estimate of voltage of each sub-network nodes and output DSMX(I) component element of each sub-network into shared memory.

106. As soon as 2-iterations are performed for a sub-network, its new local solution estimate is contributed to the vector VV (I) in commonly shared memory under the control of server processor without any need for the synchronization. It is possible that small sub-network finished 2-iterations and already contributed to the vector VV (I) while 2-iterations are still being performed for the larger sub-network.

107. Contribution from a sub-network to the vector VV (I) means, the complex voltage estimate calculated for the nodes of the sub-network are added to the corresponding elements of the vector VV (I). After all sub-networks finished 2-iterations and contributed to the vector VV (I), its each element is divided by the number of contributions from all sub-networks to each element or divided by number of nodes directly connected to the node represented by the vector element, leading to the transformation of vector VV (I) into the new network-wide global solution estimate. This operation is performed as indicated in relation (30) or (35). This step requires synchronization in that the division operation on each element of the vector VV(I) can be performed only after all sub-networks are solved and have made their contribution to the vector VV(I). Perform V(I)=VV(I).

108. Find the maximum of all component elements of mismatch vector DSMX(I) available in the shared RAM, and store it as MXDS, and if MXDS is not less than mismatch tolerance EM (say, 0.0001 pu), increment iteration count r=r+1 and go to step-24, or else follow the next step.

109. Calculate each node component element of vector DSMX(I) stored in the shared RAM wherein its component element is maximum value of component elements of vectors [ΔP] and [ΔQ] at a PQ-node, and component element of vector [ΔP] at a PV-node of the network, which is calculated by separate processor of MPPC for each network node 110. Find the maximum of all component elements of mismatch vector DSMX(I) available in the shared RAM, and store it as MXDS, and if MXDS is not less than mismatch tolerance εM (say, 0.0001 pu) go to step-24, or else follow the next step.

111. From calculated values of complex voltage at different power network nodes, and tap position of tap changing transformers, calculate power flows through power network components, and reactive power generation at PV-nodes.

It can be seen that steps-102, -103, -105, and -109 are performed in parallel. While other steps are performed by the server-processor. However, with the refined programming, it is possible to delegate some of the server-processor tasks to the parallel-processors. For example, any assignment functions of step-101 and step-104 can be performed in parallel. Even reading of system data can be performed in parallel particularly in distributed computing environment where each sub-network data can be read in parallel by substation computers connected to operate in parallel.

Hybrid Iteration Scheme Involving Solution of SZPL Model for PQ-Nodes, and EARIGSL Model for PV-Nodes In this scheme {(76) or (77)} is solved only for PQ-nodes, and equation {(7) or (9)} is solved for only PV-nodes in an iteration scheme that may be referred to as (1SZPL, 1EARIGSL) or (1EARIGSL, 1SZPL) or in many possible other combinations to be determined experimentally. The scheme can involve {(76) or (77)} and {(7) or (9)} solved alternatively with intermediate updating or simultaneously without intermediate updating. Solution steps for hybrid version of the method in the following are given with intermediate updating for iteration scheme referred to as (1SZPL, 1EARIGSL). The solution steps of all methods of this application are preliminary and can potentially change based on experimental investigations.

Steps of loadflow calculation by HZPL or HSZPL method are shown in the flowchart of FIG. 6. It should be noted that FIG. 6 and corresponding calculation steps in the following are for complex (full and sparse) inverted matrix based Gauss method. However, calculation steps for complex (full and sparse) inverted matrix based Gauss-Seidel method are similar to those of EARIGSL method of FIG. 1, and therefore they are not given explicitly. Referring to the flowchart of FIG. 6, different steps are elaborated in steps marked with similar numbers in the following. The words "Read system data" in Step-71 correspond to step-10 and step-20 in FIG. 7, and step-83, step-84, step-86, step-89, step-90 in FIG. 8. All other steps in the following correspond to step-30 in FIG. 7, and step-91, step-92, and step-93 in FIG. 8.

71. Read system data and assign an initial approximate solution. If better solution estimate is not available, set voltage magnitude and angle of all nodes equal to those of the slack-node, referred to as the slack-start or alternatively use flat-start.

72. Form nodal admittance matrix [Y], Initialize iteration count r=0, and define convergence tolerances (say, εM=0.0001 pu and εV-self=0.0001 pu). 73. Form and store in bulk storage like hard drive (m)×(m) size constant full matrix [Z] of {(76) or (77)}, using an algorithm or by fully inverting a coefficient matrix [C] or the Jacobian matrix [J] or their different variants. Compute equivalent elements one for off-diagonal elements in each row of matrix [Z] as per equations (78a) or (78c) and store them in Random Access Memory (RAM), which is shared RAM of all processing units (PUs) in case of a parallel computer (U.S. Pat. No. 7,788,051).

74. Compute complex residues [ΔS] and [(ΔS/V)*] for only PQ-nodes using (20) or (23) or (79a) or (79b), find residue mismatch vectors [ΔP] and [ΔQ] for only at PQ-nodes and a maximum mismatch element DSMX, and if DSMX is less than the mismatch tolerance (say εM=0.0001 pu), go to step-78, otherwise follow the next step.

75. Solve {(76) for [V]} or {(77) for [ΔV]} for only PQ-nodes, using Gauss method as per (80a) or (80c) or (80d) or (80f) or (81a) or (81c) or (81d), or (81f), or using Gauss-Seidel method as per (80b) or (80e) or (80g) or (81b) or (81e) or (81g), and update and find accelerated elements of vector [V] by (14).

76. For PV-nodes, adjust real and reactive components of PV-node complex voltage for specified voltage magnitude using (15), compute $Q_p$ using (8), perform $QSH_p=Q_p$, implement violated $Q_{max}$ or $Q_{min}$ limits of PV-node generators and change the status of violated PV-node to PQ-node.

77. Solve for $[\Delta V]$ using (7) for not violated PV-nodes and adjust real and reactive components of PV-node complex voltage for specified voltage magnitude using (15), solve for $[\Delta V]$ using (9) involving Self-Iterations for violated PV-nodes, and update $[V]=[V]+[\Delta V]$ for PV-nodes using (14). Increment the iteration count r=r+1, and Go to step-74.

78. Compute complex residues $[\Delta S]$, and find residues $[\Delta P]$ for PQ and PV nodes, and $[\Delta Q]$ only at PQ-nodes, and if all are not less than the mismatch tolerance (say, εM=0.0001 pu), set $\Delta V$ tolerance for the purpose of self-iterations to (say, εV-self=0.00001 pu) and go to step-74, otherwise proceed to the next step.

79. From calculated and known values of complex voltage at different power network nodes, and tap position of tap changing transformers, calculate power flows through power network components, reactive power generation at PV-nodes, and real and reactive power generation at the slack node.

Convergence Pattern Data Analytics based Patel Loadflow (CPDA-PL)

It involves analyzing a convergence pattern of an iterative solution method, and determining an acceleration factor for each equation solution. One approach is to directly map a first iteration solution or correction into a converged solution. This is achieved by dividing the converged solution by the first iteration solution and taking a ratio as acceleration factor for the first iteration solution. Another way of finding the acceleration factor for the first iteration correction is by finding a difference between the converged solution and an initial estimate solution and dividing a difference by the first iteration correction. Then the first iteration solution becomes the initial estimate solution for a second iteration solution and a process of finding the acceleration factors for the second iteration solution and the second iteration corrections for different equations is repeated like that of the first iteration solution or correction, and the process is continued for the rest of iterations until convergence. This approach can potentially produce converged solution in two iterations and at the most three iterations. However, it requires extensive experimentation and formulation of certain rules for determining acceleration factors for implementation in programming.

Parallel Processing and Parallel Computer Architecture

U.S. Pat. Nos. 7,788,051 and 9,891,827 of this inventor and applicant are incorporated here by reference as patented prior art. FIG. 10a is reproduced here FIG. 4 of U.S. Pat. No. 7,788,051, and FIG. 10b reproduced FIG. 2a of U.S. Pat. No. 9,891,827 for easy reference to patented best possible parallel computer architectures. FIG. 2a reproduced as FIG. 10b of U.S. Pat. No. 9,891,827 implements wireless interconnections among components of Parallel Computer, wherein different symbols are defined as follows:

MP: Main or Server Processor, which is a Delegating and Coordinating Processor and Usually is a CPU.

PU: a Processing Unit, which can be a Central Processing Unit (CPU), or a Graphical processing Unit (GPU), or a Field Programmable Gate Array (FPGA), or an Application Specific Processing Unit (ASPU) like Tensor Processing Unit (TPU).

PM: a Private Memory for each PU, which is not accessible by any other component of Parallel Computer, and it is different than the generic cache memory requiring complicated cache coherence.

SMU: Shared Memory Unit, and different SMUs can be accessed by different PUs simultaneously that reduces the contention for memory access by different processors unlike as in case of large single Common Shared Memory Unit (SMU) of FIG. 10a Shared by all processors. SMUs can be made up of a prior art patented memory technology of (U.S. Pat. No. 7,788,051) non-volatile optical Random Access Memory (RAM) or a generic RAM.

TRA: Transmitter-Receiver-Antenna, wherein antenna is common for both Transmitter and Receiver.

Equations (80a) or (80b) or (80c) or (80d) or (80e) or (81a) or (81b) or (81c) or (81d) or (81e) are Sparse Inverse matrix based formulations of loadflow calculation problem called SZPL or SCIPL models. The EARIGSL model is inherently solved by sequential steps. Therefore, sequential steps for the solution of (80b) or (80e) or (80g) or (81b) or (81e) or (81g) are similar to those of EARIGSL model and corresponding FIG. 6, and they are not given explicitly.

However, {(80b) or (80e) or (80g) or (81b) or (81e) or (81g)} or {(2) or (7) or (9)} can be solved in parallel by the technique of U.S. Pat. No. 7,788,051 as per its flow-chart of FIG. 3b using its the best possible parallel computer architecture of FIG. 4 (reproduced as FIG. 10a in this application). The parallel solution technique of U.S. Pat. No. 7,788,051 involves decomposition of a whole n-node problem into n-sub-problems each being comprised of a node and its directly connected nodes, and solving each sub-problem on different processor wherein all different processors are coordinated by a main or server processor. The solution of each sub-problem (each sub-network: a node and its directly connected nodes) on different processors is then coordinated (mapped) into network wide a whole n-node problem solution. The process of mapping solutions of subnetworks into the network wide a whole n-node problem solution is summarized by the following steps:

initializing at the beginning of each new iteration, a vector of dimension equal to the number of nodes in the power network with each element value zero, solving all sub-networks in parallel using available solution estimate at the start of each iteration, adding newly calculated solution estimates or corrections to available solution estimate for a node resulting from different sub-networks, say, 'q' number of sub-networks, in which the node is contained, in a corresponding to the node vector element that gets initialized zero at the beginning of each new iteration, counting the number of additions and calculating new solution estimate or correction to the available solution estimate by taking the average using any relevant relations that are not numbered given below depending on the loadflow computation method used, and storing the new solution estimate at the end of the current iteration as initial available solution estimate at the start of the next iteration.

Equations (100), (97), (98), (93), and (94) in the following are the same equations (30), (31), (32), (33), and (34) respectively of the U.S. Pat. No. 7,788,051. Equations (95) and (96) are incremental and obvious versions of (93) and (94). similarly, equation (99) is incremental and obvious version of (100) in complex form.

$$e_p^{(r+1)}=(e_{p1}^{(r+1)}+e_{p2}^{(r+1)}+e_{p3}^{(r+1)}+\ldots+e_{pq}^{(r+1)})/q \quad (83)$$

$$f_p^{(r+1)}=(f_{p1}^{(r+1)}+f_{p2}^{(r+1)}+f_{p3}^{(r+1)}+\ldots+f_{pq}^{(r+1)})/q \quad (84)$$

OR $$\Delta e_p^{(r+1)} = (\Delta e_{p1}^{(r+1)} + \Delta e_{p2}^{(r+1)} + \Delta e_{p3}^{(r+1)} + \ldots + \Delta e_{pq}^{(r+1)})/q \quad (85)$$

$$\Delta f_p^{(r+1)} = (\Delta f_{p1}^{(r+1)} + \Delta f_{p2}^{(r+1)} + \Delta f_{p3}^{(r+1)} + \ldots + \Delta f_{pq}^{(r+1)})/q \quad (86)$$

OR $$\Delta \theta_p^{(r+1)} = (\Delta \theta_{p1}^{(r+1)} + \Delta \theta_{p2}^{(r+1)} + \ldots + \Delta \theta_{pq}^{(r+1)})/q \quad (87)$$

$$\Delta V_p^{(r+1)} = (\Delta V_{p1}^{(r+1)} + \Delta V_{p2}^{(r+1)} + \ldots + \Delta V_{pq}^{(r+1)})/q \quad (88)$$

OR $$\Delta V_p^{(r+1)} = (\Delta V_{p1}^{(r+1)} + \Delta V_{p2}^{(r+1)} + \ldots + \Delta V_{pq}^{(r+1)})/q \quad (89)$$

$$V_p^{(r+1)} = (V_{p1}^{(r+1)} + V_{p2}^{(r+1)} + \ldots + V_{pq}^{(r+1)})/q \quad (90)$$

Similarly, (80a) or (80c) or (80d) or (80f) or (81a) or (81c) or (81d) or (81f) for different nodes can be solved on a single computer in sequence without immediate updating of nodal solution or said equations for different nodes can be solved simultaneously in parallel on different processors. Steps involving vectors {[I] or [ΔI]}, {[V] or [ΔV]}, and [V0] in FIG. 5, wherein each component of vector is computed in parallel on different processors, and the rest of the steps are performed in sequence on Server Processor (delegating and coordinating processor of FIG. 10a in similar corresponding steps of parallel computation in FIG. 3b of U.S. Pat. No. 7,788,051.

Patel Loadflow (PL) Model

Equations (1), (20a), (30), (31) can be organized in matrix form as per Patel Numerical Method:

$$\begin{pmatrix} IR \\ II \end{pmatrix} = \begin{pmatrix} -B & G \\ -G & -B \end{pmatrix} \begin{pmatrix} f \\ e \end{pmatrix} \quad (91)$$

Patel Transformation Decoupled Loadflow Model $$[IR'] = [-Y][f] \quad (92)$$

$$[II'] = [-Y][e] \quad (93)$$

where, $$IR_p' = (e_p PSH_p' + f_p QSH_p')/(e_p^2 + f_p^2) \quad (94)$$

$$II_p' = (e_p QSH_p' - f_p PSH_p')/(e_p^2 + f_p^2) \quad (95)$$

This is the model where elements of equations (92) and (93) are defined by following equations.

$$[-Y] = [-B] + [G][-B]^{-1}[G] \quad (96)$$

$$[IR'] = [IR] - [G][-B]^{-1}[II] \quad (97)$$

$$[II'] = [II] + [G][-B]^{-1}[RI] \quad (98)$$

Regular loadflow models can also be obtained by differentiating on both sides of equations (91), (92) and (93).

Generalized Gauss-Seidel-Patel Numerical Method for Solution of System of Simultaneous Algebraic Equations Both Linear and Nonlinear:

A linear system of equations Ax=b can be written for any equation-p as equations (100) and (99). They can also be written in alternative forms like equation (2) including factor $L_p$ of (4).

$$x_p^{(r+1)} = \left( \sum_{q=1}^{p-1} a_{pq} x_q^{(r+1)} + \sum_{q=p+1}^{n} a_{pq} x_q^r \right) / [\{b_p/(x_p)^r\} - a_{pp}] \quad (99)$$

$$(x_p^{(sr+1)})^{(r+1)} = \left( \sum_{q=1}^{p-1} a_{pq} x_q^{(r+1)} - \sum_{q=p+1}^{n} a_{pq} x_q^r \right) / [\{b_p/((x_p)^{sr})^r\} - a_{pp}] \quad (100)$$

A nonlinear system of equations f(x)=y can be written for any equation-p as equations (9), which is specifically a nonlinear power flow equation of a power network involving complex variables and constant parameters.

Equations (100) and (9) are defining equations of Generalized Gauss-Seidel-Patel numerical method involving self-iterations. It should be noted that self-iterations within global iterations are analogous to the earth rotating on its own axis while making rounds around the Sun. This generalized approach for solution of both linear and nonlinear system of simultaneous algebraic equations could potentially be amenable to acceleration factors greater than 2 unlike original Gauss-Seidel numerical method subject to experimental numerical verification. Further verbal elaborations about the Generalized Gauss-Seidel-Patel numerical method will be provided as part of the proposed book writing project.

General Statements

The system stores a representation of the reactive capability characteristic of each machine and these characteristics act as constraints on the reactive power, which can be calculated for each machine.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respect as illustrative and not restrictive, the scope of the invention being indicated by the appended claims in addition to the foregoing description, and all changes which come within the meaning and range of equivalency of the claims are therefore intended to be embraced therein.

What is claimed is:

1. A Method of forming and solving a Loadflow computation model of a power network to affect control of voltages and power flows in a power system, comprising the steps of:
obtaining on-line or simulated data, via an input port into a random access memory (RAM) of a computer using its processor, of open/close status of all switches and circuit breakers in the power network, and reading data, via the input port into the RAM of the computer using its processor, of operating limits of components of the power network including maximum Voltage×Ampere (VA or MVA) carrying capability limits of transmission lines, transformers, and PV-node, a generator-node where Real-Power-P and Voltage-Magnitude-V are specified/set, maximum and minimum reactive power generation capability limits of generators, transformers tap position limits, and water/steam/gas inlet limits of turbines driving generators or stated alternatively in a single statement as reading, via the input port into the RAM of the computer using its processor, data of operating limits of components of the power network, obtaining on-line readings, via the input port into the RAM of the computer using its processor, of specified/set Real-Power-P and Reactive-Power-Q at PQ-nodes, Real-Power-P and voltage-magnitude-V at PV-nodes, voltage magnitude and angle at a slack node, and transformer turns ratios, wherein said on-line readings are the controlled variables or parameters, performing loadflow computation, using the computer comprising the processor, the RAM, and the inputs and outputs, by forming and solving the loadflow computation model of the power network to calculate, complex voltages or their real and imaginary components or voltage magnitudes and voltage angles at the nodes of the power network providing for calculation of power flow through components of the power network, and to calculate reactive power generations at the PV-nodes and the slack node, real power generation at the slack node and tap-position indications of tap-changing transformers in dependence of the said obtained on-line readings of specified/set values of the controlled variables or parameters, forming and solving said loadflow computation model of the power network referred to as a sparse inverse of complex coefficient matrix [C] as $[C]^{-1}$ called a sparse-matrix [Z], based Patel Loadflow- (SCIPL or SZPL) characterized by and comprising equations {(76) to (82)} listed in the following:

$$[V] = [Z]\{[\Delta I] \text{ or } [I]\} \text{OR} \tag{76}$$

$$[\Delta V] = [Z][\Delta I] \tag{77}$$

wherein, components of complex voltage, complex current, complex voltage correction, complex current mismatch vectors [V], [I], [ΔV], [ΔI], and special Symbols are defined in the following:

$q \rightarrow p$: means node q is directly connected to node-p $_{q<p}$: means node-q among directly connected are processed prior to the current node-p $_{q>p}$: means node-q among directly connected are yet to be processed after the current node-p nq: No. of off-diagonal elements in a row-p of [Z] that correspond to directly connected nodes to a node-p nk: No. of off-diagonal elements in a row-p of [Z] that correspond to not directly connected nodes to a node-p=(n−1)−nq n: No. of total elements in a row-p of [Z] that corresponds to total no. of nodes or equations $$ZK_p = \left\{ \sum_{k=1}^{p-1} Z_{pk} + \sum_{k=p+1}^{n} Z_{pk} \right\} / (n-1) \tag{78a}$$

$$IK_p = \left\{ \sum_{k=1}^{p-1} I_k + \sum_{k=p+1}^{n} I_k \right\} / (n-1) \text{ OR} \tag{78b}$$

$$\Delta IK_p = \left\{ \sum_{k=1}^{p-1} \Delta I_k + \sum_{k=p+1}^{n} \Delta I_k \right\} / (n-1)$$

$$ZK_p = \left\{ \sum_{\substack{k=1 \\ k \neq q}}^{p-1} Z_{pk} + \sum_{\substack{k=p+1 \\ k \neq q}}^{n} Z_{pk} \right\} / (nk) \tag{78c}$$

$$IK_p = \left\{ \sum_{\substack{k=1 \\ k \neq q}}^{p-1} I_k + \sum_{\substack{k=p+1 \\ k \neq q}}^{n} I_k \right\} n / (nk) \text{ OR} \tag{78d}$$

$$\Delta IK_p = \left\{ \sum_{\substack{k=1 \\ k \neq q}}^{p-1} \Delta I_k + \sum_{\substack{k=p+1 \\ k \neq q}}^{n} \Delta I_k \right\} / (nk)$$

$$I_p = SSH_p^* / V_p^* = (PSH_p - jQSH_p)/(e_p - jf_p) \tag{79a}$$

$$\Delta I_p = SSHV_p^* - (Y_{pp} + y_p)V_p - \sum_{q \rightarrow p} Y_{pq} V_q \tag{79b}$$

Sparse Complex Matrix-Z formulation:

$$[V_p^{(sr+1)}]^{(r+1)} = Z_{pp}[\{(I_p)^{(sr)}\}^{(r)}] + \sum_{q \rightarrow p} Z_{pq} I_q^{(r)} \tag{80a}$$

$$[V_p^{(sr+1)}]^{(r+1)} = Z_{pp}[I_p^{(sr)}]^{(r)} + \sum_{q \rightarrow p}^{q<p} Z_{pq}(I_q)^{(r+1)} + \sum_{q \rightarrow p}^{q>p} Z_{pq}(I_q)^{(r)}] \tag{80b}$$

$$[V_p^{(sr+1)}]^{(r+1)} = Z_{pp}[\{(I_p)^{(sr)}\}^{(r)}] + (n-1)(ZK_p)(IK_p)^{(r)}: \text{ from (78a),} \tag{80c}$$

$$\tag{78b}$$

$$[V_p^{(sr+1)}]^{(r+1)} = Z_{pp}[\{(I_p)^{(sr)}\}^{(r)}] + \tag{80d}$$

$$\sum_{q \rightarrow p} Z_{pq}(I_q)^{(r)} + (nk)(ZK_p)(IK_p)^{(r)}: \text{ from (78c), (78d)}$$

$$[V_p^{(sr+1)}]^{(r+1)} = Z_{pp}[I_p)^{(sr)}\}^{(r)}] + \tag{80e}$$

$$\left[ \sum_{q \rightarrow p}^{q<p} Z_{pq}(I_q)^{(r+1)} + \sum_{q \rightarrow p}^{q>p} Z_{pq}(I_q)^{(r)} \right] + (nk)(ZK_p)(IK_p)^{(r)}$$

$$[\Delta V_p^{(sr+1)}]^{(r+1)} = Z_{pp}[\{(\Delta I_p)^{(sr)}\}^{(r)}] + \sum_{q \rightarrow p} Z_{pq}(\Delta I_q)^{(r)}) \tag{81a}$$

$$[\Delta V_p^{(sr+1)}]^{(r+1)} = \tag{81b}$$

$$Z_{pp}[\{(\Delta I_p)^{(sr)}\}^{(r)}] + \sum_{q \rightarrow p}^{q<p} Z_{pq}(\Delta I_q)^{(r+1)}) + \sum_{q \rightarrow p}^{q>p} Z_{pq}(\Delta I_q)^{(r)})$$

$$[\Delta V_p^{(sr+1)}]^{(r+1)} = \tag{81c}$$

$$Z_{pp}[\{(\Delta I_p)^{(sr)}\}^{(r)}] + (n-1)(ZK_p)(\Delta IK_p)^{(r)}: \text{ from (78a), (78b)}$$

$$[\Delta V_p^{(sr+1)}]^{(r+1)} = Z_{pp}[\{(\Delta I_p)^{(sr)}\}^{(r)}] + \tag{81d}$$

$$\sum_{q \rightarrow p} Z_{pq}(\Delta I_q)^{(r)}) + (nk)(ZK_p)(\Delta IK_p)^{(r)}: \text{ from (78c), (78d)}$$

$$[\Delta V_p^{(sr+1)}]^{(r+1)} = Z_{pp}[\{(\Delta I_p)^{(sr)}\}^{(r)}] + \tag{81e}$$

$$\sum_{q \rightarrow p}^{q<p} Z_{pq}(\Delta I_q^*)^{(r+1)}) + \sum_{q \rightarrow p}^{q>p} Z_{pq}(\Delta I_q)^{(r)}) + (nk)(ZK_p)(\Delta IK_p)^{(r)}$$

$$|V_p^{(r+1)} - V_p^{(r)}| \leq \varepsilon \tag{82}$$

wherein, superscript "r" is an iteration count, and superscript "sr" is a self-iteration count, evaluating results of said loadflow computation, using the processor of the computer, for over loaded components and for under or over voltage at the nodes of the power network by comparing with data of operational limits of the components and the variables or parameters of the power network, stored and available in the RAM of the computer, correcting one or more controlled variables or parameters, using the processor of the computer, and repeating the performing loadflow computation, evaluating, and correcting steps until evaluating step finds no over loaded components and no under or over voltages in the power network, and affecting a change in power flow through components of the power network and voltage magnitudes and angles at the nodes of the power network by actually implementing the finally obtained values of controlled variables or parameters after evaluating step finds a good power system or stated alternatively the power network without overloaded components and under or over voltages, using the computer and digital to analog converters whose inputs are connected to output ports of the computer and outputs are connected to electromagnetic field controllers (exciters) of PV-node generators, transformer tap position controllers, and steam/water/gas inlet controllers of turbines driving the generators.

2. The method as defined in claim 1, wherein, the complex matrix [Z], and the complex vectors [ΔI], [I], [ΔV], [V] can also be a real matrix [Z], and real vectors [ΔI], [I], [ΔV], [V] with double the dimensions arrived at by splitting complex equations into their real and imaginary components equations, and both, the complex matrix [Z] and the real matrix [Z] are inverses of coefficient matrices of linear or non-linear equations written respectively in complex and real form, and in particular the real matrix [Z] can be an inverse of the Jacobian $[J]^{-1}$ including its super decoupled versions.

3. The method as defined in claim 2 is accelerated by analyzing its convergence pattern, and determining an acceleration factor for each component or each node voltage of a first iteration solution by two approaches, one being a division of each component of a converged solution by each corresponding component of the first iteration solution and taking a ratio as the acceleration factor for the corresponding component of the first iteration solution, and an another being a division of differences of each component of the converged solution and corresponding each component of an initial solution estimate by each corresponding component of a first iteration correction vector and taking the ratio as an acceleration factor for each corresponding component of the first iteration correction vector, and formulating rules for determining the acceleration factor for each component of the first iteration solution or correction vector.

4. A Method of forming and solving a Loadflow computation model of a power network to affect control of voltages and power flows in a power system, comprising the steps of:

obtaining on-line or simulated data, via an input port into a shared RAM of a parallel computer using its main processor, of open or close status of all switches and circuit breakers in the power network, and reading data, via the input port into the shared RAM of the parallel computer using its main processor, of operating limits of components of the power network including maximum Voltage×Ampere (VA or MVA) carrying capability limits of transmission lines, transformers, and PV-node, a generator-node where Real-Power-P and Voltage-Magnitude-V are specified/set, maximum and minimum reactive power generation capability limits of generators, and transformers tap position limits, and water/steam/gas inlet limits of turbines driving generators or stated alternatively in a single statement as reading, via the input port into the shared RAM of the parallel computer using its main processor, data of operating limits of components of the power network, obtaining on-line readings, via the input port into the shared RAM of the parallel computer using its main processor, of specified/set Real-Power-P and Reactive-Power-Q at PQ-nodes, Real-Power-P and voltage-magnitude-V at PV-nodes, voltage magnitude and angle at a slack node, and transformer turns ratios, wherein said on-line readings are the controlled variables or parameters, performing loadflow computation, using the parallel computer comprising the main processor coordinating multiple processing units (PUs) each having a private memory, the shared RAM accessible by all the PUs, and the inputs and outputs, by forming and solving the loadflow computation model of the power network to calculate, complex voltages or their real and imaginary components or voltage magnitudes and voltage angles at the nodes of the power network providing for calculation of power flow through components of the power network, and to calculate reactive power generations at the PV-nodes and the slack node, real power generation at the slack node and tap-position indications of tap-changing transformers in dependence of the said obtained on-line readings of specified/set values of the controlled variables or parameters, forming said loadflow computation model of the power network referred to as a sparse inverse of complex coefficient matrix [C] as $[C]^{-1}$ called a sparse-matrix [Z], based Patel Loadflow- (SCIPL or SZPL) characterized by and comprising equations {(76) to (82)} listed in the following:

$$[V]=[Z]\{[\Delta I] \text{ or } [I]\} \text{OR} \tag{76}$$

$$[\Delta V]=[Z][\Delta I] \tag{77}$$

wherein, components of complex voltage, complex current, complex voltage correction, complex current mismatch vectors [V], [I], [ΔV], [ΔI], and special Symbols are defined in the following:

$q \rightarrow p$: means node q is directly connected to node-p $q<p$: means node-q among directly connected are processed prior to the current node-p $q>p$: means node-q among directly connected are yet to be processed after the current node-p nq: No. of off-diagonal elements in a row-p of [Z] that correspond to directly connected nodes to a node-p nk: No. of off-diagonal elements in a row-p of [Z] that correspond to not directly connected nodes to a node-p=(n−1)−nq n: No. of total elements in a row-p of [Z] that corresponds to total no. of nodes or equations $$ZK_p = \left\{\sum_{k=1}^{p-1} Z_{pk} + \sum_{k=p+1}^{n} Z_{pk}\right\}/(n-1) \tag{78a}$$

$$IK_p = \left\{\sum_{k=1}^{p-1} I_k + \sum_{k=p+1}^{n} I_k\right\}/(n-1) \quad \text{OR} \quad \Delta IK_p = \left\{\sum_{k=1}^{p-1} \Delta I_k + \sum_{k=p+1}^{n} \Delta I_k\right\}/(n-1) \tag{78b}$$

$$ZK_p = \left\{\sum_{\substack{k=1 \\ k \neq q}}^{p-1} Z_{pk} + \sum_{\substack{k=p+1 \\ k \neq q}}^{n} Z_{pk}\right\}/(nk) \tag{78c}$$

$$IK_p = \left\{\sum_{\substack{k=1 \\ k \neq q}}^{p-1} I_k + \sum_{\substack{k=p+1 \\ k \neq q}}^{n} I_k\right\}/(nk) \quad \text{OR} \quad \Delta IK_p = \left\{\sum_{\substack{k=1 \\ k \neq q}}^{p-1} \Delta I_k + \sum_{\substack{k=p+1 \\ k \neq q}}^{n} \Delta I_k\right\}/(nk) \tag{78d}$$

$$I_p = SSH_p^*/V_p^* = (PSH_p - jQSH_p)/(e_p - jf_p) \tag{79a}$$

-continued $$\Delta I_p = SSH_p^*/V_p^* - (Y_{pp} + y_p)V_p - \sum_{q \to p} Y_{pq}V_q \quad (79b)$$

Sparse Complex Matrix-Z formulation:

$$[V_p^{(sr+1)}]^{(r+1)} = Z_{pp}[\{(I_p)^{(sr)}\}^{(r)}] + \sum_{q \to p} Z_{pq}I_q^{(r)} \quad (80a)$$

OR $$[V_p^{(sr+1)}]^{(r+1)} = Z_{pp}[\{(I_p)^{(sr)}\}^{(r)}] + \left[\sum_{q \to p}^{q>p} Z_{pq}(I_q)^{(r+1)} + \sum_{q \to p}^{q<p} Z_{pq}(I_q)^{(r)}\right] \quad (80b)$$

OR $$[V_p^{(sr+1)}]^{(r+1)} = \quad :\text{from } (78a), (78b) \quad (80c)$$
$$Z_{pp}[\{(I_p)^{(sr)}\}^{(r)}] + (n-1)(ZK_p)(IK_p)^{(r)}$$

OR $$[V_p^{(sr+1)}]^{(r+1)} = \quad :\text{from } (78c), (78d) \quad (80d)$$
$$Z_{pp}[\{(I_p)^{(sr)}\}^{(r)}] + \sum Z_{pq}(I_q)^{(r)} + (nk)(ZK_p)(IK_p)$$

OR $$[V_p^{(sr+1)}]^{(r+1)} = Z_{pp}[\{(I_p)^{(sr)}\}^{(r)}] + \quad (80e)$$
$$\left[\sum_{q \to p}^{q<p} Z_{pq}(I_q)^{(r+1)} + \sum_{q \to p}^{q>p} Z_{pq}(I_q)^{(r)}\right] + (nk)(ZK_p)(IK_p)^{(r)}$$

OR $$[\Delta V_p^{(sr+1)}]^{(r+1)} = Z_{pp}[\{(\Delta I_p)^{(sr)}\}^{(r)}] + \sum_{q \to p} Z_{pq}(\Delta I_q)^{(r)} \quad (81a)$$

OR $$[\Delta V_p^{(sr+1)}]^{(r+1)} = \quad (81b)$$
$$Z_{pp}[\{(\Delta I_p)^{(sr)}\}^{(r)}] + \left[\sum_{q \to p}^{q<p} Z_{pq}(\Delta I_q)^{(r+1)} + \sum_{q \to p}^{q>p} Z_{pq}(\Delta I_q)^{(r)}\right]$$

OR $$[\Delta V_p^{(sr+1)}]^{(r+1)} = \quad :\text{from } (78a), (78b) \quad (81c)$$
$$Z_{pp}[\{(\Delta I_p)^{(sr)}\}^{(r)}] + (n-1)(ZK_p)(\Delta IK_p)^{(r)}$$

OR $$[\Delta V_p^{(sr+1)}]^{(r+1)} = Z_{pp}[\{(\Delta I_p)^{(sr)}\}^{(r)}] + \quad :\text{from}(78c), (78d) \quad (81d)$$
$$\sum_{q \to p} Z_{pq}(\Delta I_q)^{(r)} + (nk)(ZK_p)(\Delta IK_p)^{(r)}$$

OR $$[\Delta V_p^{(sr+1)}]^{(r+1)} = Z_{pp}[\{(\Delta I_p)^{(sr)}\}^{(r)}] + \quad (81e)$$
$$\left[\sum_{q \to p}^{q>p} Z_{pq}(\Delta I_q)^{(r+1)} + \sum_{q \to p}^{q>p} Z_{pq}(\Delta I_q)^{(r)} + (nk)(ZK_p)(\Delta IK_p)^{(r)}\right]$$

$$|V_p^{(r+1)} - V_p^{(r)}| \leq \varepsilon \quad (82)$$

wherein, superscript "r" is an iteration count, and superscript "sr" is a self-iteration count, solving said loadflow computation model of the power network referred to as SCIPL or SZPL, using the parallel computer by decomposing a whole n-node problem into n-sub-problems each being comprised of a node and its directly connected nodes, and solving each sub-problem on one separate PU wherein the solution of each sub-problem is then mapped into the power network wide the whole n-node problem solution, evaluating results of said loadflow computation, using the main processor of the parallel computer, for over loaded components and for under or over voltage at the nodes of the power network by comparing with data of operational limits of the components and the variables or parameters of the power network, stored and available in the shared RAM of the parallel computer, correcting one or more controlled variables or parameters, using the main processor of the parallel computer, and repeating the performing loadflow computation, evaluating, and correcting steps until evaluating step finds no over loaded components and no under or over voltages in the power network, and affecting a change in power flow through components of the power network and voltage magnitudes and angles at the nodes of the power network by actually implementing the finally obtained values of controlled variables after evaluating step finds a good power system or stated alternatively the power network without overloaded components and under or over voltages, using the parallel computer and digital to analog converters whose inputs are connected to output ports of the parallel computer and outputs are connected to electromagnetic field controllers (exciters) of PV-node generators, transformer tap position controllers, and water/steam/gas inlet controllers of turbines driving the generators.

5. The method as defined in claim 4, wherein, the complex matrix [Z], and the complex vectors [ΔI], [I], [ΔV], [V] can also be a real matrix [Z], and real vectors [ΔI], [I], [ΔV], [V] with double the dimensions arrived at by splitting complex equations into their real and imaginary components equations, and both, the complex matrix [Z] and the real matrix [Z] are inverses of coefficient matrices of linear or non-linear equations written respectively in complex and real form, and in particular the real matrix [Z] can be an inverse of the Jacobian $[J]^{-1}$ including its super decoupled versions.

6. The method as defined in claim 5 is accelerated by analyzing its convergence pattern, and determining an acceleration factor for each component or each node voltage of a first iteration solution by two approaches, one being a division of each component of a converged solution by each corresponding component of the first iteration solution and taking a ratio as the acceleration factor for the corresponding component of the first iteration solution, and an another being a division of differences of each component of the converged solution and corresponding each component of an initial solution estimate by each corresponding component of a first iteration correction vector and taking the ratio as an acceleration factor for each corresponding component of the first iteration correction vector, and formulating rules for determining the acceleration factor for each component of the first iteration solution or correction vector.

7. A method of forming and solving a computation model of a device or an equipment or an apparatus or a network or a system to affect control of controlled variables/parameters in the device or the equipment or the apparatus or the network or the system, comprising the steps of:

obtaining on-line or simulated data, via an input port into a shared RAM of a parallel computer using its main processor, of physical status of all components of the device or the equipment or the apparatus or the network or the system, and their maximum and minimum operating and physical capability limits, obtaining on-line readings, via the input port into the shared RAM of the parallel computer using its main processor, of specified/known/given/set variables/parameters of the device or the equipment or the apparatus or the network or the system, wherein said on-line readings are the controlled variables/parameters, performing computation, using the parallel computer comprising the main processor coordinating multiple processing units (PUs) each having a private memory, the shared RAM accessible by all the PUs, and the inputs and outputs, by forming and solving the Computation Model of the device or the equipment or the apparatus or the network or the system to calculate, complex or real and imaginary components or magnitudes and angles of unknown variables/parameters in dependence of the said obtained on-line readings of specified/known/given/set values of the controlled variables/parameters, forming said computation model of the device or the equipment or the apparatus or the network or the system referred to as a sparse inverse of complex coefficient matrix [C] as $[C]^{-1}$ called a sparse-matrix [Z] based Patel computation model—(SCIPCM or SZPCM) characterized by and comprising equations {(76) to (82)} listed in the following:

$$[V]=[Z]\{[\Delta I] \text{ or } [I]\} \text{OR} \quad (76)$$

$$[\Delta V]=[Z][\Delta I] \quad (77)$$

wherein, components of complex variables vector [V] or their corrections vector [ΔV] to be calculated, based on complex values vector [I] or mismatch values vector [ΔI] calculated from available solution estimate vector [V] or [ΔV] and complex matrix [Y] or known complex value quantity $y_p$, and special Symbols are defined in the following:

$q \rightarrow p$: means node q is directly connected to node-p
$q < p$: means node-q among directly connected are processed prior to the current node-p
$q > p$: means node-q among directly connected are yet to be processed after the current node-p
nq: No. of off-diagonal elements in a row-p of [Z] that correspond to directly connected nodes O to a node-p
nk: No. of off-diagonal elements in a row-p of [Z] that correspond to not directly connected nodes to a node-p=(n−1)−nq
n: No. of total elements in a row-p of [Z] that corresponds to total no. of nodes or equations $$ZK_p = \left\{\sum_{k=1}^{p-1} Z_{pk} + \sum_{k=p+1}^{n} Z_{pk}\right\}/(n-1) \quad (78a)$$

$$IK_p = \left\{\sum_{k=1}^{p-1} I_k + \sum_{k=p+1}^{n} I_k\right\}/(n-1) \quad \text{OR} \quad \Delta IK_p = \left\{\sum_{k=1}^{p-1} \Delta I_k + \sum_{k=p+1}^{n} \Delta I_k\right\}/(n-1) \quad (78b)$$

$$ZK_p = \left\{\sum_{\substack{k=1\\k\neq q}}^{p-1} Z_{pk} + \sum_{\substack{k=p+1\\k\neq q}}^{n} Z_{pk}\right\}/(nk) \quad (78c)$$

$$IK_p = \left\{\sum_{\substack{k=1\\k\neq q}}^{p-1} I_k + \sum_{\substack{k=p+1\\k\neq q}}^{n} I_k\right\}/(nk) \quad \text{OR} \quad \Delta IK_p = \left\{\sum_{\substack{k=1\\k\neq q}}^{p-1} \Delta I_k + \sum_{\substack{k=p+1\\k\neq q}}^{n} \Delta I_k\right\}/(nk) \quad (78d)$$

$$I_p = SSH_p^*/V_p^* = (PSH_p - jQSH_p)/(e_p - jf_p) \quad (79a)$$

$$\Delta I_p = SSH_p^*/V_p^* - (Y_{pp} + y_p)V_p - \sum_{q \rightarrow p} Y_{pq}V_q \quad (79b)$$

OR Equations (79a) and (79b) can be written in generalized complex form as:

$$I_p = y_P/V_p \quad (79a)$$

$$\Delta I_p = y_P/V_p - f_p(V_p, V_q)/V_p \quad (79b)$$

Sparse Complex Matrix-Z formulation:

$$[V_p^{(sr+1)}]^{(r+1)} = Z_{pp}[\{(I_p)^{(sr)}\}^{(r)}] + \sum_{q \rightarrow p} Z_{pq}I_q^{(r)} \quad (80a)$$

OR $$[V_p^{(sr+1)}]^{(r+1)} = Z_{pp}[\{(I_p)^{(sr)}\}^{(r)}] + \left[\sum_{\substack{q<p\\q \rightarrow p}} Z_{pq}(I_q)^{(r+1)} + \sum_{\substack{q>p\\q \rightarrow p}} Z_{pq}(I_q)^{(r)}\right] \quad (80b)$$

OR $$[V_p^{(sr+1)}]^{(r+1)} = \quad \text{:from (78a), (78b)} \quad (80c)$$

$$Z_{pp}[\{(I_p)^{(sr)}\}^{(r)}] + (n-1)(ZK_p)(IK_p)^{(r)}$$

OR $$[V_p^{(sr+1)}]^{(r+1)} = Z_{pp}[\{(I_p)^{(sr)}\}^{(r)}] + \quad \text{:from (78c), (78d)} \quad (80d)$$

$$\sum_{q \rightarrow p} Z_{pq}(I_q)^{(r)} + (nk)(ZK_p)(IK_p)^{(r)}$$

OR $$[V_p^{(sr+1)}]^{(r+1)} = Z_{pp}[\{(I_p)^{(sr)}\}^{(r)}] + \quad (80e)$$

$$\left[\sum_{\substack{q<p\\q \rightarrow p}} Z_{pq}(I_q)^{(r+1)} + \sum_{\substack{q>p\\q \rightarrow p}} Z_{pq}(I_q)^{(r)}\right] + (nk)(ZK_p)(IK_p)^{(r)}$$

OR $$[\Delta V_p^{(sr+1)}]^{(r+1)} = Z_{pp}[\{(\Delta I_p)^{(sr)}\}^{(r)}] + \sum_{q \rightarrow p} Z_{pq}(\Delta I_q)^{(r)} \quad (81a)$$

OR $$[\Delta V_p^{(sr+1)}]^{(r+1)} = \quad (81b)$$

$$Z_{pp}[\{(\Delta I_p)^{(sr)}\}^{(r)}] + \left[\sum_{\substack{q<p\\q \rightarrow p}} Z_{pq}(\Delta I_q)^{(r+1)} + \sum_{\substack{q>p\\q \rightarrow p}} Z_{pq}(\Delta I_q)^{(r)}\right]$$

OR $$[\Delta V_p^{(sr+1)}]^{(r+1)} = \quad \text{:from (78a), (78b)} \quad (81c)$$

$$Z_{pp}[\{(\Delta I_p)^{(sr)}\}^{(r)}] + (n-1)(ZK_p)(\Delta IK_p)^{(r)}$$

OR $$[\Delta V_p^{(sr+1)}]^{(r+1)} = Z_{pp}[\{(\Delta I_p)^{(sr)}\}^{(r)}] + \quad \text{:from (78c), (78d)} \quad (81d)$$

$$\sum_{q \rightarrow p} Z_{pq}(\Delta I_q)^{(r)} + (nk)(ZK_p)(\Delta IK_p)^{(r)}$$

OR $$[\Delta V_p^{(sr+1)}]^{(r+1)} = Z_{pp}[\{(\Delta I_p)^{(sr)}\}^{(r)}] + \sum_{q \to p}^{q<p} Z_{pq}(\Delta I_q)^{(r+1)} + \sum_{q \to p}^{q<p} Z_{pq}(\Delta I_q)^{(r)}(nk)(ZK_p)(\Delta IK_p)^{(r)} \quad (81e)$$

$$|v_p^{(r+1)} - v_p^{(r)}| \leq S \quad (82)$$

wherein, superscript "r" is an iteration count, and superscript "sr" is a self-iteration count, solving said computation model of the device or the equipment or the apparatus or the network or the system referred to as SCIPCM or SZPCM, using the parallel computer by decomposing a whole n-node problem into n-sub-problems each being comprised of a node and its directly connected nodes, and solving each sub-problem on one separate PU wherein the solution of each sub-problem is then mapped into the device or the equipment or the apparatus or the network or the system wide the whole n-node problem solution, evaluating solution results of said SZPCM, using the main processor of the parallel computer, for operational and physical limit violation in the device or the equipment or the apparatus or the network or the system by comparing with data of operational and physical limits of the components and the variables or parameters of the device or the equipment or the apparatus or the network or the system stored and available in the shared RAM of the parallel computer, correcting one or more controlled variables or parameters, using the main processor of the parallel computer, and repeating the performing computation, evaluating, and correcting steps until evaluating step finds no operational and physical limit violation in the device or the equipment or the apparatus or the network or the system, and affecting a change in controlled variables in the device or the equipment or the apparatus or the network or the system by actually implementing the finally obtained values of controlled variables after evaluating step finds a good the device or the equipment or the apparatus or the network or the system or stated alternatively the device or the equipment or the apparatus or the network or the system without operational and physical limit violations, using the parallel computer and digital to analog converters whose inputs are connected to output ports of the parallel computer and outputs are connected to controllers of controlled variables/parameters.

8. The method as defined in claim 7, wherein, the complex matrix [Z], and the complex vectors [ΔI], [I], [ΔV], [V] can also be a real matrix [Z], and real vectors [ΔI], [I], [ΔV], [V] with double the dimensions arrived at by splitting complex equations into their real and imaginary components equations, and both, the complex matrix [Z] and the real matrix [Z] are inverses of coefficient matrices of linear or non-linear equations written respectively in complex and real form, and in particular the real matrix [Z] can be an inverse of the Jacobian $[J]^{-1}$ including its super decoupled versions.

9. The method as defined in claim 8 is accelerated by analyzing its convergence pattern, and determining an acceleration factor for each component or each node voltage of a first iteration solution by two approaches, one being a division of each component of a converged solution by each corresponding component of the first iteration solution and taking a ratio as the acceleration factor for the corresponding component of the first iteration solution, and an another being a division of differences y of each component of the converged solution and corresponding each component of an initial solution estimate by each corresponding component of a first iteration correction vector and taking the ratio as an acceleration factor for each corresponding component of the first iteration correction vector, and formulating rules for determining the acceleration factor for each component of the first iteration solution or correction vector.

\* \* \* \* \*